United States Patent
Ramachandra et al.

(10) Patent No.: US 12,244,492 B2
(45) Date of Patent: Mar. 4, 2025

(54) CENTRALIZED UNIT-DISTRIBUTED UNIT COMMUNICATION ASSOCIATED TO RADIO LINK FAILURE REPORT AND BEAM FAILURE RECOVERY ATTEMPTS

(71) Applicant: Telefonaktiebolaget LM Ericsson (PUBL), Stockholm (SE)

(72) Inventors: Pradeepa Ramachandra, Linköping (SE); Icaro L. J. Da Silva, Solna (SE); Malik Wahaj Arshad, Stockholm (SE); Ali Parichehrehteroujeni, Linköping (SE); Angelo Centonza, Torrenueva Costa Granada (ES)

(73) Assignee: Telefonaktiebolaget LM Ericsson (Publ), Stockholm (SE)

(*) Notice: Subject to any disclaimer, the term of this patent is extended or adjusted under 35 U.S.C. 154(b) by 141 days.

(21) Appl. No.: 17/429,395

(22) PCT Filed: Feb. 5, 2020

(86) PCT No.: PCT/SE2020/050110
§ 371 (c)(1),
(2) Date: Aug. 9, 2021

(87) PCT Pub. No.: WO2020/167210
PCT Pub. Date: Aug. 20, 2020

(65) Prior Publication Data
US 2022/0131793 A1    Apr. 28, 2022

Related U.S. Application Data

(60) Provisional application No. 62/805,871, filed on Feb. 14, 2019.

(51) Int. Cl.
*H04L 45/42*      (2022.01)
*H04L 45/44*      (2022.01)

(52) U.S. Cl.
CPC .............. *H04L 45/42* (2013.01); *H04L 45/44* (2013.01)

(58) Field of Classification Search
CPC ..................... H04W 36/305; H04W 36/0079
See application file for complete search history.

(56) References Cited

U.S. PATENT DOCUMENTS

2007/0291770 A1* 12/2007 Kitazoe ............... H04L 61/4541
                                                                               370/395.52
2015/0133122 A1    5/2015   Chen
(Continued)

FOREIGN PATENT DOCUMENTS

EP         3337055 A1    6/2018
EP         2 742 725 B1    8/2018
(Continued)

OTHER PUBLICATIONS

3GPP TR 38.801 v2.0.0; Technical Report; 3rd Generation Partnership Project; Technical Specification Group Radio Access Network; Study on New Radio Access Technology; Radio Access Architecture and Interfaces (Release 14)—Mar. 2017.
(Continued)

*Primary Examiner* — Benjamin Lamont
(74) *Attorney, Agent, or Firm* — Weisberg I.P. Law, P.A.

(57) ABSTRACT

According to certain embodiments, a method is performed by a network node comprising a CU. The method comprises receiving assistance information for mobility robustness optimization and forwarding the assistance information, configuration changes related to mobility robustness optimization, or both to a DU or to a second CU. According to certain embodiments, a method is performed by a network node comprising a DU. The method comprises receiving assistance information for mobility robustness optimization. The assistance information indicates that a failure may have originated in a cell of the DU. The method further comprises (Continued)

performing one or more parameter changes in one or more functions handled by the DU.

14 Claims, 30 Drawing Sheets

(56) References Cited

U.S. PATENT DOCUMENTS

| | | | |
|---|---|---|---|
| 2016/0044518 A1 | 2/2016 | Centonza et al. | |
| 2016/0285679 A1 | 9/2016 | Dudda et al. | |
| 2017/0230780 A1 | 8/2017 | Chincholi et al. | |
| 2019/0124519 A1* | 4/2019 | Takiguchi | H04W 92/12 |
| 2019/0215756 A1* | 7/2019 | Park | H04W 76/27 |
| 2021/0195675 A1* | 6/2021 | Park | H04W 88/14 |
| 2022/0078680 A1* | 3/2022 | Wu | H04W 36/26 |

FOREIGN PATENT DOCUMENTS

| | | |
|---|---|---|
| WO | 2018169462 A1 | 9/2018 |
| WO | 2018204255 A1 | 11/2018 |

OTHER PUBLICATIONS

3GPP TS 36.331 v15.3.0; Technical Specification; 3rd Generation Partnership Project; Technical Specification Group Radio Access Network; Evolved Universal Terrestrial Radio Access (E-UTRA); Radio Resource Control (RRC); Protocol specification (Release 15)—Sep. 2018.

3GPP TS 36.423 v15.4.0; Technical Specification; 3rd Generation Partnership Project; Technical Specification Group Radio Access Network; Evolved Universal Terrestrial Radio Access Network (E-UTRAN); X2 application protocol (X2AP) (Release 15)—Dec. 2018.

3GPP TS 38.211 v15.4.0; Technical Specification; 3rd Generation Partnership Project; Technical Specification Group Radio Access Network; NR; Physical channels and modulation (Release 15)—Dec. 2018.

3GPP TS 38.213 v15.4.0; Technical Specification; 3rd Generation Partnership Project; Technical Specification Group Radio Access Network; NR; Physical layer procedures for control (Release 15)—Dec. 2018.

3GPP TS 38.321 v15.4.0; Technical Specification; 3rd Generation Partnership Project; Technical Specification Group Radio Access Network; NR; Medium Access Control (MAC) protocol specification (Release 15)—Dec. 2018.

3GPP TS 38.331 v15.3.0; Technical Specification; 3rd Generation Partnership Project; Technical Specification Group Radio Access Network; NR; Radio Resource Control (RRC) protocol specification (Release 15)—Sep. 2018.

3GPP TS 38.401 v15.4.0; Technical Specification; 3rd Generation Partnership Project; Technical Specification Group Radio Access Network; NG-RAN; Architecture description (Release 15)—Dec. 2018.

PCT International Search Report issued for International application No. PCT/SE2020/050110—Apr. 20, 2020.

PCT Written Opinion of the International Searching Authority issued for International application No. PCT/SE2020/050110—Apr. 20, 2020.

\* cited by examiner

CENTRALIZED UNIT-DISTRIBUTED UNIT COMMUNICATION ASSOCIATED TO RADIO LINK FAILURE REPORT AND BEAM FAILURE RECOVERY ATTEMPTS

PRIORITY

This nonprovisional application is a U.S. National Stage Filing under 35 U.S.C. § 371 of International Patent Application Serial No. PCT/SE2020/050110 filed Feb. 5, 2020 and entitled "Centralized Unit-Distributed Unit Communication Associated to Radio Link Failure Report and Beam Failure Recovery Attempts" which claims priority to U.S. Provisional Patent Application No. 62/805,871 filed Feb. 14, 2019 both of which are hereby incorporated by reference in their entirety.

BACKGROUND 1.1 5G RAN Architecture

The $3^{rd}$ Generation Partnership Project (3GPP) develops various technical specifications (TS), including technical specifications for Radio Access Network (RAN) architectures. For example, 3GPP describes a RAN architecture for $5^{th}$ Generation (5G-RAN) or Next Generation (NG-RAN) systems in TS 38.401 v15.4.0 (http://www.3gpp.org/ftp//Specs/archive/38_series/380.401/38401-f40.zip).

FIG. 1 illustrates the current 5G-RAN (NG-RAN) architecture. The NG-RAN consists of a set of base stations (referred to as gNBs) connected to the 5G Core Network (5GC) through the NG interface. A gNB can support Frequency Division Duplex (FDD) mode, Time Division Duplex (TDD) mode or dual mode operation. gNBs can be interconnected through the Xn interface. A gNB may consist of a gNB Central Unit (gNB-CU) and gNB-Distributed Units (gNB-DUs). A gNB-CU and a gNB-DU are connected via F1 logical interface. One gNB-DU is connected to only one gNB-CU. For resiliency, a gNB-DU may be connected to multiple gNB-CU by appropriate implementation. NG, Xn and F1 are logical interfaces. The NG-RAN is layered into a Radio Network Layer (RNL) and a Transport Network Layer (TNL). The NG-RAN architecture (i.e., the NG-RAN logical nodes and interfaces between them) is defined as part of the RNL. For each NG-RAN interface (NG, Xn, F1) the related TNL protocol and the functionality are specified. The TNL provides services for user plane transport and signalling transport.

A gNB may also be connected to a Long Term Evolution (LTE) eNodeB (eNB) via the X2 interface. Another architectural option is that where an LTE eNB connected to the Evolved Packet Core (EPC) network is connected over the X2 interface with a so called nr-gNB. The latter is a gNB not connected directly to a Core Network (CN) and connected via X2 to an eNB for the sole purpose of performing dual connectivity.

The architecture in FIG. 1 can be expanded by spitting the gNB-CU into two entities. One gNB-CU-User Plane (gNB-CU-UP), which serves the user plane and hosts the Packet Data Convergence Protocol (PDCP) protocol and one gNB-CU-Control Plane (gNB-CU-CP), which serves the control plane and hosts the PDCP and Radio Resource Control (RRC) protocol. For completeness it should be noted that a gNB-DU hosts the Radio Link Control (RLC)/Medium Access Control (MAC)/PHY protocols.

1.2 Introduction of RLF (LTE and New Radio (NR))

In connected mode, the network typically configures the user equipment (UE) to perform and report Radio Resource Management (RRM) measurements to assist network-controlled mobility decisions (i.e., handovers, which is network control). That is done via handovers, where the network decides to hand over the UE from one cell to another. As a fallback, in case handovers do not work properly, a failure detection and counter-action at the UE has been specified, the co-called Radio Link Failure (RLF) handling (described below). That RLF procedure is typically triggered when something unexpected happens in any of the mobility related procedures (as described below in section 1.3). That is detected thanks to some interactions between RRC and lower layer protocols such as L1, MAC, RLC, etc. In the case of L1, a procedure called radio link monitoring has been introduced.

In the context of the present disclosure, it is important to describe what triggers RLF and the content of RLF reports, to support Mobility Robustness Optimization (MRO). Among different issues that may trigger RLF in LTE and NR, two of them are of particular note for the present disclosure:

RLF due to radio link problem (expiry of timer T301) (i.e., RLF due to problems indicated by physical layer); and RLF due to random access problem (i.e., RLF indicated by MAC layer).

RLF triggered by other reasons (e.g., RLC) are not described in detail herein.

1.3 RLF Triggered by Radio Link Problems (L1) in LTE

In LTE, lower layers provide to upper layer Out-of-Sync (OOS) and In-Sync (IS), internally by the UE's physical layer, which in turn may apply RRC/layer 3 (i.e., higher layer) filtering for the evaluation of RLF. The procedure is illustrated in FIG. 2 (higher layer RLF related procedures in LTE).

The details of UE actions related to RLF are captured in the RRC specifications (36.331), described in relevant part below:

5.2.2.9 Actions upon reception of SystemInformationBlockType2

Upon receiving SystemInformationBlockType2, the UE shall:

1> apply the configuration included in the radioResourceConfigCommon;

. . .

1> if in RRC_CONNECTED and UE is configured with RLF timers and constants values received within rlf-TimersAndConstants:

2> not update its values of the timers and constants in ue-TimersAndConstants except for the value of timer T300;

. . .

5.3.10.0 General

The UE shall:

. . .

1> if the received radioResourceConfigDedicated includes the rlf-TimersAndConstants:

2> reconfigure the values of timers and constants as specified in 5.3.10.7;

. . .

5.3.10.7 Radio Link Failure Timers and Constants reconfiguration

The UE shall:

1> if the received rlf-TimersAndConstants is set to release:

2> use values for timers T301, T310, T311 and constants N310, N311, as included in ue-TimersAndConstants received in SystemInformation-BlockType2 (or SystemInformationBlockType2-NB in NB-IoT);
1> else:
   2> reconfigure the value of timers and constants in accordance with received rlf-TimersAndConstants;
1> if the received rlf-TimersAndConstantsSCG is set to release:
   2> stop timer T313, if running, and
   2> release the value of timer t313 as well as constants n313 and n314;
1> else:
   2> reconfigure the value of timers and constants in accordance with received rlf-TimersAndConstantsSCG;

. . .

5.3.10.11 SCG dedicated resource configuration
The UE shall:
. . .
   1> if the received radioResourceConfigDedicatedSCG includes the rlf-TimersAndConstantsSCG:
      2> reconfigure the values of timers and constants as specified in 5.3.10.7;
. . .

5.3.11.1 Detection of physical layer problems in RRC_CONNECTED
The UE shall:
   1> upon receiving N310 consecutive "out-of-sync" indications for the PCell from lower layers while neither T300, T301, T304 nor T311 is running:
      2> start timer T310;
   1> upon receiving N313 consecutive "out-of-sync" indications for the PSCell from lower layers while T307 is not running:
      2> start T313;
      NOTE: Physical layer monitoring and related autonomous actions do not apply to SCells except for the PSCell.

5.3.11.2 Recovery of physical layer problems
Upon receiving N311 consecutive "in-sync" indications for the PCell from lower layers while T310 is running, the UE shall:
   1> stop timer T310;
   1> stop timer T312, if running;
   NOTE 1: In this case, the UE maintains the RRC connection without explicit signalling, i.e. the UE maintains the entire radio resource configuration.
   NOTE 2: Periods in time where neither "in-sync" nor "out-of-sync" is reported by layer 1 do not affect the evaluation of the number of consecutive "in-sync" or "out-of-sync" indications.
Upon receiving N314 consecutive "in-sync" indications for the PSCell from lower layers while T313 is running, the UE shall:
   1> stop timer T313;
   RLF-TimersAndConstants
The IE RLF-TimersAndConstants contains UE specific timers and constants applicable for UEs in RRC_CONNECTED.

RLF-TimersAndConstants Information Element

```
-- ASN1START
RLF-TimersAndConstants-r9 ::=      CHOICE {
    release                         NULL,
    setup                           SEQUENCE {
        t301-r9                         ENUMERATED {
                                            ms100, ms200, ms300,
                                            ms400, ms600, ms1000, ms1500,
                                            ms2000},
        t310-r9                         ENUMERATED {
                                            ms0, ms50, ms100, ms200,
                                            ms500, ms1000, ms2000},
        n310-r9                         ENUMERATED {
                                            n1, n2, n3, n4, n6, n8,
                                            n10, n20},
        t311-r9                         ENUMERATED {
                                            ms1000, ms3000, ms5000,
                                            ms10000, ms15000,
                                            ms20000, ms30000},
        n311-r9                         ENUMERATED {
                                            n1, n2, n3, n4, n5, n6,
                                            n8, n10},
        ...
    }
}
RLF-TimersAndConstants-r13 ::=     CHOICE {
    release                         NULL,
    setup                           SEQUENCE{
        t301-v1310                      ENUMERATED {
                                            ms2500, ms3000,
                                            ms3500, ms4000, ms5000,
                                            ms6000, ms8000,
                                            ms10000},
        ...,
        [[  t310-v1330                  ENUMERATED {ms4000,
                                            ms6000}
        OPTIONAL  -- Need ON
        ]]
    }
}
RLF-TimersAndConstantsSCG-r12 ::=  CHOICE {
    release                         NULL,
    setup                           SEQUENCE {
        t313-r12                        ENUMERATED {
                                            ms0, ms50, ms100, ms200,
                                            ms500, ms1000, ms2000},
        n313-r12                        ENUMERATED {
                                            n1, n2, n3, n4, n6, n8,
                                            n10, n20},
        n314-r12                        ENUMERATED {
                                            n1, n2, n3, n4, n5, n6,
                                            n8, n10},
        ...
    }
}
-- ASN1STOP
```

RLF-TimersAndConstants field descriptions n3xy
Constants are described in section 7.4. n1 corresponds with 1, n2 corresponds with 2 and so on.
t3xy
Timers are described in section 7.3. Value ms0 corresponds with 0 ms, ms50 corresponds with 50 ms and so on.
E-UTRAN configures RLF-TimersAndConstants-r13 only if UE supports ce-ModeB. UE shall use the extended values t3xy-v1310 and t3xy-v1330, if present, and ignore the values signaled by t3xy-r9.

Timers (Informative)

| Timer | Start | Stop | At expiry |
|---|---|---|---|
| T301 NOTE1 | Transmission of RRCConnectionReestabilshmentRequest | Reception of RRCConnectionReestablishment or RRCConnectionReestablishmentReject message as well as when the selected cell becomes unsuitable | Go to RRC_IDLE |
| T310 NOTE1 NOTE2 | Upon detecting physical layer problems for the PCell i.e. upon receiving N310 consecutive out-of-sync indications from lower layers | Upon receiving N311 consecutive in-sync indications from lower layers for the PCell, upon triggering the handover procedure and upon initiating the connection re-establishment procedure | If security is not activated: go to RRC_IDLE else: initiate the connection re-establishment procedure |
| T311 NOTE1 | Upon initiating the RRC connection re-establishment procedure | Selection of a suitable E-UTRA cell or a cell using another RAT. | Enter RRC_IDLE |
| T313 NOTE2 | Upon detecting physical layer problems for the PSCell i.e. upon receiving N313 consecutive out-of-sync indications from lower layers | Upon receiving N314 consecutive in-sync indications from lower layers for the PSCell, upon initiating the connection re-establishment procedure, upon SCG release and upon receiving RRCConnectionReconfiguration including MobilityControlInfoSCG | Inform E-UTRAN about the SCG radio link failure by initiating the SCG failure information procedure as specified in 5.6.13. |

NOTE1:
Only the timers marked with "NOTE1" are applicable to NB-IoT.
NOTE2:
The behaviour as specified in 7.3.2 applies

| Constant | Usage |
|---|---|
| N310 | Maximum number of consecutive "out-of-sync" indications for the PCell received from lower layers |
| N311 | Maximum number of consecutive "in-sync" indications for the PCell received from lower layers |
| N313 | Maximum number of consecutive "out-of-sync" indications for the PSCell received from lower layers |
| N314 | Maximum number of consecutive "in-sync" indications for the PSCell received from lower layers |

When Discontinuous Reception (DRX) is in use, in order to enable sufficient UE power saving the out-of-sync and in-sync evaluation periods are extended and depend upon the configured DRX cycle length. The UE starts in-sync evaluation whenever out-of-sync occurs. Therefore, the same period (TEvaluate_Qout_DRX) is used for the evaluation of out-of-sync and in-sync. However, upon starting the RLF timer (T310) until its expiry, the in-sync evaluation period is shortened to 100 ms, which is the same as without DRX. If the timer T310 is stopped due to N311 consecutive in-sync indications, the UE performs in-sync evaluation according to the DRX based period (TEvaluate_Qout_DRX).

The whole methodology used for RLM in LTE (i.e. measuring the Cell-specific Reference Signal (CRS) to "estimate" the Physical Downlink Control Channel (PDCCH) quality) relies on the fact that the UE is connected to an LTE cell which is the single connectivity entity transmitting PDCCH and CRSs.

In summary, RLM in LTE has been specified so that the network does not need to configure any parameter i.e. UE generates IS/OOS events internally from lower to higher layers to control the detection of radio link problems. On the other hand, RLF/SCG Failure procedures are controlled by RRC and configured by the network via counters N310, N311, N313, N314 (which works as filters to avoid too early RLF triggering) and timers T310, T311, T313 and T314.

Radio Link Monitoring (RLM) and the L1 Input to RLF Function

The purpose of the RLM function in the UE is to monitor the downlink radio link quality of the serving cell in RRC_CONNECTED state and is based on the CRSs, which is always associated to a given LTE cell and derived from the Physical Cell Identifier (PCI). This in turn enables the UE when in RRC_CONNECTED state to determine whether it is in-sync or out-of-sync with respect to its serving cell.

The UE's estimate of the downlink radio link quality is compared with out-of-sync (OOS) and in-sync (IS) thresholds, Qout and Qin respectively, for the purpose of RLM. These thresholds are expressed in terms of the Block Error Rate (BLER) of a hypothetical PDCCH transmission from the serving cell. Specifically, Qout corresponds to a 10% BLER while Qin corresponds to a 2% BLER. The same threshold levels are applicable with and without DRX.

The mapping between the CRS based downlink quality and the hypothetical PDCCH BLER is up to the UE implementation. However, the performance is verified by conformance tests defined for various environments. Also, the downlink quality is calculated based on the Reference Signal Received Power (RSRP) of CRS over the whole band since the UE does not necessarily know where PDCCH is going to be scheduled, which is illustrated in FIG. 3. That is, FIG. 3 illustrates that PDCCH can be scheduled anywhere over the whole downlink transmission bandwidth.

When no DRX is configured, OOS occurs when the downlink radio link quality estimated over the last 200 ms period becomes worse than the threshold Qout. Similarly, without DRX the IS occurs when the downlink radio link quality estimated over the last 100 ms period becomes better than the threshold Qin. Upon detection of out-of-sync, the UE initiates the evaluation of in-sync.

1.4 RLF Triggered by Random Access Problems (MAC) in LTE

Random Access Channel (RACH) is a MAC layer procedure. Hence, it is MAC that indicates to RRC a RACH failure, which happens, for example, when the maximum number of preamble retransmissions is reached (i.e., after the UE has tried to perform power ramping a number of times and/or went through failed contention resolutions). The portions below explain how the UE may reach a maximum number of preamble retransmissions.

In LTE, a UE performs random access for many different purposes, both in RRC_CONNECTED and RRC_IDLE. LTE uses the RACH for initial network access, but in LTE the RACH cannot carry any user data, which is exclusively sent on the Physical Uplink Shared Channel (PUSCH). Instead, the LTE RACH is used to achieve uplink time synchronization for a UE which either has not yet acquired, or has lost, its uplink synchronization. Once uplink synchronization is achieved for a UE, the eNodeB can schedule orthogonal uplink transmission resources for it. Relevant scenarios in which the RACH is used are therefore:
  (1) A UE in RRC_CONNECTED state, but not uplink-synchronized, needing to send new uplink data or control information (e.g. an event-triggered measurement report);
  (2) A UE in RRC_CONNECTED state, but not uplink-synchronized, needing to receive new downlink data, and therefore to transmit corresponding ACKnowledgement/Negative ACKnowledgement (ACK/NACK) in the uplink;
  (3) A UE in RRC_CONNECTED state, handing over from its current serving cell to a target cell;
  (4) For positioning purposes in RRC_CONNECTED state, when timing advance is needed for UE positioning;
  (5) A transition from RRC_IDLE state to RRC_CONNECTED, for example for initial access or tracking area updates;
  (6) Recovering from radio link failure; and
  One additional exceptional case is that an uplink-synchronized UE is allowed to use the RACH to send a Scheduling Request (SR) if it does not have any other uplink resource Random access in LTE may either be configured as contention-based random access (CBRA), which implies an inherent risk of collision, or contention-free RACH (CFRA), where resources are reserved by the network to a given UE at a given time.

Preamble Retransmission Due to Collision Detection of RAR not Received

Random access is captured in the MAC specifications (TS 36.321). In CBRA the UE randomly selects a preamble and transmits with a configurable initial power. Then, it waits for a Random-Access Response (RAR) in a configurable time window. That RAR contains a Temporary Cell Radio Network Temporary Identifier (TC-RNTI) and an UL grant for MSG.3. If the UE receives a RAR within the time window, it transmits MSG.3. If the UE has a Cell Radio Network Temporary Identifier (C-RNTI) allocated by the cell, the UE addresses MSG.3 with that, otherwise it uses the TC-RNTI received in the RAR. As a preamble collision might have happened, different UEs might have received the same RAR, hence, the network sends a MSG.4 to possibly solve contention. If the UE has used the allocated C-RNTI in MSG.4, that is echoed back in MSG.4 to indicate that collision is resolved. Otherwise, the network addresses the UE with the TC-RNTI and includes in the MAC payload the UE identity used in MSG.3. If the UE identity matches the one the UE has the UE considers the contention resolved.

FIG. 4 illustrates an example of the CBRA procedure. In the case collision is detected, the UE shall perform preamble re-transmission and initiates random access again. And, collision is considered to be detected in the following cases:
  After transmitting a MSG.3 using a C-RNTI assigned by target cell (e.g. in handover or when UE is in RRC_CONNECTED), UE detects a MSG.4 not addressing its C-RNTI and contention resolution timer expires; and
  After transmitting a MSG.3 using a TC-RNTI assigned to it in the RAR, UE detects a MSG.4 addressing the same TC-RNTI but the UE Identity in the MSG.4 payload does not match the UE's identity transmitted on MSG.3.

Notice that collision is not considered in MAC as a failure case. Hence, upper layers are not aware that a collision has occurred.

Preamble retransmission is also triggered when the UE sends a preamble and does not receive a RAR within the RAR time window. In that case, the UE performs preamble power ramping and transmits the preamble again. In LTE, the network may also configure contention-free random access, such as in handover and resumption of downlink traffic for a UE, by allocating a dedicated signature to the UE on a per-need basis.

In all these cases, when RAR time window expires (for CFRA or CBRA) or when collision is detected, the UE performs preamble retransmission.

A configured parameter controls how many times the UE shall do that, as shown below as part of the RACH-ConfigCommon:

RACH-ConfigCommon

The IE RACH-ConfigCommon is used to specify the generic random access parameters.

RACH-ConfigCommon Information Element

```
-- ASN1START
RACH-ConfigCommon ::=         SEQUENCE {
    preambleInfo                  SEQUENCE {
        numberOfRA-Preambles          ENUMERATED {
                                          n4, n8, n12, n16, n20,
                                          n24, n28, n32, n36, n40,
                                          n44, n48, n52, n56, n60,
                                          n64},
        preamblesGroupAConfig         SEQUENCE {
            sizeOfRA-PreamblesGroupA      ENUMERATED {
                                              n4, n8, n12, n16, n20,
                                              n24, n28, n32, n36,
                                              n40, n44, n48, n52, n56,
                                              n60},
            messageSizeGroupA             ENUMERATED
            {b56, b144, b208, b256},
            messagePowerOffsetGroupB      ENUMERATED {
                                              minusinfinity, dB0,
            dB5, dB8, dB10, dB12,
                                              dB15, dB18},
            ...
        }                             OPTIONAL
    - Need OP
    },
    powerRampingParameters        PowerRampingParameters,
    ra-SupervisionInfo            SEQUENCE {
```

-continued

```
preambleTransMax         PreambleTransMax,
ra-ResponseWindowSize       ENUMERATED {
                              sf2, sf3, sf4, sf5, sf6, sf7,
                              sf8, sf10},
mac-ContentionResolutionTimer  ENUMERATED {
                              sf8, sf16, sf24, sf32,
                              sf40, sf48, sf56,
                              sf64}
}
PreambleTransMax ::=       ENUMERATED {
                              n3, n4, n5, n6, n7, n8, n10,
                              n20, n50, n100, n200}
```

1.5 Mobility Robustness Optimization (MRO) in LTE and RLF Report

Seamless handovers are a key feature of 3GPP technologies. Successful handovers ensure that the UE moves around in the coverage area of different cells without causing too much interruptions in the data transmission. However, there will be scenarios when the network fails to handover the UE to the 'correct' neighbor cell in time and in such scenarios the UE will declare the radio link failure (RLF) or Handover Failure (HOF).

Upon HOF and RLF, the UE may take autonomous actions (i.e., trying to select a cell and initiate reestablishment procedure so that we make sure the UE is trying to get back as soon as it can so that it can be reachable again). The RLF will cause a poor user experience as the RLF is declared by the UE only when it realizes that there is no reliable communication channel (radio link) available between itself and the network. Also, reestablishing the connection requires signaling with the newly selected cell (random access procedure, RRC Reestablishment Request, RRC Reestablishment RRC Reestablishment Complete, RRC Reconfiguration and RRC Reconfiguration Complete) and adds some latency, until the UE can exchange data with the network again.

According to the specifications (TS 36.331), the possible causes for the radio link failure could be one of the following:
1) Expiry of the radio link monitoring related timer T310;
2) Expiry of the measurement reporting associated timer T312 (not receiving the handover command from the network within this timer's duration despite sending the measurement report when T310 was running);
3) Upon reaching the maximum number of RLC retransmissions;
4) Upon receiving random access problem indication from the MAC entity.

As RLF leads to reestablishment, which degrades performance and user experience, it is in the interest of the network to understand the reasons for RLF and try to optimize mobility related parameters (e.g., trigger conditions of measurement reports) to avoid later RLFs. Before the standardization of MRO related report handling in the network, only the UE was aware of some information associated to how did the radio quality looked like at the time of RLF, what is the actual reason for declaring RLF, etc. For the network to identify the reason for the RLF, the network needs more information, both from the UE and also from the neighboring base stations.

As part of the MRO solution in LTE, the RLF reporting procedure was introduced in the RRC specification in Rel-9 RAN2 work. That has impacted the RRC specifications (TS 36.331) in the sense that it was standardized that the UE would log relevant information at the moment of an RLF and later report to a target cell the UE succeeds to connect (e.g., after reestablishment). That has also impacted the inter-gNodeB interface (i.e., X2AP specifications (TS 36.423)), as an eNodeB receiving an RLF report could forward to the eNodeB where the failure has been originated.

For the RLF report generated by the UE, its contents have been enhanced with more details in the subsequent releases. The measurements included in the measurement report based on the latest LTE RRC specification are:
1) Measurement quantities (RSRP, Reference Signal Received Quality (RSRQ)) of the last serving cell (PCell).
2) Measurement quantities of the neighbor cells in different frequencies of different radio access technologies (RATs) (e.g., EUTRA, UTRA, GERAN, CDMA2000).
3) Measurement quantity (e.g., Received Signal Strength Indicator (RSSI)) associated to WLAN Aps.
4) Measurement quantity (e.g., RSSI) associated to Bluetooth beacons.
5) Location information, if available (including location coordinates and velocity)
6) Globally unique identity of the last serving cell, if available, otherwise the PCI and the carrier frequency of the last serving cell.
7) Tracking area code of the PCell.
8) Time elapsed since the last reception of the 'Handover command' message.
9) C-RNTI used in the previous serving cell.
10) Whether or not the UE was configured with a data radio bearer (DRB) having Quality of Service Class Identifier (QCI) value of 1.

The detection and logging of the RLF related parameters is captured in section 5.3.11.3 of LTE RRC specification (bolded text refers to RLF detection part and the underlined text refers to RLF reporting aspects):

5.3.11.3 Detection of Radio Link Failure
The UE shall:
1> upon T310 expiry; or
1> upon T312 expiry; or
1> upon random access problem indication from MCG MAC while neither T300, T301, T304 nor T311 is running; or
1> upon indication from MCG RLC, which is allowed to be send on PCell, that the maximum number of retransmissions has been reached for an SRB or DRB:
  2> consider radio link failure to be detected for the MCG i.e. RLF;
  2> except for NB-IoT, store the following radio link failure information in the VarRLF Report by setting its fields as follows:
    3> clear the information included in VarRLF-Report, if any;
    3> set the plmn-IdentityList to include the list of EPLMNs stored by the UE (i.e. includes the RPLMN);
    3> set the measResultLastServCell to include the RSRP and RSRQ, if available, of the PCell based on measurements collected up to the moment the UE detected radio link failure;
    3> set the measResultNeighCells to include the best measured cells, other than the PCell, ordered such that the best cell is listed first, and based on measurements collected up to the moment the UE detected radio link failure, and set its fields as follows;

4> if the UE was configured to perform measurements for one or more EUTRA frequencies, include the measResultListEUTRA,
4> if the UE was configured to perform measurement reporting for one or more neighbouring UTRA frequencies, include the measResultListUTRA,
4> if the UE was configured to perform measurement reporting for one or more neighbouring GERAN frequencies, include the measResultListGERAN;
4> if the UE was configured to perform measurement reporting for one or more neighbouring CDMA2000 frequencies, include the measResultsCDMA2000;
4> for each neighbour cell included, include the optional fields that are available;

NOTE 1: The measured quantities are filtered by the L3 filter as configured in the mobility measurement configuration. The measurements are based on the time domain measurement resource restriction, if configured. Blacklisted cells are not required to be reported.

3> if available, set the logMeasResultListWLAN to include the WLAN measurement results, in order of decreasing RSSI for WLAN APs;
3> if available, set the logMeasResultListBT to include the Bluetooth measurement results, in order of decreasing RSSI for Bluetooth beacons;
3> if detailed location information is available, set the content of the locationInfo as follows:
4> include the locationCoordinates;
4> include the horizontal Velocity, if available;
3> set the failedPCellId to the global cell identity, if available, and otherwise to the physical cell identity and carrier frequency of the PCell where radio link failure is detected;
3> set the tac-FailedPCell to the tracking area code, if available, of the PCell where radio link failure is detected;
3> if an RRCConnectionReconfiguration message including the mobilityControlInfo was received before the connection failure:
4> if the last RRCConnectionReconfiguration message including the mobilityControlInfo concerned an intra E-UTRA handover:
a 5> include the previousPCellId and set it to the global cell identity of the PCell where the last RRCConnectionReconfiguration message including mobilityControlInfo was received;
b 5> set the timeConnFailure to the elapsed time since reception of the last RRCConnectionReconfiguration message including the mobilityControlInfo;
4> if the last RRCConnectionReconfiguration message including the mobilityControlInfo concerned a handover to E-UTRA from UTRA and if the UE supports Radio Link Failure Report for Inter-RAT MRO:
c 5> include the previousUTRA-CellId and set it to the physical cell identity, the carrier frequency and the global cell identity, if available, of the UTRA Cell in which the last RRCConnectionReconfiguration message including mobilityControlInfo was received;
d 5> set the timeConnFailure to the elapsed time since reception of the last RRCConnectionReconfiguration message including the mobilityControlInfo;
3> if the UE supports QCI1 indication in Radio Link Failure Report and has a DRB for which QCI is 1:
4> include the drb-EstablishedWithQCI-1;
3> set the connectionFailureType to rlf,
3> set the c-RNTI to the C-RNTI used in the PCell;
3> set the rlf-Cause to the trigger for detecting radio link failure;
2> if AS security has not been activated:
3> if the UE is a NB-IoT UE:
4> if the UE supports RRC connection re-establishment for the Control Plane CIoT EPS optimisation:
e 5> initiate the RRC connection re-establishment procedure as specified in 5.3.7;
4> else:
f 5> perform the actions upon leaving RRC_CONNECTED as specified in 5.3.12, with release cause 'RRC connection failure';
3> else:
4> perform the actions upon leaving RRC_CONNECTED as specified in 5.3.12, with release cause 'other';
2> else:
3> initiate the connection re-establishment procedure as specified in 5.3.7;

In case of DC, the UE shall:
1> upon T313 expiry; or
1> upon random access problem indication from SCG MAC; or
1> upon indication from SCG RLC, which is allowed to be sent on PSCell, that the maximum number of retransmissions has been reached for an SCG or split DRB:
2> consider radio link failure to be detected for the SCG i.e. SCG-RLF;
2> initiate the SCG failure information procedure as specified in 5.6.13 to report SCG radio link failure;

In case of CA PDCP duplication, the UE shall:
1> upon indication from an RLC entity, which is restricted to be sent on SCell only, that the maximum number of retransmissions has been reached:
2> consider radio link failure to be detected for the RLC entity;
2> initiate the failure information procedure as specified in 5.6.21 to report PDCP duplication failure;

The UE may discard the radio link failure information, i.e. release the UE variable VarRLF-Report, 48 hours after the radio link failure is detected, upon power off or upon detach.

After the RLF is declared, the RLF report is logged and, once the UE selects a cell and succeeds with a reestablishment, it includes an indication that it has an RLF report available in the RRC Reestablishment Complete message, to make the target cell aware of that availability. Then, upon receiving an UEInformationRequest message with a flag "rlf-ReportReq-r9" the UE shall include the RLF report (stored in a UE variable VarRLF-Report, as described above) in an UEInformationResponse message and send to the network.

The UEInformationRequest, and UEInformationResponse messages are shown below:

UEInformationRequest

The UEInformationRequest is the command used by E-UTRAN to retrieve information from the UE.

Signalling radio bearer: SRB1
RLC-SAP: AM
Logical channel: DCCH
Direction: E-UTRAN to UE UEInformationRequest Message

```
-- ASN1START
UEInformationRequest-r9    ::=           SEQUENCE {
    rrc-TransactionIdentifier            RRC-TransactionIdentifier,
    criticalExtensions                   CHOICE {
        c1                               CHOICE {
            ueInformationRequest-r9          UEInformationRequest-r9-IEs,
            spare3 NULL, spare2 NULL, spare1 NULL
        },
        criticalExtensionsFuture         SEQUENCE { }
    }
}
UEInformationRequest-r9-IEs ::=          SEQUENCE {
    rach-ReportReq-r9                    BOOLEAN,
    rlf-ReportReq-r9                     BOOLEAN,
    nonCriticalExtension                 UEInformationRequest-v930-IEs
    OPTIONAL
}
UEInformationRequest-v930-IEs ::= SEQUENCE {
    lateNonCriticalExtension             OCTET STRING
    OPTIONAL,
    nonCriticalExtension                 UEInformationRequest-v1020-IEs
    OPTIONAL
}
UEInformationRequest-v1020-IEs ::=       SEQUENCE {
    logMeasReportReq-r10                 ENUMERATED {true}
    OPTIONAL,    -- Need ON
    nonCriticalExtension                 UEInformationRequest-v1130-IEs
    OPTIONAL
}
UEInformationRequest-v1130-IEs ::= SEQUENCE {
    connEstFailReportReq-r11             ENUMERATED {true}
    OPTIONAL,    -- Need ON
    nonCriticalExtension                 UEInformationRequest-v1250-IEs
    OPTIONAL
}
UEInformationRequest-v1250-IEs ::= SEQUENCE {
    mobilityHistoryReportReq-r12         ENUMERATED {true}
    OPTIONAL,    -- Need ON
    nonCriticalExtension                 UEInformationRequest-v1530-IEs
    OPTIONAL
}
UEInformationRequest-v1530-IEs ::= SEQUENCE {
    idleModeMeasurementReq-r15           ENUMERATED {true}
    OPTIONAL,    -- Need ON
    flightPathInfoReq-r15                FlightPathInfoReportConfig-r15
    OPTIONAL,    -- Need ON
    nonCriticalExtension                 SEQUENCE { }
    OPTIONAL
}
-- ASN1STOP
```

| UEInformationRequest field descriptions |
| --- |
| rach-ReportReq |
| This field is used to indicate whether the UE shall report information about the random access procedure. |

UEInformationResponse
The UEInformationResponse message is used by the UE to transfer the information requested by the E-UTRAN.
Signalling radio bearer: SRB1 or SRB2 (when logged measurement information is included)
RLC-SAP: AM
Logical channel: DCCH
Direction: UE to E-UTRAN
Based on the contents of the RLF report (e.g., the Globally unique identity of the last serving cell, where the failure was originated), the cell in which the UE reestablishes can forward the RLF report to the last serving cell. This forwarding of the RLF report is done to aid the original serving cell with tuning of the handover related parameters (e.g., measurement report triggering thresholds) as the original serving cell was the one who had configured the parameters associated to the UE that led to the RLF.

Two different types of inter-node messages have been standardized in LTE for that purpose, the Radio link failure indication and the handover report (in 36.423). The Radio link failure indication procedure is used to transfer information regarding RRC re-establishment attempts or received RLF reports between eNBs. This message is sent from the eNB in which the UE performs reestablishment to the eNB which was the previous serving cell of the UE. The contents of the RLF indication message is given below:

9.1.2.18 RLF Indication

This message is sent by the $eNB_2$ to indicate an RRC re-establishment attempt or a reception of an RLF Report from a UE that suffered a connection failure at $eNB_1$.

Direction: eNB$_2$→eNB$_1$.

| IE/Group Name | Presence | Range | IE type and reference | Semantics description | Criticality | Assigned Criticality |
|---|---|---|---|---|---|---|
| Message Type | M | | 9.2.13 | | YES | ignore |
| Failure cell PCI | M | | INTEGER (0 . . . 503, . . .) | Physical Cell Identifier | YES | ignore |
| Re-establishment cell ECGI | M | | ECGI 9.2.14 | | YES | ignore |
| C-RNTI | M | | BIT STRING (SIZE (16)) | C-RNTI contained in the RRC Re-establishment Request message (TS 36.331 [9]) | YES | ignore |
| ShortMAC-I | O | | BIT STRING (SIZE (16)) | ShortMAC-I contained in the RRC Re-establishment Request message (TS 36.331 [9]) | YES | ignore |
| UE RLF Report Container | O | | OCTET STRING | RLF -Report-r9 IE contained in the UEInformation Response message (TS 36.331 [9]) | YES | ignore |
| RRC Conn Setup Indicator | O | | ENUMERATED (RRC Conn Setup, . . .) | Included if the RLF Report within the UE RLF Report Container IE is retrieved after an RRC connection setup or an incoming successful handover | YES | reject |
| RRC Conn Reestab Indicator | O | | ENUMERATED (reconfiguration Failure, handoverFailure, otherFailure, . . .) | The Reestablishment Cause in RRCConnectionReestablishmentRequest message(TS 36.331 [9]) | YES | ignore |
| UE RLF Report Container for extended bands | O | | OCTET STRING | RLF-Report-v9e0 IE contained in the UEInformation Response message (TS 36.331 [9]) | YES | ignore |

Based on the RLF report from the UE and the knowledge about in which cell did the UE reestablished itself, the original source cell can deduce whether the RLF was caused due to a coverage hole or due to handover associated parameter configurations. If the RLF was deemed to be due to handover associated parameter configurations, the original serving cell can further classify the handover related failure as too-early, too-late or handover to wrong cell classes. These handover failure classes are explained in brief below.
1) Whether the handover failure occurred due to the 'too-late handover' cases
   a. The original serving cell can classify a handover failure to be 'too late handover' when the original serving cell fails to send the handover command to the UE associated to a handover towards a particular target cell and if the UE reestablishes itself in this target cell post RLF. Notice that this also comprises the case where the UE has not triggered a measurement report (because the thresholds were not properly set) and/or the case the UE sends the measurement report in poor radio conditions and the network is not able to decoded it and, based on that trigger a handover. These two possible cases are shown below in FIGS. 5A and 5B.
   b. An example corrective action from the original serving cell could be to initiate the handover procedure towards this target cell a bit earlier by decreasing the CIO (cell individual offset) towards the target cell that controls when the IE sends the event triggered measurement report that leads to taking the handover decision.

2) Whether the handover failure occurred due to the 'too-early handover' cases
   a. The original serving cell can classify a handover failure to be 'too early handover' when the original serving cell is successful in sending the handover command to the UE associated to a handover however the UE fails to perform the random access towards this target cell (i.e. UE receives the HO command, starts timer T304 but timer expires before the UE is able to succeed with random access).
   b. An example corrective action from the original serving cell could be to initiate the handover procedure towards this target cell a bit later by increasing the CIO (cell individual offset) towards the target cell that controls when the IE sends the event triggered measurement report that leads to taking the handover decision. This also needs to consider RACH parameters (e.g. maximum number of preamble retransmissions, RAR time window, contention resolution timer, etc.) and the settings of timer T304.
3) Whether the handover failure occurred due to the 'handover-to-wrong-cell' cases
   a. The original serving cell can classify a handover failure to be 'handover-to-wrong-cell' when the original serving cell intends to perform the handover for this UE towards a particular target cell but the UE declares the RLF and reestablishes itself in a third cell.
   b. A corrective action from the original serving cell could be to initiate the measurement reporting procedure that leads to handover towards the target cell a bit later by decreasing the CIO (cell individual offset) towards the target cell or via initiating the handover towards the cell in which the UE reestablished a bit earlier by increasing the CIO towards the reestablishment cell.

To aid the serving cell to classify a handover as 'too-late' handover, the RLF reporting (via RLF indication message) from the reestablishment cell to the original source cell is enough. To classify a handover as 'too early' or 'handover to wrong cell', the serving cell may further benefit from receiving the 'handover report' message (from either the cell that re-establishment happened, or the wrong cell the UE handed over but failed while the UE Context Release message is sent to the source cell) which includes the following parameters:

9.1.2.19 Handover Report

This message is sent by the $eNB_1$ to report a handover failure event or other critical mobility problem.

Direction: $eNB_1 \rightarrow eNB_2$.

| IE/Group Name | Presence | Range | IE type and reference | Semantics description | Criticality | Assigned Criticality |
|---|---|---|---|---|---|---|
| Message Type | M | | 9.2.13 | | YES | ignore |
| Handover Report Type | M | | ENUMERATED (HO too early, HO to wrong cell, . . . , InterRAT ping-pong) | | YES | ignore |
| Handover Cause | M | | Cause 9.2.6 | Indicates handover cause employed for handover from $eNB_2$ | YES | ignore |
| Source cell ECGI | M | | ECGI 9.2.14 | ECGI of source cell for handover procedure (in $eNB_2$) | YES | ignore |
| Failure cell ECGI | M | | ECGI 9.2.14 | ECGI of target cell for handover procedure (in $eNB_1$) | YES | ignore |
| Re-establishment cell ECGI | C-ifHandoverReportType HoToWrongCell | | ECGI 9.2.14 | ECGI of cell where UE attempted re-establishment | YES | ignore |
| Target cell in UTRAN | C-ifHandoverReportType InterRATpingpong | | OCTET STRING | Encoded according to UTRAN Cell ID in the Last Visited UTRAN Cell Information IE, as defined in in TS 25.413 [24] | YES | ignore |
| Source cell C-RNTI | O | | BIT STRING (SIZE (16)) | C-RNTI allocated at the source eNB (in $eNB_2$) | YES | ignore |

| IE/Group Name | Presence | Range | IE type and reference | Semantics description | Criticality | Assigned Criticality |
|---|---|---|---|---|---|---|
| Mobility Information | O | | BIT STRING (SIZE (32)) | contained in the AS-config (TS 36.331 [9]). Information provided in the HANDOVER REQUEST message from eNB$_2$. | YES | ignore |
| UE RLF Report Container | O | | OCTET STRING | The UE RLF Report Container IE received in the RLF INDICATION message. | YES | ignore |
| UE RLF Report Container for extended bands | O | | OCTET STRING | The UE RLF Report Container for extended bands IE received in the RLF INDICATION message. | YES | ignore |

| Condition | Explanation |
|---|---|
| ifHandoverReportType HoToWrongCell | This IE shall be present if the Handover Report Type IE is set to the value "HO to wrong cell" |
| ifHandoverReportType InterRATpingpong | This IE shall be present if the Handover Report Type IE is set to the value "InterRAT ping-pong" |

1.6 RLF Triggered by Radio Link Problems (L1) in NR

As described, RLF handling is similar in LTE and NR. However, the RLF triggered by radio link problems in NR has quite some differences compared to LTE i.e. in the way that OOS and IS indications are generated by L1. We start by describing the cell concept in NR and the changes due to beamforming, to later introduce RLM in NR and its differences compared to LTE.

Cell and Beam-Based Mobility Concept in NR

In LTE, each cell broadcasts a primary and secondary synchronization signal (PSS/SSS) that encodes a physical cell identifier. This is how a UE identifies a cell in LTE. In NR, equivalent signals also exist. In addition, as NR is designed to be possibly deployed in higher frequencies (e.g., above 6 GHz) where beamforming is massively used, these should be possibly beamformed for the same cell (and possibly in a time-domain manner, in a beam sweeping). And, when transmitted in different beams, each of these PSS/SSS for the same cell has its own identification, in what is called an Synchronization Signal and PBCH Block (SSB), as in addition, Master Information Block (MIB) is also included in each beam.

Hence, one could say that a cell in NR is basically defined by a set of these SSBs that may be transmitted in one (typical implementation for lower frequencies such as below 6 GHz) or multiple downlink beams (typical implementation for lower frequencies such as below 6 GHz). For the same cell, these SSBs carry the same physical cell identifier (PCI). For standalone operation (i.e., to support UEs camping on an NR cell), they also carry in System Information Block Type 1 (SIB1) the RACH configuration, which comprises a mapping between the detected SSB covering the UE at a given point in time and the PRACH configuration (e.g., time, frequency, preamble, etc.) to be used. For that, each of these beams may transmit its own SSB which may be distinguished by an SSB index. An example of this is shown in FIG. 6.

These SSBs may be used for many different purposes, including RRM measurements (to assist connected and idle mode mobility), beam selection upon random access, and last, but not least, which is one of the main topics of the present disclosure, beam failure detection and radio link monitoring. In addition to SSBs, for most of these purposes listed above, the network may also configure CSI-RS resources via dedicated signaling to each UE, where each resource may also be beamformed and transmitted in multiple beams.

Radio Link Monitoring (RLM) and the L1 Input to RLF Function in NR

In NR, RLM is also defined for a similar purpose as in LTE (i.e., monitor the downlink radio link quality of the serving cell in RRC_CONNECTED state, in particular the quality of control channels so that the network can contact the UE to schedule information). However, differently from LTE, some level of configurability has been introduced for RLM in NR in terms of RS type/beam/RLM resource configuration and BLER thresholds for IS/OOS generation.

Explicit RLM Resource Configuration

In the previous section it was shown that in NR, two different reference signal (RS) types (SSBs and CSI-RSs) are defined for RRM measurements for mobility assistance, RLM, beam failure detection, etc. There are different reasons to define the two RS types, one of them being the possibility to transmit SSBs in wide beams while CSI-RSs in narrow beams and the other being the ability to change the beamformer of CSI-RS dynamically without affecting the idle mode coverage of the cell (which would have changed if SSB beamformer is changed).

In NR, the RS type used for RLM is also configurable (both CSI-RS based RLM and SS block based RLM are supported) and the RS type for RLM should be configured via RRC signaling. As NR can operate in quite high frequencies (above 6 GHs, but up to 100 GHz) these RS types used for RLM can be beamformed. In other words, depending on deployment or operating frequency, the UE can be configured to monitor beamformed reference signals regardless which RS type is selected for RLM. Hence, differently from LTE, RS for RLM can be transmitted in multiple beams.

As there can be multiple beams, the UE needs to know which ones to monitor for RLM and how to generate IS/OOS events to be indicated to upper layers (so upper layers are able to control the triggering of RLF). In the case of SSB, each beam can be identified by an SSB index (derived from a time index in PBCH and/or a PBCH/DRMS scrambling), while in case of CSI-RS, a resource index is also defined (signaled with the CSI-RS configuration).

also be), then an OOS event is generated. Same for IS event, as long as the best is above (all other do not matter).

One observation is that changing bandwidth part (BWP) may lead to changes in the RLM resources the UE monitors, especially if the PDCCH configuration also changes. And, in addition, there could be a need to change the RS type the UE monitors as the target active BWP may not include the RS type/resources the UE was monitoring in the previous active BWP. Each BWP is associated with its own set of RLM-RSs.

The RLM configuration provided to the UE with dedicated signalling is shown below, reproduced as in the RRC specifications where the parameters we have discussed above are bolded:

RadioLinkMonitoringConfig
  The IE RadioLinkMonitoringConfig is used to configure radio link monitoring for detection of beam- and/or cell radio link failure. See also TS 38.321 [3], clause 5.1.1.

RadioLinkMonitoringConfig Information Element

```
-- ASN1START
-- TAG-RADIOLINKMONITORINGCONFIG-START
RadioLinkMonitoringConfig ::=         SEQUENCE{
    failureDetectionResourcesToAddModList SEQUENCE
(SIZE(1..maxNrofFailureDetectionResources)) OF RadioLinkMonitoringRS
OPTIONAL, -- Need N
    failureDetectionResourcesToReleaseList SEQUENCE
(SIZE(1..maxNrofFailureDetectionResources)) OF RadioLinkMonitoringRS-Id
OPTIONAL, -- Need N
    beamFailureInstanceMaxCount            ENUMERATED {n1, n2, n3, n4, n5, n6,
n8, n10}                           OPTIONAL, -- Need R
    beamFailureDetectionTimer              ENUMERATED {pbfd1, pbfd2, pbfd3,
pbfd4, pbfd5, pbfd6, pbfd8, pbfd10}        OPTIONAL, -- Need R
    ...
}
RadioLinkMonitoringRS ::=              SEQUENCE {
    radioLinkMonitoringRS-Id                RadioLinkMonitoringRS-Id,
    purpose                        ENUMERATED {beamFailure, rlf, both},
    detectionResource                    CHOICE {
        ssb-Index                        SSB-Index,
        csi-RS-Index                     NZP-CSI-RS-ResourceId
    },
    ...
}
-- TAG-RADIOLINKMONITORINGCONFIG-STOP
-- ASN1STOP
```

In NR the network can configure by RRC signaling, X RLM resources to be monitored, either related to SS blocks or CSI-RS, as follows:

One RLM-RS resource can be either one SS/PBCH block or one CSI-RS resource/port;

The RLM-RS resources are UE-specifically configured;

When UE is configured to perform RLM on one or multiple RLM-RS resource(s),

Periodic IS is indicated if the estimated link quality corresponding to hypothetical PDCCH BLER based on at least one RLM-RS resource among all configured X RLM-RS resource(s) is above Q_in threshold;

Periodic OOS is indicated if the estimated link quality corresponding to hypothetical PDCCH BLER based on all configured X RLM-RS resource(s) is below Q_out threshold;

That points in the direction that only the quality of best beam really matters at every sample to generate OOS/IS events. In other words, if the best beam is below the threshold (i.e. all others would RLM Resource Configuration Via Transmission Configuration Indicator (TCI) States NR has yet another way to perform RLM, which is using the concept of TCI states. The field failureDetectionResourcesToAddModList in the RLM configuration above is described as a list of reference signals for performing RLM but if no RSs are provided in this list for the purpose of RLF detection, the UE performs Cell-RLM based on the activated TCI-State of PDCCH as described in TS 38.213 [13], clause 5. The network ensures that the UE has a suitable set of reference signals for performing cell-RLM.

As noted above, the term TCI state stands for Transmission Configuration Indicator state. It is used to introduce dynamics in beam selection. The UE can be configured through RRC signaling with N TCI states, where N is up to 64, and depends on UE capabilities. Each state contains a Quasi-Co-Location (QCL) information, i.e. one or two source DL RSs, each combined with a QCL type. Since a TCI state contains QCL Type D information for one of the RSs, the N TCI states can be interpreted as a list of N possible beams transmitted from the network. The other source DL RS in the TCI state may be used for time/ frequency QCL purposes. A first list of available TCI states is configured for PDSCH, and a second list of TCI states is configured for PDCCH contains pointers, known as TCI State IDs, to a subset of the TCI states configured for PDSCH. The network then activates one TCI state for PDCCH (i.e. provides a TCI for PDCCH) and up to eight active TCI states for PDSCH. Each configured TCI state contains parameters for the QCL associations between source reference signals (CSI-RS or SS/PBCH) and target reference signals (e.g., PDSCH/PDCCH DMRS ports). TCI states are also used to convey QCL information for the reception of CSI-RS.

Another important concept in NR is the CORESET (Control resource set), where some of the parameters of PDCCH configuration are provided. The CORESET defines the length (1, 2, or 3 OFDM symbols) as well as a frequency-domain allocation of the PDCCH allocation. It is the CORESET configuration that defines the TCI state that is used to receive the PDCCH candidates transmitted in that CORESET. Each CORESET can have a different TCI state configured/activated, enabling the possibility to use different transmit beams for different PDCCH candidates.

In total, it is possible to configure the UE with 3 CORESETs.

ControlResourceSet

The IE ControlResourceSet is used to configure a time/frequency control resource set (CORESET) in which to search for downlink control information (see TS 38.213 [13], clause FFS_Section).

ControlResourceSet Information Element

TCI-State Information Element

```
-- ASN1START
-- TAG-TCI-STATE-START
TCI-State ::=            SEQUENCE {
   tci-StateId           TCI-StateId,
   qcl-Type1             QCL-Info,
   qcl-Type2             QCL-Info
OPTIONAL,   -- Need R
   ...
}
QCL-Info ::=             SEQUENCE {
   cell                  ServCellIndex OPTIONAL,   -- Need R
   bwp-Id                BWP-Id                    OPTIONAL, -
- Cond CSI-RS-Indicated
   referenceSignal                 CHOICE {
      csi-rs                       NZP-CSI-RS-ResourceId,
      ssb                          SSB-Index
   },
   qcl-Type              ENUMERATED {typeA, typeB, typeC,
                                     typeD},
   ...
}
-- TAG-TCI-STATE-STOP
-- ASN1STOP
```

IS/OOS and BLER Threshold Configuration

The UE needs to know which resources to monitor, but also how to generate IS/OOS events to be reported internally to higher layers. While LTE the SINR maps to a 10% BLER for the generation of OOS events and the SINR maps to a BLER of 2% for the generation of IS events, configurable values can be defined in NR. Currently LTE like 10% and 2% BLER can be configured for OOS and IS events and

```
-- ASN1START
-- TAG-CONTROLRESOURCESET-START
ControlResourceSet ::=            SEQUENCE {
   controlResourceSetId           ControlResourceSetId,
   frequencyDomainResources            BIT STRING (SIZE (45)),
   duration                  INTEGER (1..maxCoReSetDuration),
   cce-REG-MappingType                 CHOICE {
      interleaved         SEQUENCE {
         reg-BundleSize                ENUMERATED {n2, n3, n6},
         interleaverSize               ENUMERATED {n2, n3, n6},
         shiftindex                    INTEGER(0..maxNrofPhysicalResourceBlocks-1)
OPTIONAL -- Need S
      },
      nonInterleaved                NULL
   },
   precoderGranularity        ENUMERATED {sameAsREG-bundle,
allContiguousRBs},
   tci-StatesPDCCH-ToAddList              SEQUENCE(SIZE (1..maxNrofTCI-
StatesPDCCH)) OF TCI-StateId           OPTIONAL,-- Cond NotSIB1-initialBWP
   tci-StatesPDCCH-ToReleaseLisT          SEQUENCE(SIZE (1..maxNrofTCI-
StatesPDCCH)) OF TCI-StateId       OPTIONAL, -- Cond NotSIB1-initialBWP
   tci-PresentInDCI                   ENUMERATED {enabled}
OPTIONAL,  -- Need S
   pdcch-DMRS-ScramblingID                INTEGER (0..65535)
OPTIONAL,  -- Need S
   ...
}
-- TAG-CONTROLRESOURCESET-STOP
-- ASN1STOP
```

Notice that for each CORESET one can configure a list of TCI states, where each state is defined as follows:

TCI-State

The IE TCI-State associates one or two DL reference signals with a corresponding quasi-colocation (QCL) type.

another pair of X % and Y % will be standardized once a URLLC type of application related requirements are put in place and RAN4 has evaluated the feasibility of these requirements. Hence, differently from LTE, the BLER thresholds for IS/OOS generation will be configurable.

Concept of BW (Bandwidth) Parts and Multi-SSBs

RAN1 introduced the concept of Bandwidth Parts (BWP) which intends to configure the UE with an operation bandwidth that can be less than the actual carrier bandwidth. This has similarities to the handling of "bandwidth reduced" UEs in LTE (Cat-M1) which are not able to operate on the entire carrier bandwidth. Note that the discussion is primarily about carriers spanning several 100 MHz and UEs supporting, for example, "only" carriers of 100 MHz. In other words, this concept addresses UEs supporting an operating bandwidth that is 100 times wider than for Cat-M1. Like in LTE Cat-M1 the configured BWP may not coincide with the carrier's SSB (PSS/SSS/MIB) and it must be discussed how the UE acquires cell sync, performs measurements and acquires SIB in such cases. Besides this core part of the BWP functionality, RAN1 also discussed other flavors e.g. with additional SSBs in the same carrier or in the same BWP as well as the possibility to configure a UE with several possibly overlapping BWPs among which the network can switch by means of L1 control signals (DCI).

FIG. 7 illustrates an example configuration of bandwidth parts. The downlink and uplink bandwidth parts determine the frequency range in which the UE is required to receive and transmit data channels (PDSCH and PUSCH) and corresponding control channels (PDCCH and PUCCH). As a starting point, a BWP cannot span more than the configured carrier bandwidth.

A key aspect of the BWP concept (as opposed to using only the carrier bandwidth) is to support UEs that cannot handle the entire carrier bandwidth. UEs supporting the full carrier bandwidth can also utilize the entire carrier. Hence, we envision that in dedicated signalling, the NW configures the DL BWP and the UL BWP in accordance with the UE capabilities.

The BWPs can be configured by dedicated signalling in the first RRCReconfiguration after connection establishment (i.e., when the NW knows the UE capabilities). However, already before that point in time the UE must read PDCCH and PDSCH to acquire SIB1, to receive Paging messages and to receive Msg2, Msg4 and the above-mentioned RRCReconfiguration. Hence, the UE must be configured with an "initial BWP".

A network may still decide to configure a wider initial BWP than some UEs support. This may be the case if the NW wants to optimize the SIB acquisition time or connection establishment time by using a wider bandwidth. But this situation may also occur if a legacy network does not yet support UEs with lower complexity. The UE discovers this based on the initial BWP configured in MIB and since it cannot acquire SIB1 it should consider the cell as barred.

Upon successful connection establishment, the network should configure a BWP in accordance with the UE capabilities. The BWP configuration is specific for a serving cell, i.e., the network must at least configure a DL BWPs for each serving cell. And UL BWP is configured for PCells and for SCells with configured UL.

FIG. 8 illustrates an example configuration of bandwidth parts. In LTE, each cell was characterized by its center frequency (UL+DL for FDD), by the carrier bandwidth, and by the physical cell ID conveyed in PSS/SSS. The PSS/SSS used to be at the carrier's center frequency. In NR, the SSB-frequency is not necessarily the center frequency which will require signaling both values or one value and an offset (as already discussed in the context of RRM measurements). Upon initial access, the UE must discover the (one) SSB, acquire sync, acquire MIB and then attempt to read SIB1. At this point the UE has selected the cell, i.e., an SSB on a certain frequency.

When the UE establishes an RRC connection, the NW may configure a dedicated BWP. That BWP may overlap with the SSB's frequency. If so, the UE is able to (re-) acquire the SSB at any time in order to re-gain sync and to perform SS-based measurements.

However, if operating bandwidth of a cell (carrier) is wide and if many UEs have an operation bandwidth which is significantly narrower than the carrier bandwidth, the network will allocate UEs to BWPs that do not coincide the with SSB frequency to balance the load and to maximize the system capacity. As in LTE Cat-M1 this implies that these UEs need (inter-frequency, intra-carrier) measurement gaps to re-sync with their serving cell's SSB and to detect and measure neighbor cells. At the same time, the RLM related measurements are performed by the UE more often than the RRM related measurements. Therefore, the network is expected to provide the RLM-RS in the active BWP for a given UE. So, there is no measurement gaps associated to performing RLM measurements.

1.7 RLF Triggered by Random Access Problems (MAC) in NR—Beam Failure Recovery (BFR)

In LTE, random access is used by different procedures. In NR, a procedure called Beam Failure Recovery (BFR) has been defined and relies on random access to indicate eicajer. Hence, a failure in the BFR procedure leads to a random-access failure that is indicated to the higher layers so that RLF is triggered. Below we describe the BFR procedure.

Beam Failure Detection (BFD) and Beam Failure Recovery (BFR) Mechanism

In NR, a new mechanism aiming to avoid RLF was introduced: Beam Failure Recovery (BFR), which relies on beam selection and random-access procedure. The procedure is assisted by the monitoring procedure called Beam Failure Detection (BFD) that, when it occurs, triggers BFR. Making an analogy, RLF is a RRC procedure triggered when the UE is out of cell coverage in connected mode, because L3 mobility may have failed, and shall perform autonomous actions to re-gain connectivity with the network, possibly in another cell. On the other hand, BFR is a L1/MAC procedure triggered when the UE is out of beam coverage (or at least out of coverage of a pre-determined set of beams e.g. beams overlapping coverage with beams used for PDCCH transmission for that UE) because beam management procedures may have failed, and UE shall perform autonomous actions to re-gain connectivity with the same cell (i.e. also in configured candidate beams covered by the same cell).

The UE is configured with BFD resources to be monitored, i.e., a subset of beams in cell coverage, and BFR resources, another set of beams in cell coverage. These BFD and BFR resources can be associated to either SSBs or CSI-RSs, similar to RLM. The UE continuously monitors the BFD resources to check if it is still within the coverage of these beams. If the UE is not under the coverage (as defined with certain Qout threshold), the UE performs the beam recovery using the BFR related UL resources. In this way, the UE and the network maintain a set of beams using at least one of which they can reach each other. When the UE fails to reach the network using any of the BFR resources, the UE declares RLF.

There is a relation between RLM and BFD. The UE may be configured to only perform RLM with a set of resources. In that case, the UE monitor these resources to generate OOS indications to upper layers so RLF may be triggered under certain conditions. The UE may be configured to only perform BFD or both BFD+RLM, where each configured resource is indicated to be associated to either RLM, BFD or both BFD/RLM, as shown below:

RadioLinkMonitoringConfig

The IE RadioLinkMonitoringConfig is used to configure radio link monitoring for detection of beam- and/or cell radio link failure. See also TS 38.321 [3], clause 5.1.1.

RadioLinkMonitoringConfig Information Element

```
-- ASN1START
-- TAG-RADIOLINKMONITORINGCONFIG-START
RadioLinkMonitoringConfig ::=                  SEQUENCE {
    failureDetectionResourcesToAddModList   SEQUENCE
(SIZE(1..maxNrofFailureDetectionResources)) OF RadioLinkMonitoringRS
OPTIONAL, -- Need N
    failureDetectionResourcesToReleaseList SEQUENCE
(SIZE(1..maxNrofFailureDetectionResources)) OF RadioLinkMonitoringRS-Id
OPTIONAL, -- Need N
    beamFailureInstanceMaxCount                 ENUMERATED {n1, n2, n3, n4, n5, n6,
n8, n10}                        OPTIONAL, -- Need R
    beamFailureDetectionTimer                   ENUMERATED {pbfd1, pbfd2, pbfd3,
pbfd4, pbfd5, pbfd6, pbfd8, pbfd10}                 OPTIONAL, -- Need R
    ...
}
RadioLinkMonitoringRS ::=                   SEQUENCE
    radioLinkMonitoringRS-Id                RadioLinkMonitoringRS-Id,
    purpose                         ENUMERATED {beamFailure, rlf, both},
    detectionResource                   CHOICE {
        ssb-Index                   SSB-Index,
        csi-RS-Index                    NZP-CSI-RS-ResourceId
    },
    ...
}
-- TAG-RADIOLINKMONITORINGCONFIG-STOP
-- ASN1STOP
```

If no RSs are provided for the purpose of beam failure detection, the UE performs beam monitoring based on the activated TCI-State for PDCCH. In other words, if no RSs for beam failure detection are not explicitly configured, the UE defaults to use the RSs which the UE uses as QCL reference for the reception of the PDCCH DMRS, which is identical to the RSs in the activated TCI state(s). If RSs for RLM are not explicitly configured, the UE defaults to use the RSs which the UE uses as QCL reference for the reception of the PDCCH DMRS, which is identical to the RSs in the activated TCI state(s).

Beam recovery and radio link monitoring (RLM) are related to beam management. Radio link monitoring is a well-known procedure from LTE, where the UE is monitoring the quality of its serving cell to determine if the NW is unable to reach the UE. In LTE, the UE performs measurements on the CRS, and uses these measurements to estimate what the BLER of PDCCH would be if it were transmitted. In practice, the UE estimates the channel quality, e.g., Signal-to-Interference-plus-Noise ratio (SINR). The UE then triggers an internal out-of-sync (OOS) event if the BLER of a PDCCH received at this SINR level would be higher than 10%. When the UE has detected a certain number of consecutive OOS indications, the UE starts the T310 timer, and when the T310 expires, the UE declares radio link failure (RLF). Radio link failure is a severe failure case, where the UE essentially has no coverage from its serving cell. One situation where this may happen is if the network has failed to perform a handover to a new cell. After declaring RLF, the UE can establish connection with the new cell. In some cases, the UE has simply moved out of coverage, in which case the UE is unable to establish connection to a new cell.

In NR, RLM is similar to the LTE RLM. The only difference is that since there is no CRS, the UE uses another RS to perform RLM. In NR, the UE can be configured to use either a set of SS/PBCH blocks and/or a set of periodic CSI-RSs to perform RLM. L1 in the UE would generate an OOS indication when the quality of all the configured RSs fall below a certain threshold; otherwise an IS indication would be generated. The beam recovery procedure was designed to handle a situation where the beams of the UE and the gNB have become misaligned, and normal beam management procedures have become ineffective. During beam recovery, the UE initiates a realignment of the beams, by performing either contention-based or contention-free random access. One situation where this may happen is when the beam management algorithms have failed to update the active TCI state, leading to that the UE's Rx beam is misaligned.

To discover the beam misalignment, the UE will monitor a set of periodic reference signals, either SS/PBCH blocks or CSI-RS. The monitoring procedure is similar to RLM, but a different set of reference signals may be used. Also, for beam monitoring, there is no generation of in-sync indications, only out-of-sync indications are generated. The MAC layer in the UE interprets the absence of an out-of-sync indication as an in-sync indication. The UE generates an out-of-sync indication if all the monitored RSs fall below a certain threshold.

RLM and beam monitoring have some similarities: both procedures try to detect when the channel quality is below a certain threshold. Once the channel quality is below the threshold, the UE determines that it is unreachable by the NW and takes action. The main difference is the actions taken: for beam recovery, the UE quickly initiates a random access procedure in the serving cell. For RLM, the UE starts the T310 timer, and once the timer expires, the UE will declare radio link failure, perform cell reselection, and RRC reestablishment. The NW configures the UE to independently perform RLM and/or beam recovery, and there is currently no relation between the procedures. In particular, in case the UE attempts to perform beam recovery, but fails to find any suitable RS in the serving cell, the UE will not declare RLF: RLF will be triggered once T310 expires.

The number of RSs (X) the UE can be configured to monitor for RLM depends on the frequency band:

For carrier frequencies below 3 GHz, X=2;
For carrier frequencies between 3 GHz and 6 GHz, X=4;
For carrier frequencies above 6 GHz, X=8.

For beam monitoring, the UE can be configured with 1 or 2 RSs. The underlying idea is that each RSs is associated with one CORESET.

If RSs for beam failure detection are not explicitly configured, the UE defaults to use the RSs which the UE uses as QCL reference for the reception of the PDCCH DMRS, which is identical to the RSs in the activated TCI state(s). If RSs for RLM are not explicitly configured, the UE defaults to use the RSs which the UE uses as QCL reference for the reception of the PDCCH DMRS, which is identical to the RSs in the activated TCI state(s).

How the UE combines the two RSs in one TCI state is still unclear, but it is likely that it will be up to UE implementation.

The UE derives the RS from the active TCI state of the CORESET(s): as the UE moves, different TCI states are activated for the CORESET(s), leading to an implicit update of the RSs used for RLM and beam monitoring.

As previously described, BFR is basically triggered when certain conditions are fulfilled. Below we show the configuration of BFR, which is very similar to a RACH configuration:

BeamFailureRecoveryConfig

The BeamFailureRecoveryConfig IE is used to configure the UE with RACH resources and candidate beams for beam failure recovery in case of beam failure detection. See also TS 38.321 [3], clause 5.1.1.

BeamFailureRecoveryConfig Information Element

```
-- ASN1START
-- TAG-BEAMFAILURERECOVERYCONFIG-START
BeamFailureRecoveryConfig ::=                         SEQUENCE {
    rootSequenceIndex-BFR                             INTEGER (0..137)
OPTIONAL,   -- Need M
    rach-ConfigBFR                     RACH-ConfigGeneric
OPTIONAL,   -- Need M
    rsrp-ThresholdSSB                        RSRP-Range
OPTIONAL,   -- Need M
    candidateBeamRSList                        SEQUENCE
(SIZE(1..maxNrofCandidateBeams)) OF PRACH-ResourceDedicatedBFR
OPTIONAL,   -- Need M
    ssb-perRACH-Occasion                       ENUMERATED {oneEighth, oneFourth,
oneHalf, one, two, four, eight, sixteen}   OPTIONAL,   -- Need M
    ra-ssb-OccasionMaskIndex                    INTEGER (0..15)
OPTIONAL,   -- Need M
    recovery Search SpaceId                     SearchSpaceId
OPTIONAL,   -- Cond CF-BFR
    ra-Prioritization                  RA-Prioritization
OPTIONAL,   -- Need R
    beamFailureRecoveryTimer                   ENUMERATED {ms10, ms20, ms40, ms60,
ms80, ms100, ms150, ms200}                         OPTIONAL,   -- Need M
    ...,
    [[
    msg1-SubcarrierSpacing-v1530                       SubcarrierSpacing
OPTIONAL   -- Need M
    ]]
}
PRACH-ResourceDedicatedBFR ::=                        CHOICE {
    ssb                          BFR-SSB-Resource,
    csi-RS                       BFR-CSIRS-Resource
}
BFR-SSB-Resource ::=                         SEQUENCE {
    ssb                   SSB-Index,
    ra-PreambleIndex             INTEGER (0..63),
    ...
}
BFR-CSIRS-Resource ::=                        SEQUENCE {
    csi-RS                  NZP-CSI-RS-ResourceId,
    ra-OccasionList                SEQUENCE (SIZE(1..maxRA-OccasionsPerCSIRS))
OF INTEGER (0..maxRA-Occasions-1) OPTIONAL, -- Need R
    ra-PreambleIndex             INTEGER (0..63)
OPTIONAL,   -- Need R
    ...
}
-- TAG-BEAMFAILURERECOVERYCONFIG-STOP
-- ASN1STOP
```

For both RLM and beam monitoring, the UE monitors UE-specifically configured periodic RS resource(s) to estimate the quality of a hypothetical PDCCH. For both RLM and beam monitoring, there are two options:

The RS is not reconfigured in the UE as it moves: the NW transparently updates the Tx beam of the RS. This would require a CSI-RS, which DL beam can be dynamically updated.

BeamFailureRecoveryConfig field descriptions beamFailureRecoveryTimer
Timer for beam failure recovery timer. Upon expiration of the timer the UE does not use CFRA for BFR. Value in ms. ms10 corresponds to 10 ms, ms20 to 20 ms, and so on.
candidateBeamRSList -continued

| BeamFailureRecoveryConfig field descriptions |
| --- |
| A list of reference signals (CSI-RS and/or SSB) identifying the candidate beams for recovery and the associated RA parameters. The network configures these reference signals to be within the linked DL BWP (i.e., within the DL BWP with the same bwp-Id) of the UL BWP in which the BeamFailureRecoveryConfig is provided. msg1-SubcarrierSpacing Subcarrier spacing for contention free beam failure recovery. Only the values 15 or 30 kHz (<6 GHz), 60 or 120 kHz (>6 GHz) are applicable. See TS 38.211 [16], clause 5.3.2. rsrp-ThresholdSSB L1-RSRP threshold used for determining whether a candidate beam may be used by the UE to attempt contention free Random Access to recover from beam failure. (see TS 38.213 [13], clause 6) ra-prioritization Parameters which apply for prioritized random access procedure for BFR (see TS 38.321 [3], clause 5.1.1). ra-ssb-OccasionMaskIndex Explicitly signalled PRACH Mask Index for RA Resource selection in TS 38.321 [3]. The mask is valid for all SSB resources rach-ConfigBFR Configuration of contention free random access occasions for BFR recoverySearchSpaceId Search space to use for BFR RAR. The network configures this search space to be within the linked DL BWP (i.e., within the DL BWP with the same bwp-Id) of the UL BWP in which the BeamFailureRecoveryConfig is provided. The CORESET associated with the recovery search space cannot be associated with another search space. ssb-perRACH-Occasion Number of SSBs per RACH occasion for CF-BFR (L1 parameter 'SSB-per-rach-occasion') |

1.8 Split Architecture Background

In Rel-15 work, a split architecture of RAN is introduced for the Next Generation RAN (NG-RAN). In the split architecture option, the RAN protocol stack functionality is separated in different parts. The CU-CP is expected to handle the RRC layer, the CU-UP will handle the PDCP layer and the DU will handle the RLC, MAC and PHY layer of the protocol stack. In some further split the DU can have separated unit that handles the PHY parts separately compared to RLC and MAC layers that are handled in a DU.

FIG. 9 illustrates an example of a split architecture. As different units handle different protocol stack functionalities, there will be a need for inter-node communication between the DU and CU. This is achieved via F1-C interface related to control plane signaling and via F1-U interface related to user plane signaling.

In the context of the present disclosure, that would mean that there may be different functions in different locations responsible for the lower layer functionalities, like RLM, BFD, BFR and RACH (e.g. in the DU where RLC/MAC/PHY are terminated), and higher layer functionalities like handling of Self-Organizing Network (SON) related reports (e.g., RLF reports), RLF parameter settings, or MRO parameters (e.g., thresholds for triggering measurement reports and handovers).

SUMMARY

According to certain embodiments, a method is performed by a network node comprising a CU. The method comprises receiving assistance information for mobility robustness optimization and forwarding the assistance information, configuration changes related to mobility robustness optimization, or both to a DU or to a second CU.

According to certain embodiments, a network node comprising a CU comprises processing circuitry configured to receive assistance information for mobility robustness optimization, and to forward the assistance information, configuration changes related to mobility robustness optimization, or both to a DU or to a second CU. In certain embodiments, the network node further comprises power supply circuitry configured to supply power to the network node.

According to certain embodiments, a computer program comprises instructions that, when executed on a computer, perform steps comprising receiving assistance information for mobility robustness optimization and forwarding the assistance information, configuration changes related to mobility robustness optimization, or both to a DU or to a second CU.

In certain embodiments, the above-described method, network node, and/or computer program may include one or more additional features. For example, the above-described method, network node, and/or computer program may include one or more of the following features:

In certain embodiments, the assistance information comprises a radio link failure report.

In certain embodiments, the assistance information comprises a handover report.

In certain embodiments, a failure cause is determined based on the received assistance information.

In certain embodiments, a location where a failure originated is determined based on the received assistance information. For example, in certain embodiments, the location where the failure originated is determined based on one or more of: the failure cause determined based on the received assistance information; and location information provided in the assistance information.

In certain embodiments, the assistance information, the configuration changes related to mobility robustness optimization, or both are forwarded to the location where the failure originated.

In certain embodiments, the assistance information indicates that a failure may have originated in a cell of a DU associated with the CU, and the forwarding comprises forwarding the assistance information, the configuration changes related to mobility robustness optimization, or both to the DU comprising the cell where the failure may have originated. In certain embodiments, a mapping is determined between a cell identifier and the DU.

In certain embodiments, configuration changes related to mobility robustness optimization are determined based on the received assistance information.

In certain embodiments, the assistance information is received from a wireless device.

In certain embodiments, the assistance information is received from another CU (e.g., another CU of the same network node or a CU of another network node).

Certain embodiments select a portion of the assistance information to forward and the selected portion of the assistance information is forwarded to the DU or to the second CU.

According to certain embodiments, a method is performed by a network node comprising a DU. The method comprises receiving assistance information for mobility robustness optimization. The assistance information indicates that a failure may have originated in a cell of the DU. The method further comprises performing one or more parameter changes in one or more functions handled by the DU.

According to certain embodiments, a network node comprising a DU comprises processing circuitry configured to receiving assistance information for mobility robustness optimization. The assistance information indicates that a failure may have originated in a cell of the DU. The processing circuitry is further configured to perform one or more parameter changes in one or more functions handled by the DU. In certain embodiments, the network node further comprises power supply circuitry configured to supply power to the network node.

According to certain embodiments, a computer program comprises instructions that, when executed on a computer, perform steps comprising receiving assistance information for mobility robustness optimization. The assistance information indicates that a failure may have originated in a cell of the DU. The steps further comprise performing one or more parameter changes in one or more functions handled by the DU.

In certain embodiments, the above-described method, network node, and/or computer program may include one or more additional features. For example, the above-described method, network node, and/or computer program may include one or more of the following features:

In certain embodiments, the assistance information is received from a CU.

In certain embodiments, the assistance information comprises a radio link failure report.

In certain embodiments, the one or more functions may comprise one or more of: random access; beam failure detection; beam failure recovery; radio link monitoring; cell quality derivation; beam management; and one or more other functions affected by beamforming parameters.

In certain embodiments, a failure cause is determined based on the received assistance information.

In certain embodiments, a location where a failure originated is determined based on the received assistance information. In certain embodiments, the location where the failure originated is determined based on one or more of: the failure cause determined based on the received assistance information; and location information provided in the assistance information.

In certain embodiments, a mapping is determined between a cell identifier and the DU.

In certain embodiments, parameter changes performed in the one or more functions handled by the DU are indicated to the CU.

BRIEF DESCRIPTION OF THE FIGURES

For a more complete understanding of the disclosed embodiments and their features and advantages, reference is now made to the following description, taken in conjunction with the accompanying drawings, in which.

DETAILED DESCRIPTION

Figure 1:
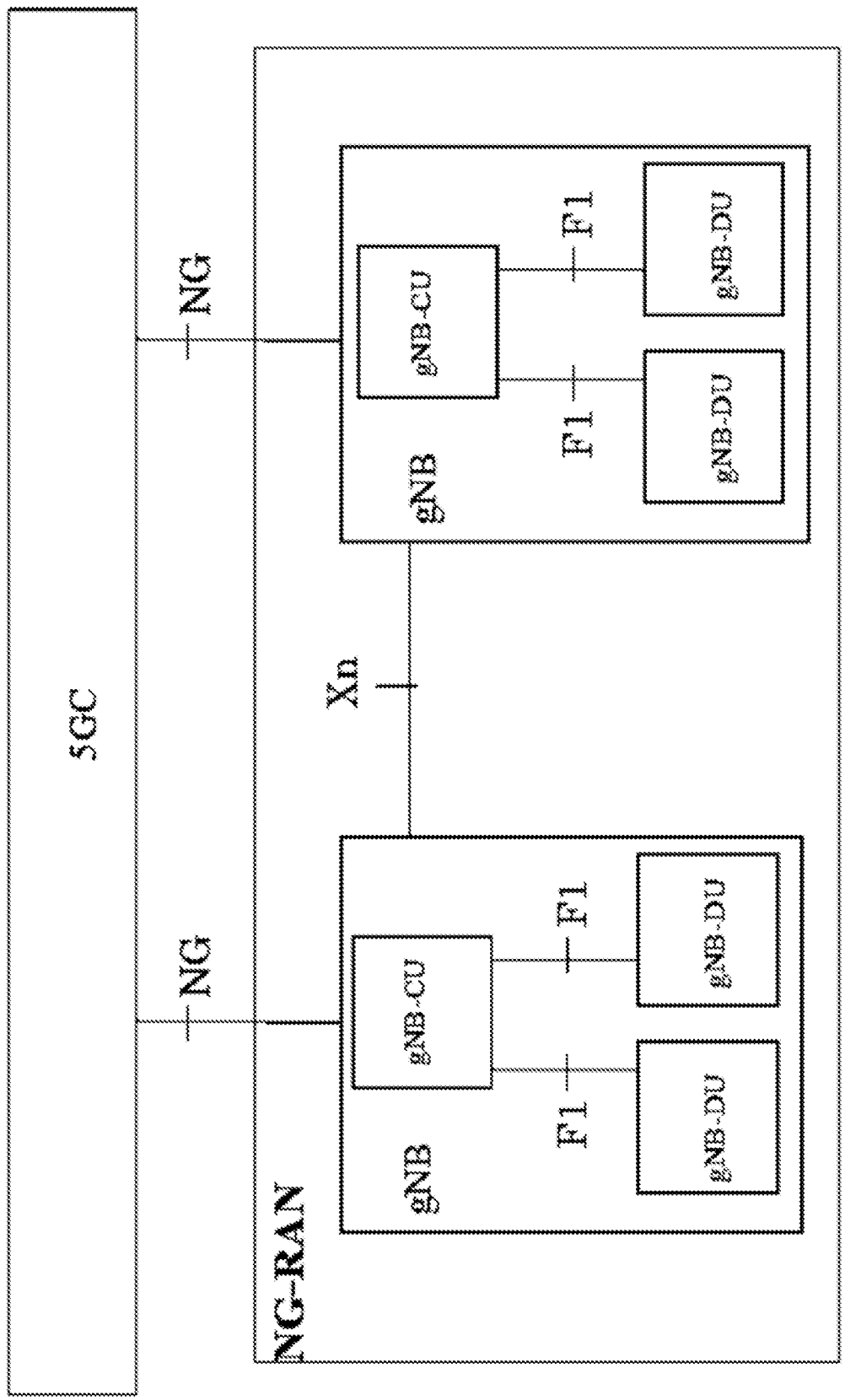
FIG. 1 illustrates an example of a 5G RAN Architecture, in accordance with certain embodiments.
Figure 2:
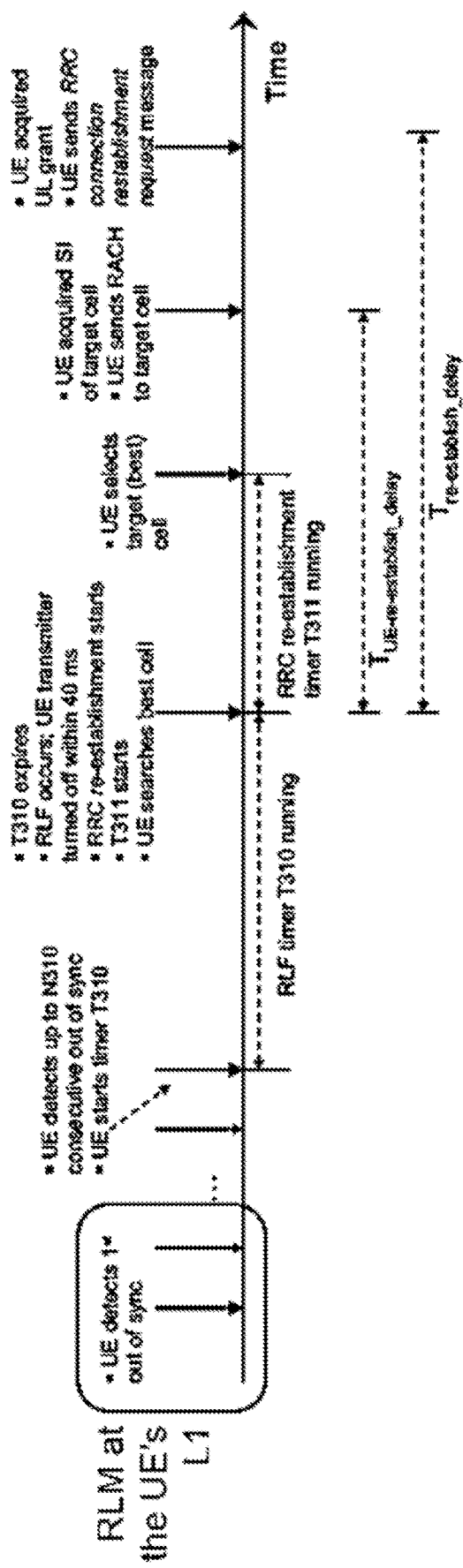
FIG. 2 illustrates an example of higher layer RLF related procedures in LTE, in accordance with certain embodiments.
Figure 3:
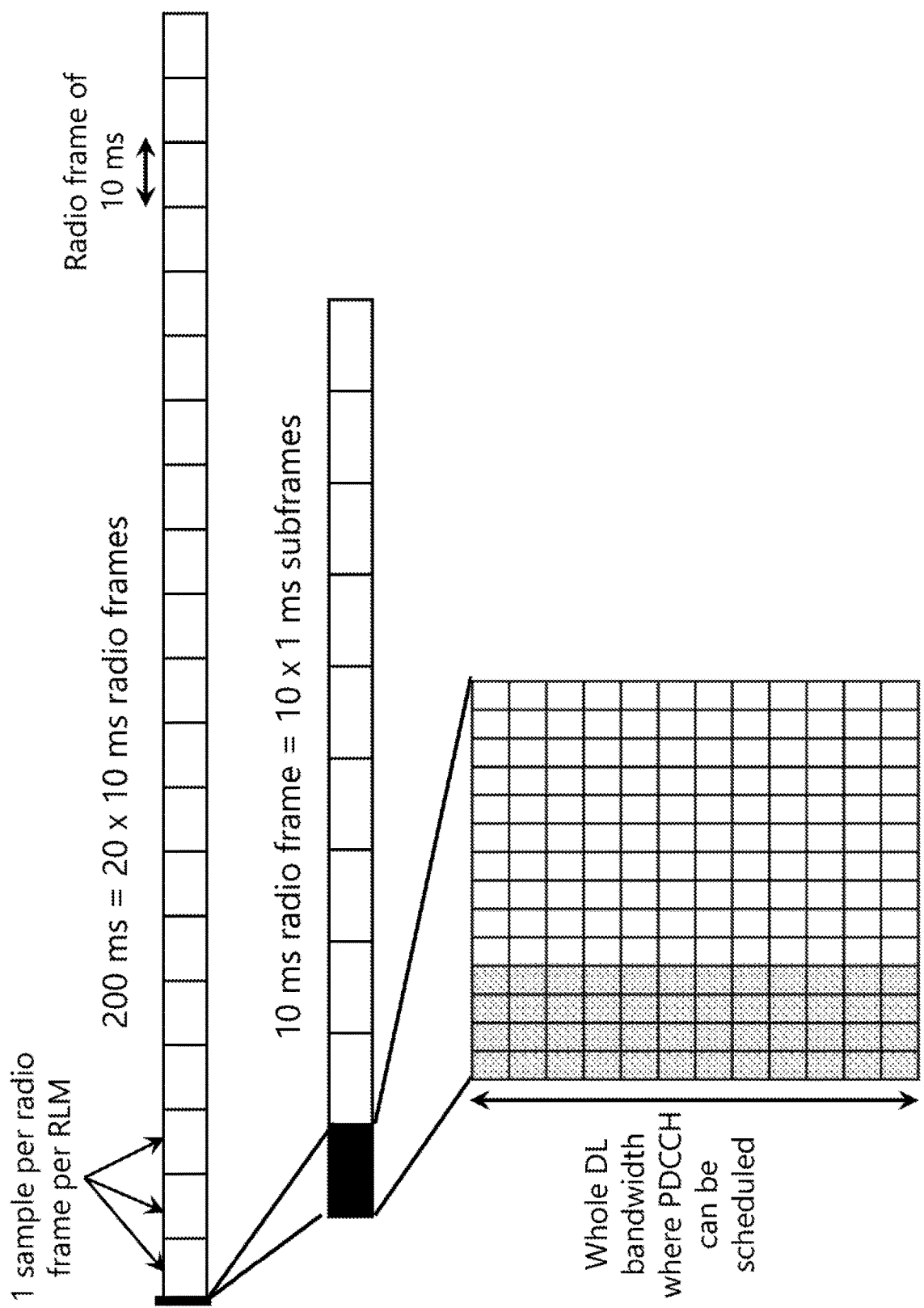
FIG. 3 illustrates an example of a PDCCH than can be scheduled anywhere over the whole downlink transmission bandwidth, in accordance with certain embodiments.
Figure 4:
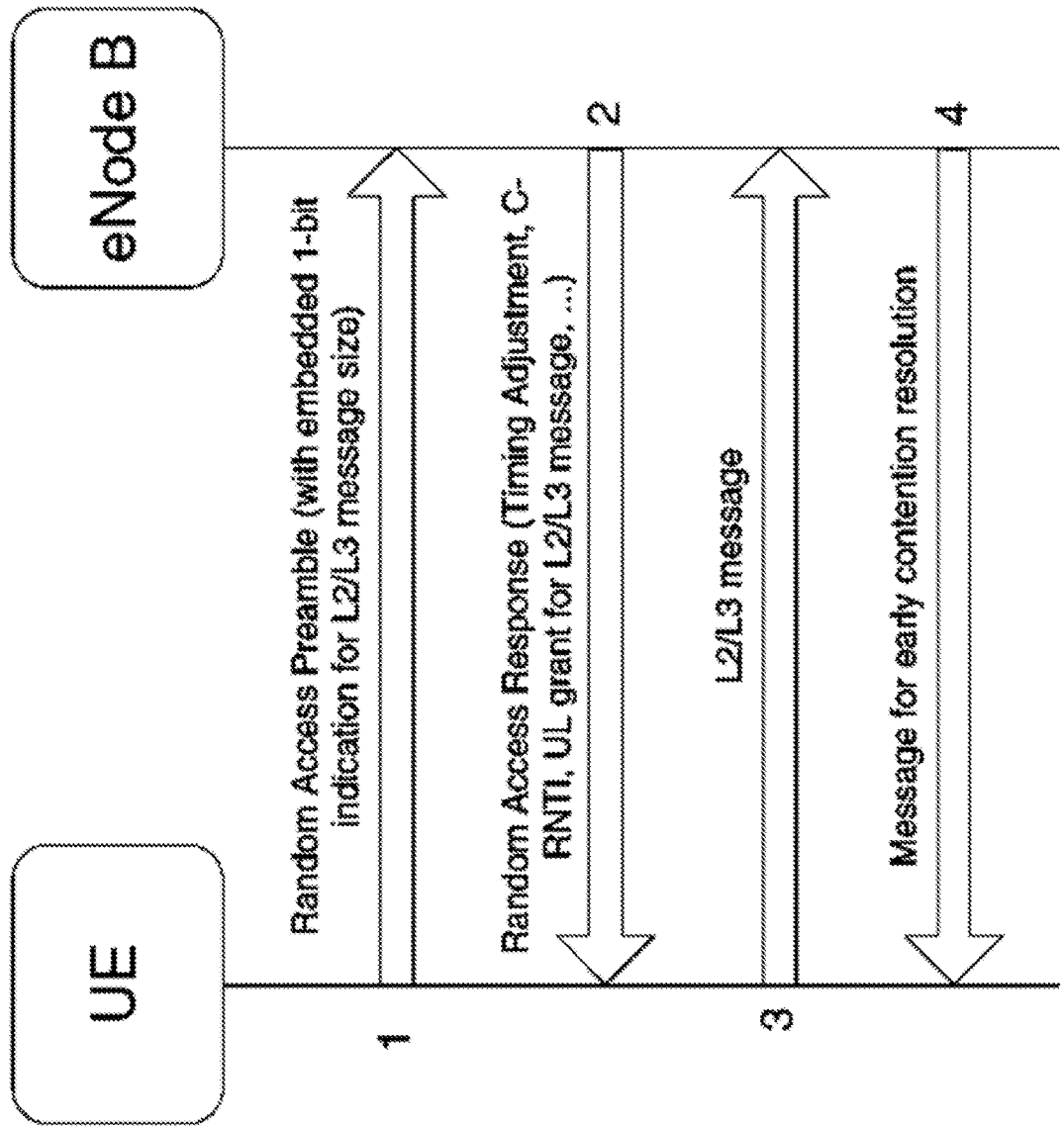
FIG. 4 illustrates an example of a CBRA procedure, in accordance with certain embodiments.
Figure 5A:
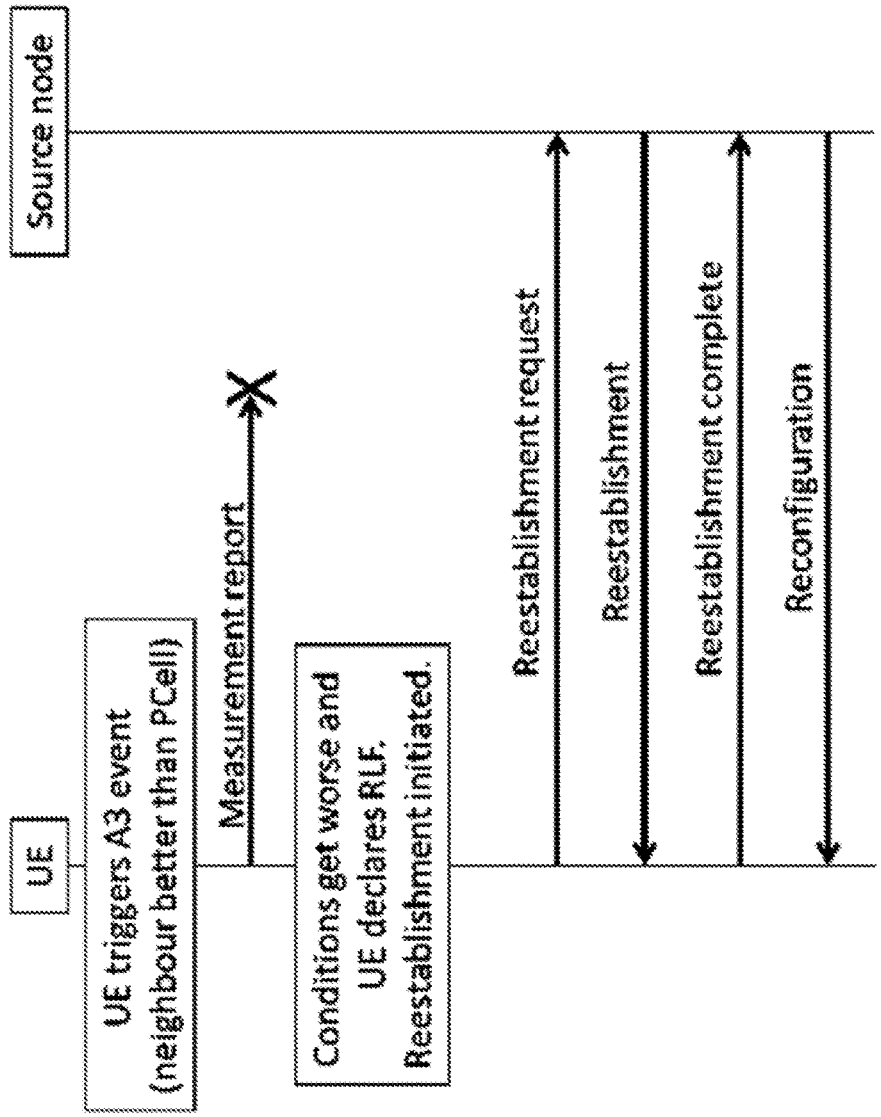
FIG. 5a illustrates an example of a signal flow in which a handover failure occurs.
Figure 5B:
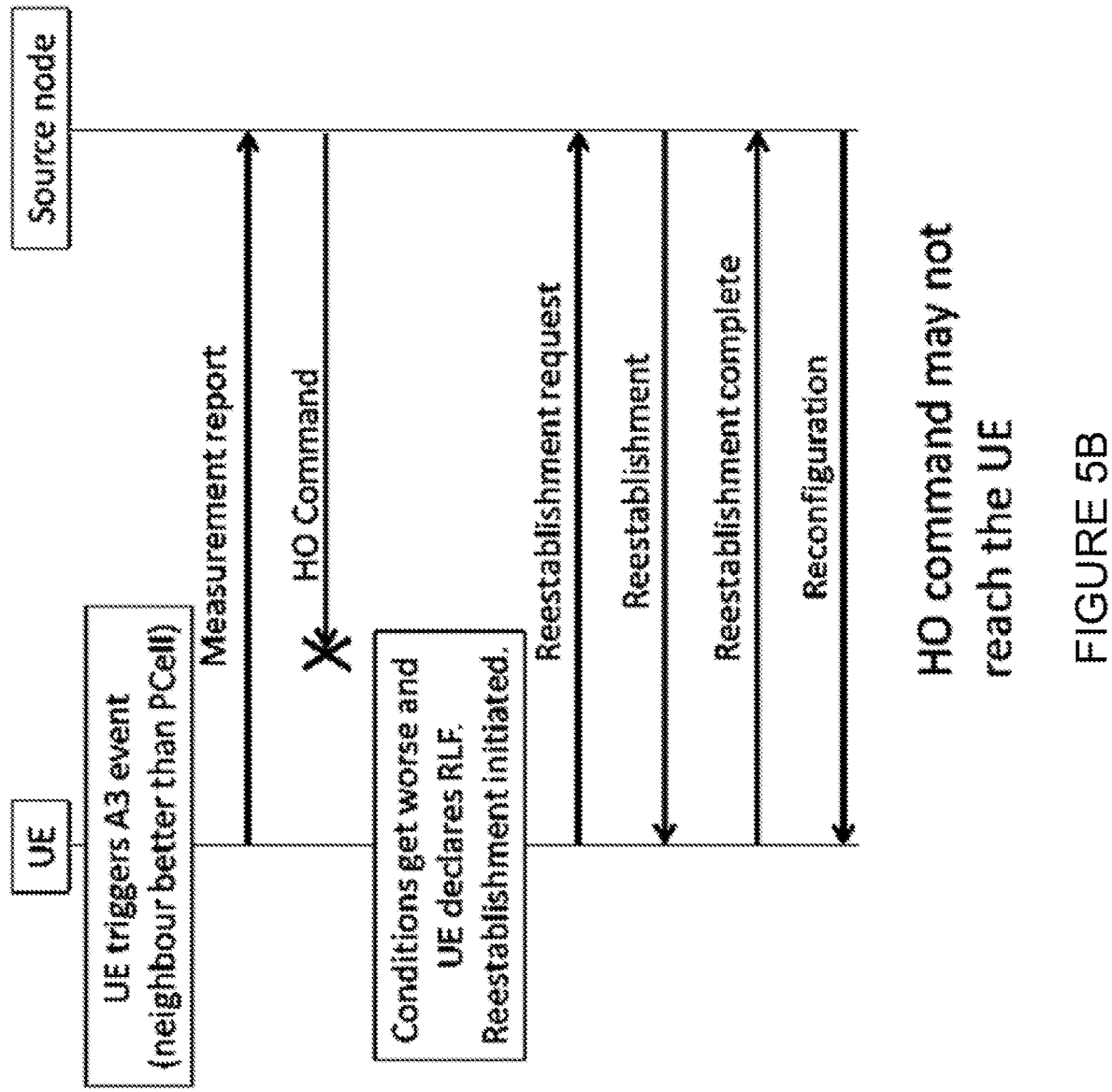
FIG. 5b illustrates an example of a signal flow in which a handover failure occurs, in accordance with certain embodiments.
Figure 6:
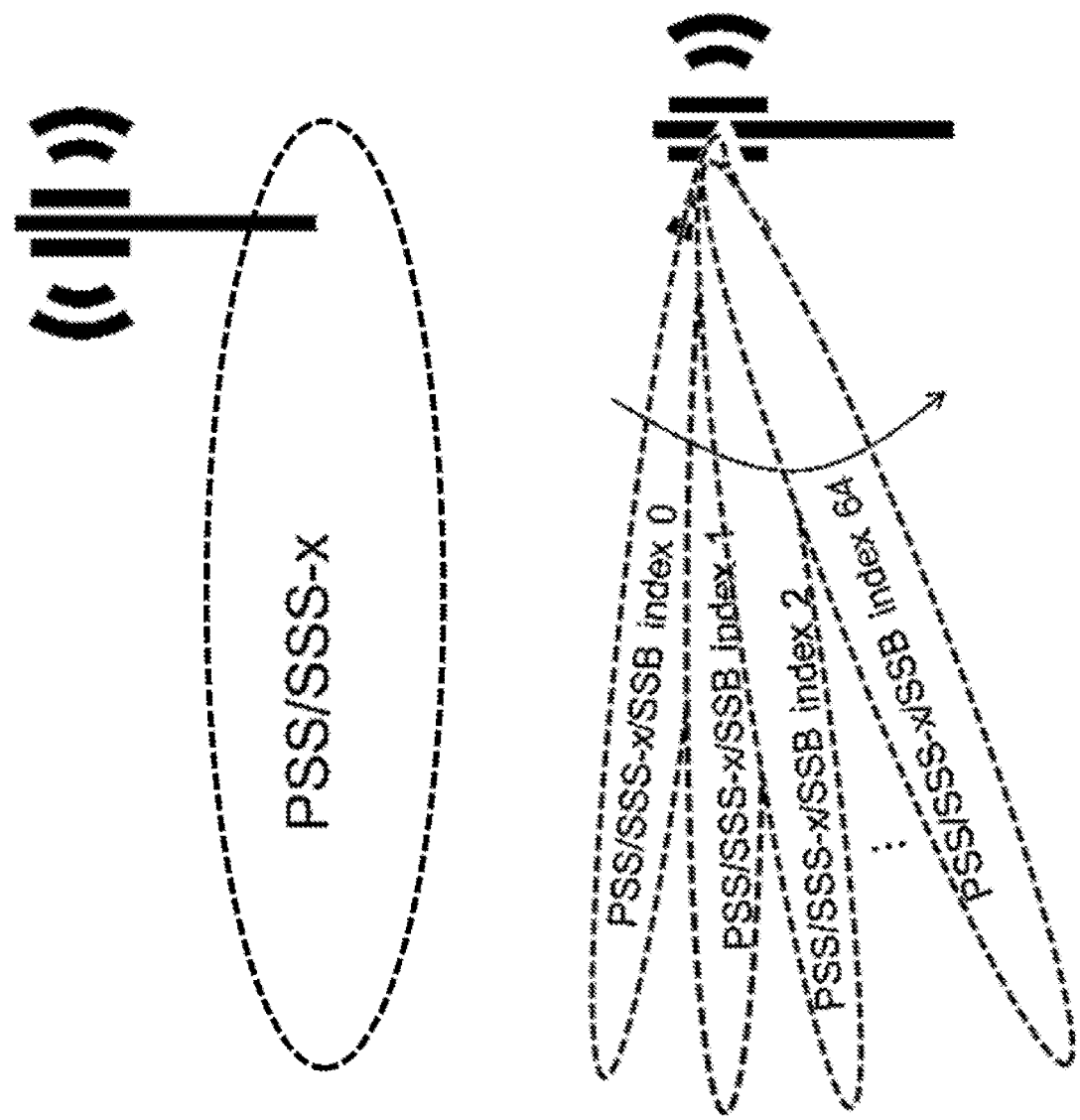
FIG. 6 illustrates an example of an SSB transmission by a network node, in accordance with certain embodiments.
Figure 7:
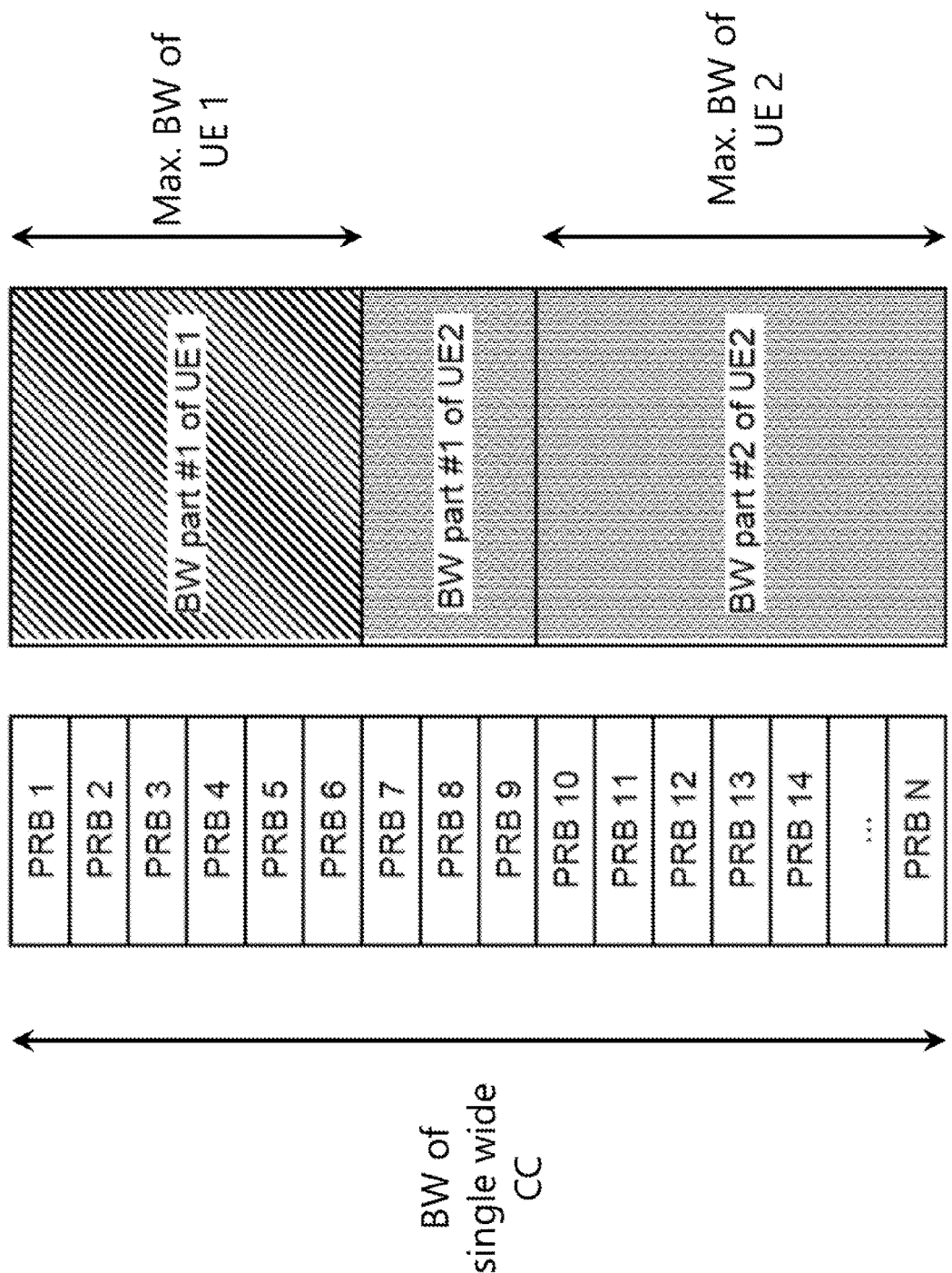
FIG. 7 illustrates an example configuration of bandwidth parts, in accordance with certain embodiments.
Figure 8:
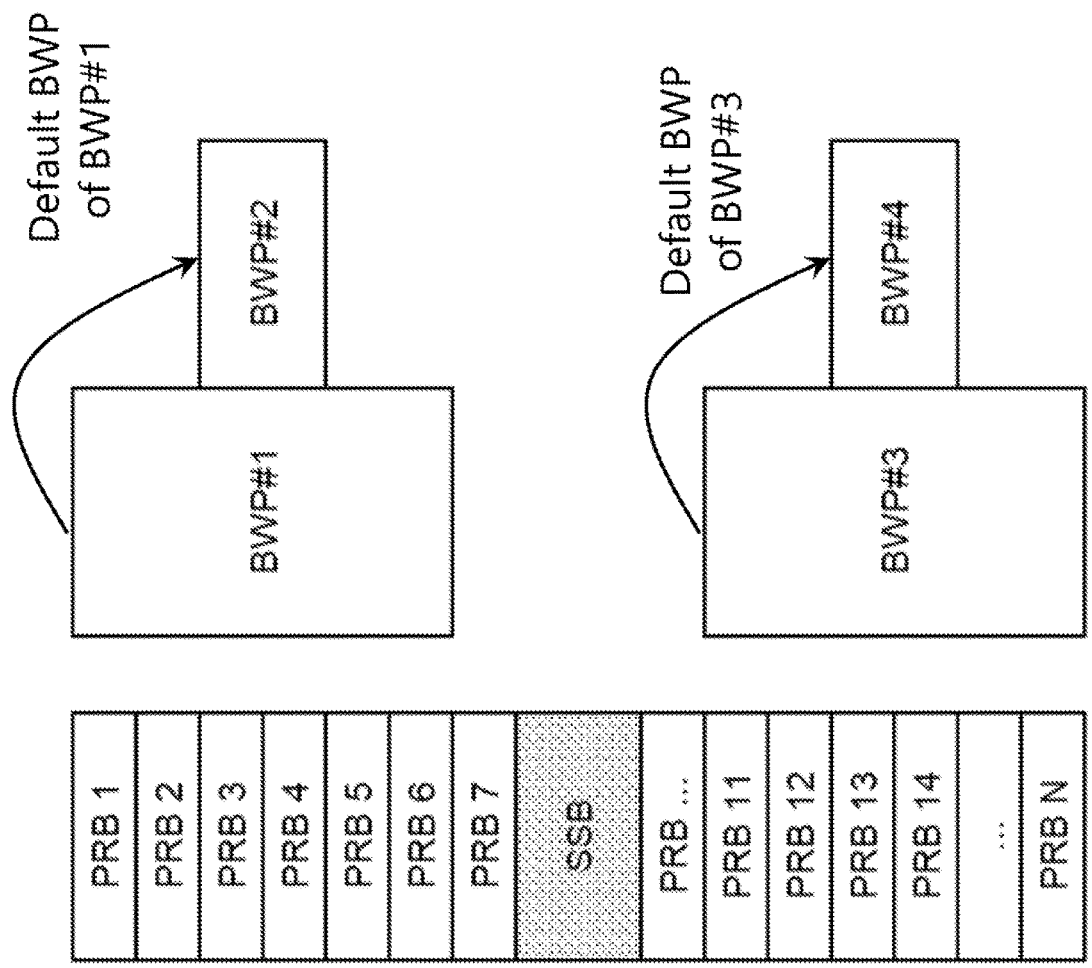
FIG. 8 illustrates an example configuration of bandwidth parts, in accordance with certain embodiments.
Figure 9:
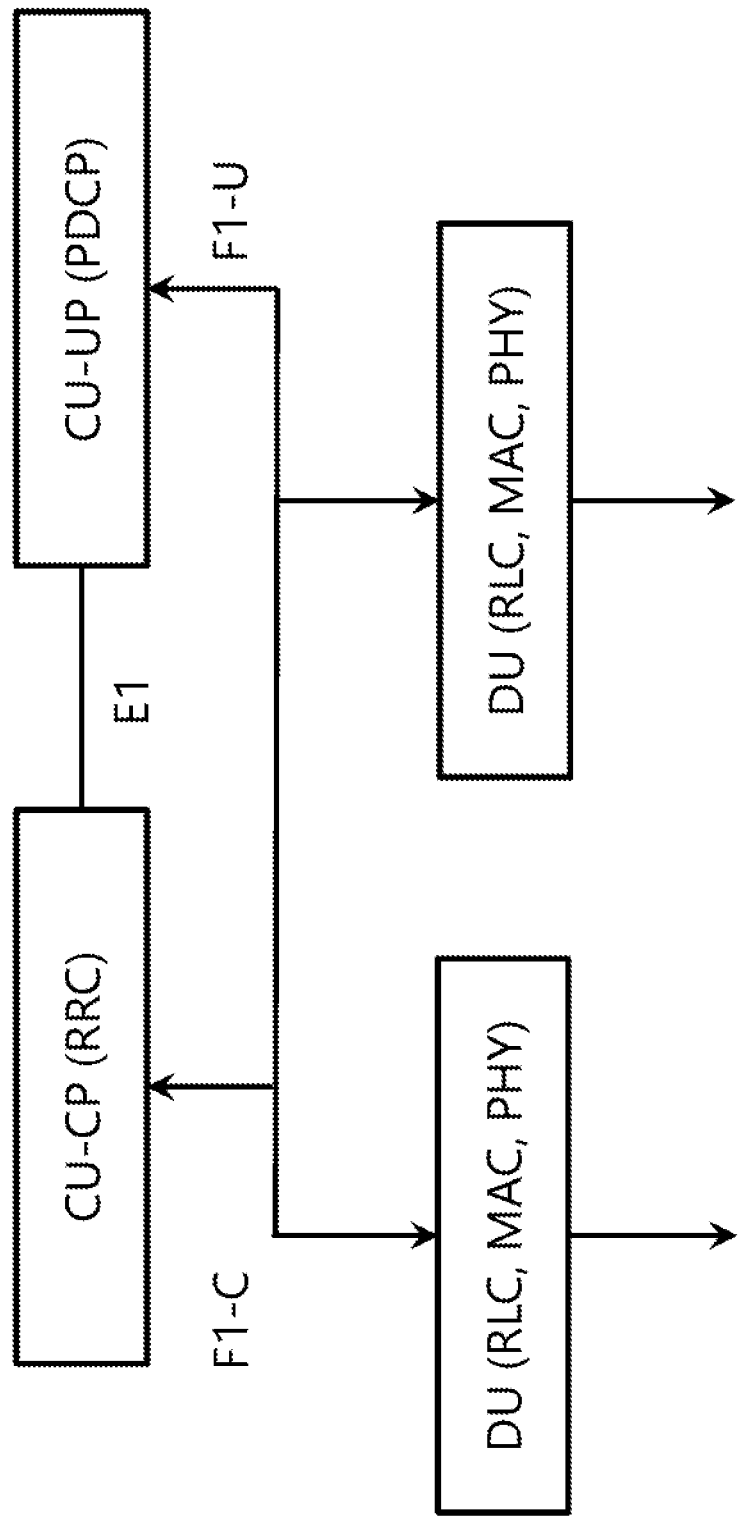
FIG. 9 illustrates a split architecture that separates functionality of a RAN protocol stack into different parts, in accordance with certain embodiments.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

There currently exist certain challenge(s). One problem is the lack of observability in the exact network location handling the function to be optimized provided in the existing MRO solutions in LTE if applied to NR. That comes from new issues that may occur in NR such as: misconfiguration of RLM, misconfiguration of cell quality derivation and beam reporting parameters, misconfiguration of beam failure detection and beam recovery and, in more general terms, the effects of beam-based monitoring (i.e., based on beam measurements) in NR in different procedures.
Misconfiguration of RLM Differently from LTE, RLM is a highly configurable procedure in NR. First, the network may choose between two different RLM mechanisms (i.e., either explicit configuration of RSs to be monitored (i.e., downlink beams to be monitored, and RS resources signals, like SSBs and/or CSI-RSs), or an implicit configuration based on TCI states and QCLs RSs according to the UE's CORESET configuration(s)), which in turn have their own configuration. Other different parameters are also configurable, regardless of the method above, such as the BLER threshold for the generation of OOS and IS indication from L1 to upper layers so that RLF may be triggered when a radio link problem is detected.

Related to that, the first problem that the present disclosure aims to solve is the lack of observability when an RLF is triggered due to a problem related to a misconfigured RLM functionality such as the usage of a method not suitable for some scenarios (e.g., network uses a TCI state based method, while it could have used an explicit configuration of RSs, the network has configured too few RLM resources to save UE power, and/or network has configured too many RLM resources unnecessarily and not matching the PDCCH coverage, etc.).

As RLF aims to counter-act failed mobility decisions, RLM shall detect issues in the serving cell when L1 does not perform mobility properly. However, with an RLM misconfiguration the opposite may occur: the UE may have a very good cell coverage (e.g., because cell quality is derived from its whole cell set of SSBs and best beams/SSB is quite good), but, if the proper resources are not configured for RLM (e.g., because beam management is not operating as expected), the UE may not trigger measurement reports (and network may not trigger handovers, because serving cell is actually good), but the UE may trigger RLF. In other words, there may be an RLF even if the UE is still under cell coverage if RLM is not properly configured.

Figure 10:
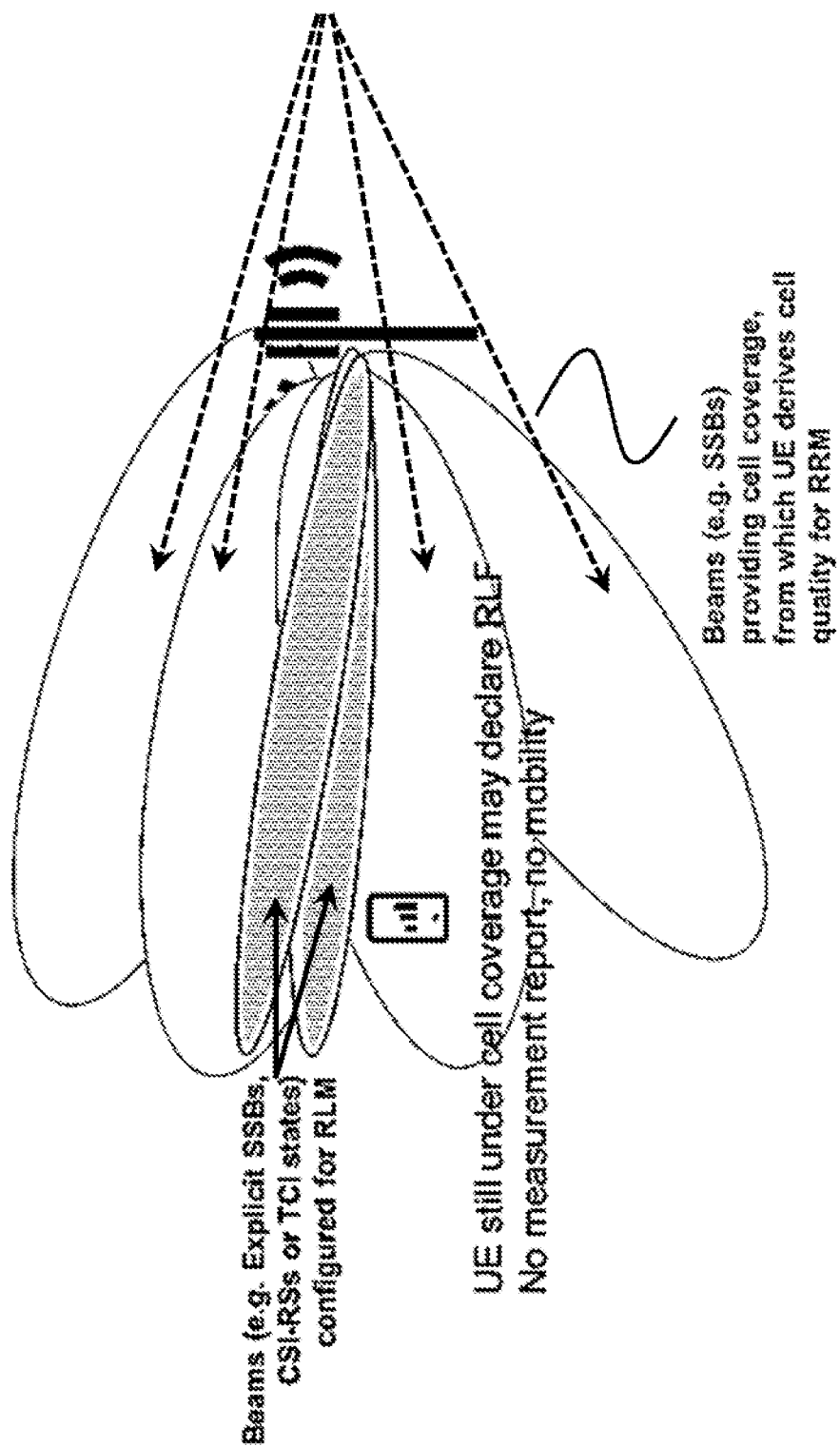
FIG. 10 illustrates an example of an RLF in a good cell, in accordance with certain embodiments.

Such issue could be named an RLF from good cell or a too early RLF. FIG. 10 illustrates an example of such a scenario.

Currently, for MRO related problems, the network may be assisted by RLF reports, where the UE logs information when a failure has occurred and a cause value (i.e., what has caused the failure), which may include measurements performed for RRM purposes, as shown below:

```
RLF-Report-r9 ::=                    SEQUENCE {
    measResultLastServCell-r9           SEQUENCE {
        rsrpResult-r9                       RSRP-Range,
        rsrqResult-r9                       RSRQ-Range           OPTIONAL
    },
    measResultNeighCells-r9             SEQUENCE{
        measResultListEUTRA-r9              MeasResultList2EUTRA-r9
    OPTIONAL,
        measResultListUTRA-r9               MeasResultList2UTRA-r9
    OPTIONAL,
        measResultListGERAN-r9              MeasResultListGERAN
    OPTIONAL,
        measResultsCDMA2000-r9              MeasResultList2CDMA2000-r9
    OPTIONAL
    }  OPTIONAL,
    ...,
    [[  locationInfo-r10                LocationInfo-r10         OPTIONAL,
        failedPCellId-r10                   CHOICE {
            cellGlobalId-r10                    CellGlobalIdEUTRA,
            pci-arfcn-r10                       SEQUENCE {
                physCellId-r10                      PhysCellId,
                carrierFreq-r10                     ARFCN-ValueEUTRA
            }
        }                                                        OPTIONAL,
        reestablishmentCellId-r10       CellGlobalIdEUTRA
    OPTIONAL,
        timeConnFailure-r10             INTEGER (0..1023)
    OPTIONAL,
        connectionFailureType-r10       ENUMERATED {rlf, hof}
    OPTIONAL,
        previousPCellId-r10             CellGlobalIdEUTRA
    OPTIONAL
    ]]
,
```

```
[[  failedPCellId-v1090          SEQUENCE {
    carrierFreq-v1090            ARFCN-ValueEUTRA-v9e0
                                                           OPTIONAL
  }
]],
[[  basicFields-r11              SEQUENCE {
    c-RNTI-r11                   C-RNTI,
    rlf-Cause-r11                ENUMERATED {
                                   t310-Expiry, randomAccessProblem,
                                   rlc-MaxNumRetx, t312-Expiry-r12},
    timeSinceFailure-r11         TimeSinceFailure-r11
                                                           OPTIONAL,
  }
  previousUTRA-CellId-r11        SEQUENCE {
    carrierFreq-r11              ARFCN-ValueUTRA,
    physCellId-r11               CHOICE {
      fdd-r11                      PhysCellIdUTRA-FDD,
      tdd-r11                      PhysCellIdUTRA-TDD
    },
    cellGlobalId-r11             CellGlobalIdUTRA          OPTIONAL
                                                           OPTIONAL,
  }
  selectedUTRA-CellId-r11        SEQUENCE {
    carrierFreq-r11              ARFCN-ValueUTRA,
    physCellId-r11               CHOICE {
      fdd-r11                      PhysCellIdUTRA-FDD,
      tdd-r11                      PhysCellIdUTRA-TDD
    }
  }                                                        OPTIONAL
]],
[[  failedPCellId-v1250          SEQUENCE {
    tac-FailedPCell-rl2          TrackingAreaCode
  }                                                        OPTIONAL,
  measResultLastServCell-v1250 RSRQ-Range-v1250
OPTIONAL,
  lastServCellRSRQ-Type-r12      RSRQ-Type-r12
OPTIONAL,
  measResultListEUTRA-v1250      MeasResultList2EUTRA-v1250
OPTIONAL
]],
[[  drb-EstablishedWithQCI-1-rl3   ENUMERATED {qci1}
OPTIONAL
]],
[[  measResultLastServCell-v1360   RSRP-Range-v1360
OPTIONAL
]],
[[  logMeasResultListBT-r15      LogMeasResultListBT-r15   OPTIONAL,
    logMeasResultListWLAN-r15    LogMeasResultListWLAN-r15
OPTIONAL
]]
}
RLF-Report-v9e0 ::=              SEQUENCE {
  measResultListEUTRA-v9e0       MeasResultList2EUTRA-v9e0
}
MeasResultList2EUTRA-r9 ::=      SEQUENCE (SIZE (1..maxFreq)) OF
MeasResult2EUTRA-r9
MeasResultList2EUTRA-v9e0 ::=    SEQUENCE (SIZE (1..maxFreq)) OF
MeasResult2EUTRA-v9e0
MeasResultList2EUTRA-v1250 ::=   SEQUENCE (SIZE (1..maxFreq)) OF
MeasResult2EUTRA-v1250
MeasResult2EUTRA-r9 ::=          SEQUENCE {
  carrierFreq-r9                 ARFCN-ValueEUTRA,
  measResultList-r9              MeasResultListEUTRA
}
MeasResult2EUTRA-v9e0 ::=        SEQUENCE {
  carrierFreq-v9e0               ARFCN-ValueEUTRA-v9e0
    OPTIONAL
}
MeasResult2EUTRA-v1250 ::=       SEQUENCE {
  rsrq-Type-r12                  RSRQ-Type-r12             OPTIONAL
}
MeasResultList2UTRA-r9 ::=       SEQUENCE (SIZE (1..maxFreq)) OF
MeasResult2UTRA-r9
MeasResult2UTRA-r9 ::=           SEQUENCE {
  carrierFreq-r9                 ARFCN-ValueUTRA,
  measResultList-r9              MeasResultListUTRA
}
MeasResultList2CDMA2000-r9 ::=   SEQUENCE (SIZE (1..maxFreq)) OF
MeasResult2CDMA2000-r9
```

```
MeasResult2CDMA2000-r9 ::=      SEQUENCE {
    carrierFreq-r9                  CarrierFreqCDMA2000,
    measResultList-r9               MeasResultsCDMA2000
}
```

Notice that one information that is logged is the RRM measurements performed at the serving cell (and neighbour cells). That allows the source receiving that report to understand the serving cell quality compared to the neighbors and how it could later adjust its settings so that under certain conditions a measurement report would have been triggered. However, with the new RLM scheme in NR only informing latest RRM measurements when the failure occurred (e.g., serving cell quality) does not reveal at all failures that may be caused by misconfigured RLM parameters e.g. RLM resources.

Misconfiguration of Cell Quality Derivation (CQD) and Beam Reporting Parameters

One difference in NR compared to LTE is the possible usage of different reference signals (SSBs and/or CSI-RSs) for handover decisions (while in LTE only cell-specific reference signals are used for cell quality derivation). Also, the way the UE computes cell quality in NR (Cell Quality derivation procedure) is quite configurable.

In NR, these reference signals for CQD are transmitted in different beams and when more than one beam is used for the transmission of these reference signals, the UE receives these reference signals in different time instances. There are also other parameters as in LTE, but possibly configurable per beam (e.g. filter parameters). In RRC, cell quality derivation is described as follows:

5.3.3 Derivation of Cell Measurement Results

The network may configure the UE to derive RSRP, RSRQ and SINR measurement results per cell associated to NR measurement objects based on parameters configured in the measObject (e.g. maximum number of beams to be averaged and beam consolidation thresholds) and in the reportConfig (rsType to be measured, SS/PBCH block or CSI-RS).

The UE shall:
1> for each cell measurement quantity to be derived based on SS/PBCH block:
    2> if nrofSS-BlocksToAverage in the associated measObject is not configured; or
    2> if absThreshSS-BlocksConsolidation in the associated measObject is not configured; or
    2> if the highest beam measurement quantity value is below or equal to absThreshSS-BlocksConsolidation:
        3> derive each cell measurement quantity based on SS/PBCH block as the highest beam measurement quantity value, where each beam measurement quantity is described in TS 38.215 [9];
    2> else:
        3> derive each cell measurement quantity based on SS/PBCH block as the linear power scale average of the highest beam measurement quantity values above absThreshSS-BlocksConsolidation where the total number of averaged beams shall not exceed nrofSS-BlocksToAverage;
    2> apply layer 3 cell filtering as described in 5.5.3.2;
1> for each cell measurement quantity to be derived based on CSI-RS:
    2> consider a CSI-RS resource to be applicable for deriving cell measurements when the concerned CSI-RS resource is included in the csi-rs-CellMobility including the physCellId of the cell in the CSI-RS-ResourceConfigMobility in the associated measObject;
    2> if nrofCSI-RS-ResourcesToAverage in the associated measObject is not configured; or
    2> if absThreshCSI-RS-Consolidation in the associated measObject is not configured; or
    2> if the highest beam measurement quantity value is below or equal to absThreshCSI-RS-Consolidation:
        3> derive each cell measurement quantity based on applicable CSI-RS resources for the cell as the highest beam measurement quantity value, where each beam measurement quantity is described in TS 38.215 [9];
    2> else:
        3> derive each cell measurement quantity based on CSI-RS as the linear power scale average of the highest beam measurement quantity values above absThreshCSI-RS-Consolidation where the total number of averaged beams shall not exceed nrofCSI-RS-ResourcesToAverage;
    2> apply layer 3 cell filtering as described in 5.5.3.2.

Figure 11:
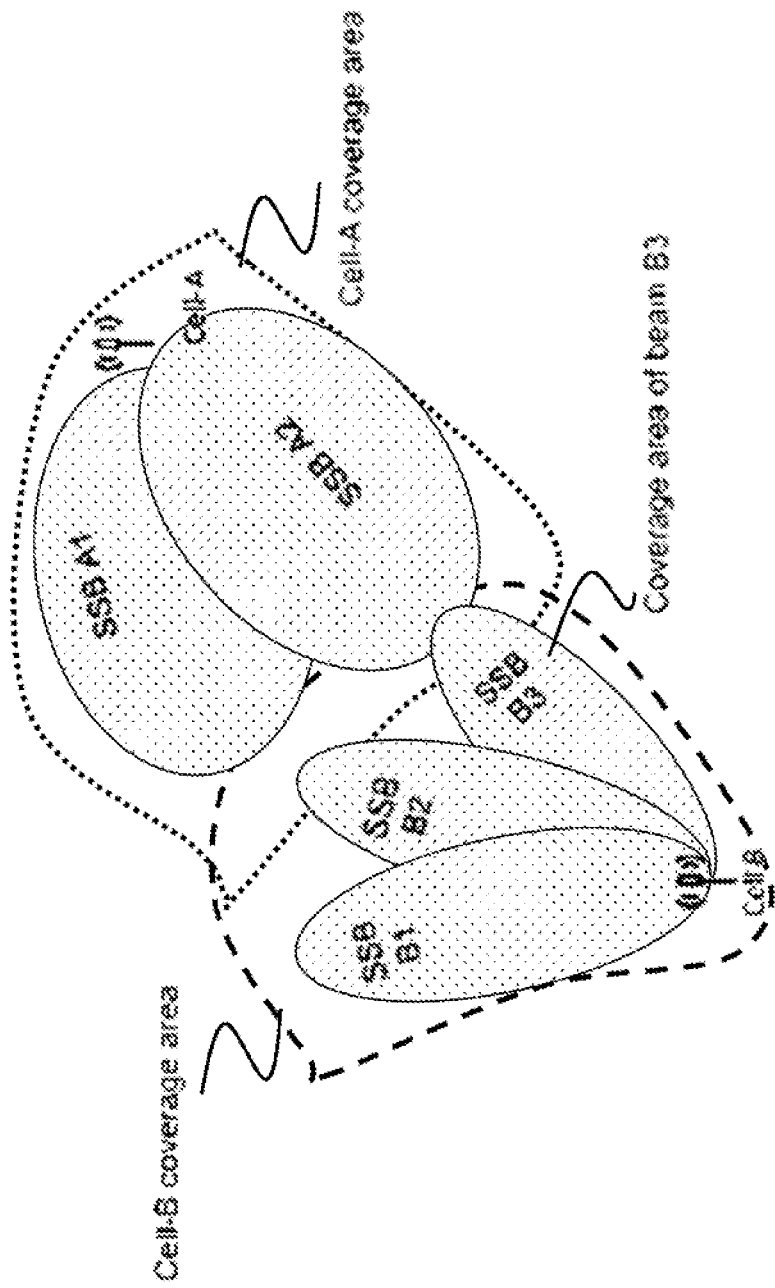
FIG. 11 illustrates an example of cell coverage areas of multiple cells, in accordance with certain embodiments.

In the example of FIG. 11, the cell-A's coverage is identified based on the coverage area of SSB beams A1 and A2 whereas the coverage area of cell-B's is identified based on the coverage area of SSB beams B1, B2 and B3. When the UE computes the cell quality of these cells, then the UE needs to consider the additional configuration as to how to combine these beam level measurements into a cell level measurement. This is captured in the section 5.5.3.3 of the NR RRC specification TS 38.321 [3], as shown above. In a nut shell, the cell quality can be derived either based on the strongest beam or based on the average of up to 'X' strongest beams that are above a threshold 'T'. These options were introduced to prevent potential ping-pong handover related issues that can arise when only the strongest beam is used for cell quality derivation. It was also discussed that having an averaging based configuration can result in a UE being in a sub optimal cell due to the process of averaging. In the end, both options were supported stating that the network can configure the UE with any of these options depending on which option suits best in terms of the radio condition within the cell's coverage area. Therefore, depending how CQD parameter are set, measurement reports may be triggered later or earlier. Triggering too early may lead to too early or pingo-pong handover, while triggering too late may lead to RLF.

Notice also that beam reporting based on L3 filtered beam measurements in connected mode has also been introduced to possibly improve ping-pong handover rate, especially if one trigger measurement reports on best beam quality. In other words, the network would benefit in getting early measurement reports based on best beam cell quality, but also knowing the quality of individual beams (e.g., SSBs and/or CSI-RS) in neighbour cells before taking mobility decisions. For example, a good candidate may be the one with very good best beam, but also where multiple other beams may be detected (known thanks to the reported information). On the other hand, beam report may not always be activated. Hence, the mistuning of beam reporting parameters (together with the mistuning of CQD parameters) may lead to either a solution where the UE unnecessarily has more efforts (in case beam reporting is activated) and larger measurement reports needs to be transmitted; or the network lacks beam observability to take handover decisions. Hence, current MRO solution only based on the existing measurements is not suitable to solve these potential issues. Beam reporting parameters may be number of beams to report (e.g. per cell), thresholds for beam reporting, reporting quantities per beam, etc.

Misconfiguration of Beam Failure Detection and Beam Recovery

In LTE, a RACH failure indicated from lower layers may trigger RLF. The baseline solution for MRO assistance is an indication in the RLF report that RLF was triggered due to RACH failure. However, as described in the background, for NR random access is used when beam failure detection is triggered, in a procedure called Beam Failure Recovery (BFR). Before that is triggered the UE is monitoring a set of configured RLM/BFD resource and, when a condition is fulfilled the UE triggers BFR, which consists of a flavor of random access, where the network needs to configure a set of RSs (i.e., a set of beams) that the UE may select before mapping to a RACH resource and send the preamble.

RACH failure due to BFR happens when the UE reaches the maximum number of RACH attempts, but many things depending on configurable parameters, contention, etc. Only knowing that RACH failure occurred limits quite a lot the root cause analyses possibilities on the network side (i.e., limited observability).

Examples of misconfigurations related to BFD and BR may be the resource for BFD, its relation to RLM resources, or the resources for candidate beams when BFR is triggered. In the case of misconfigured candidate beams resource, upon BFD, the UE starts to search on a configured candidate set and may not find a candidate beam in the configured set, which would lead to an RLF. However, it might be the case that the UE is still under cell coverage (i.e. CQD of serving cell is still quite good and measurement reports/mobility is not triggered by the network), something that would be quite bad.

Provision of MRO Assistance Information to the Correct Network Function

In the current handling of the RLF, upon receiving the RLF report from the UE the reestablishment cell forwards the RLF report (along with other parameters as captured in section 0) to the last serving cell of the UE. This communication happens on the interface between two RRC entities. In legacy LTE this interface has been the X2. However, if such communication had to happen in the NG RAN, it might happen over the Xn interface (between two CU-CPs or between a CU-CP and an eNB) or it might happen over the NG interface, in cases where the RLF report needs to be forwarded to nodes not connected via the Xn interface.

The current information exchange upon RLF declaration is between CU-CPs or CU-CP and eNB i.e., those units that handle RRC in respective nodes. The information exchanged is via either new or existing Xn messages. For example, new RLF indication message or Handover report message could be defined.

In LTE this information exchange was sufficient to identify the too late HO, too early HO and handover to wrong cell scenarios. However, in NR, as described above, there can be other issues that lead to RLF from the UE. One of them is the sub-optimal configuration of radio link monitoring related parameters, the BFD (beam failure detection) and BFR (beam failure recovery) parameters such as the RS resources, CQD and beam reporting parameters, misconfiguration of beam management procedures in general, etc. These resources are configured by the RRC. However, the exact way of managing these resources is up to the DUs that are handling the beam management and the beamforming functionalities.

In NR, there are new causes for RLF declaration via sub-optimal BFD and BFR resources.

The reference signals (e.g. SSBs and/or CSI-RSs) configured as part of the BFD and BFR could be beamformed dynamically and this dynamicity is controlled by the DUs The RLF report upon failure to perform BFR is sent to RRC (CU) and thus the DU is unaware of the failure cause and cannot tune its beamforming parameters associated to RSs that are used for BFD and BFR.

Certain aspects of the present disclosure and their embodiments may provide solutions to these or other challenges. As one example, the present disclosure addresses the issue related to CU/DU split and the lack of observability in the correct functions handling certain related functionality (e.g., beamforming related functionality in the DU).

There are, proposed herein, various embodiments which address one or more of the issues disclosed herein.

According to one example embodiment, a method performed by a first Centralized Unit (CU) in the network side (e.g., implemented in a node, in the cloud, etc.) for Mobility Robustness Optimization is disclosed. In certain embodiments, the method may comprise:

Receiving from a wireless terminal/user equipment (UE) assistance information from a UE for mobility robustness optimization (MRO), such as an RLF report and/or a Handover report (or any other assistance information for MRO);

Determining the failure cause (e.g., by checking what is indicated in the assistance information reported by the UE). In certain embodiments, failure causes that may be in the assistance information (e.g., RLF report) may be one or more of the following: T310 expiry, Random Access Problem (possibly including additional information that this was triggered by Beam Failure Recovery, and further details about the procedure), maximum number of RLC retransmissions, Expiry of timer T312, RLM problem, Beam Failure Detection problem, Beam Management problem, cell quality derivation problem, etc.;

Determining the location where the failure may be originated (e.g., its own CU, one of its associated DUs, another CU, or a DU associated to another CU). In certain embodiments, that determination may be performed based on the failure cause described in the previous step and/or location information also provided in the assistance report (e.g., RLF report) like a cell/node/DU/CU identifier. In certain embodiments, this may also be done at the network side by a look-up function where the CU receiving the report from the UE looks up a mapping between a reported identifier known by the UE (e.g., cell identifier) and CU/DU addressing information.

Forwarding assistance information for MRO (e.g., an RLF report) or configuration changes related to MRO to the location where the failure may be originated, upon (or in response to) the previous determination step (e.g., its own CU, one of its associated DUs, another CU, or a DU associated to another CU).

Figure 12:
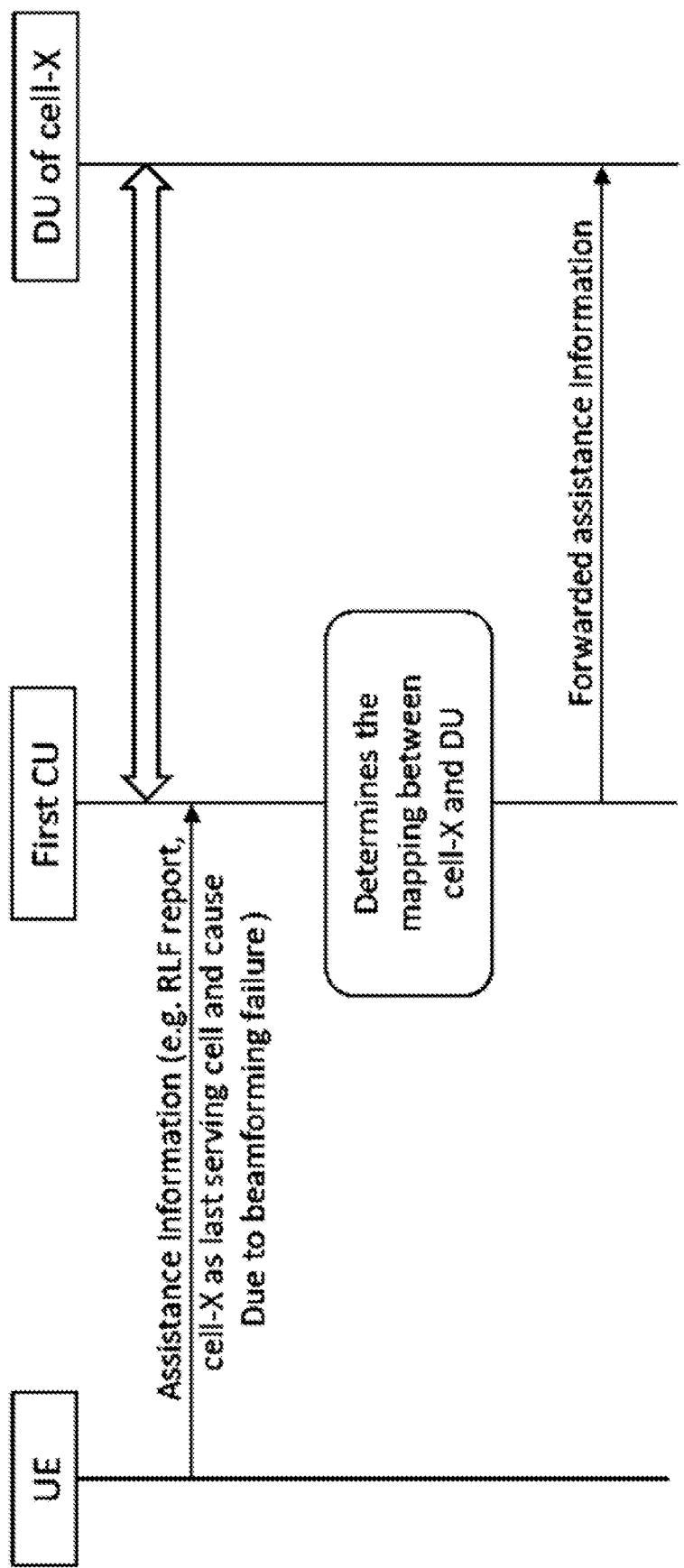
FIG. 12 illustrates an example of a signal flow for forwarding assistance information, in accordance with certain embodiments.
Figure 13:
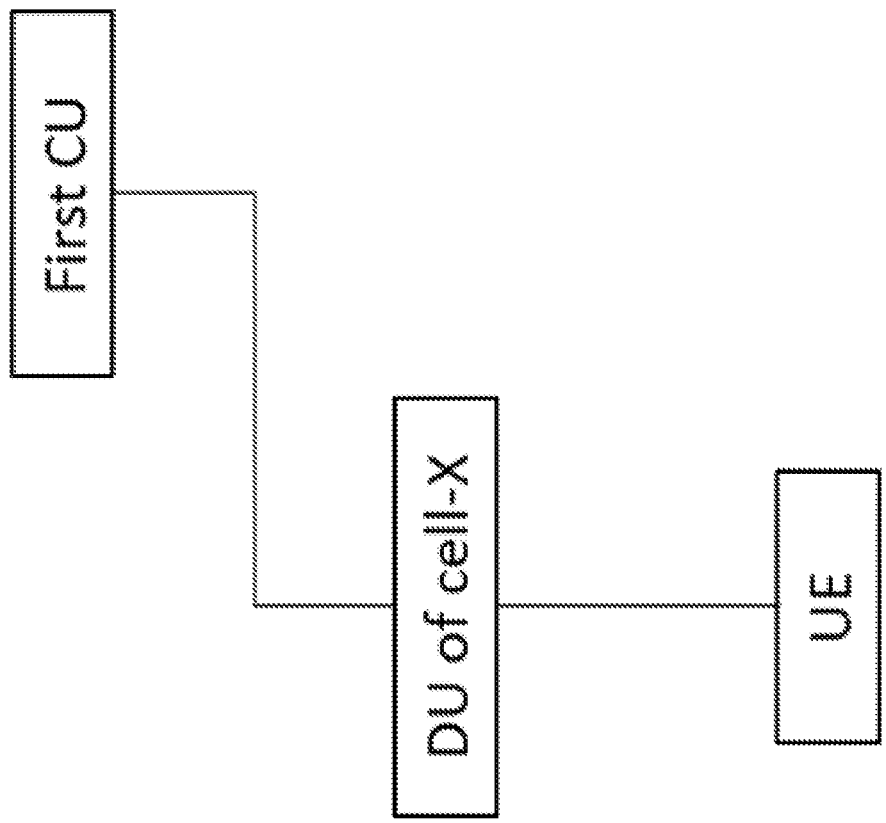
FIG. 13 illustrates an example arrangement of CU, DU, and UE, in accordance with certain embodiments.

In certain embodiments, the location may be a DU associated to the CU receiving the assistance information from the UE (e.g. RLF report). This is shown in FIG. 12 (for the case where assistance information is provided). FIG. 13 shows an arrangement of a CU, a DU, and a UE that may perform the steps of FIG. 12.

Figure 14:
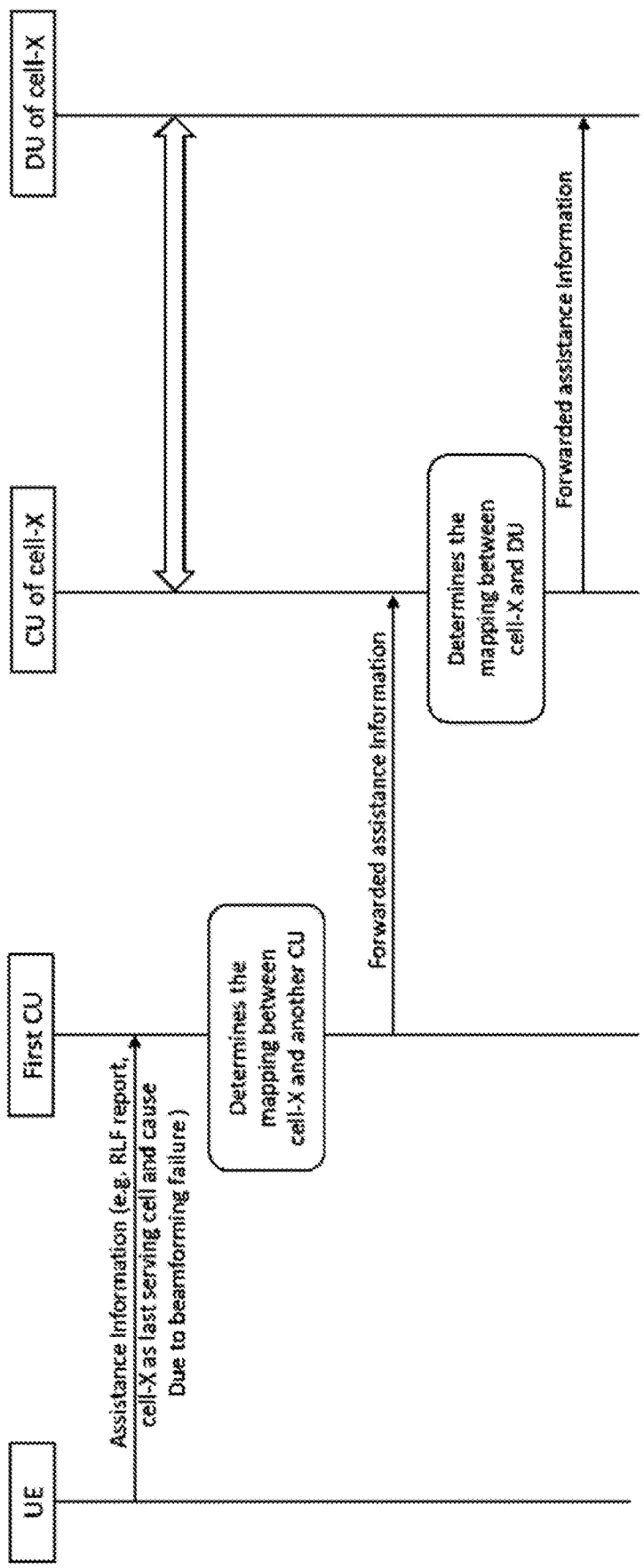
FIG. 14 illustrates an example of a signal flow for forwarding assistance information, in accordance with certain embodiments.
Figure 15:
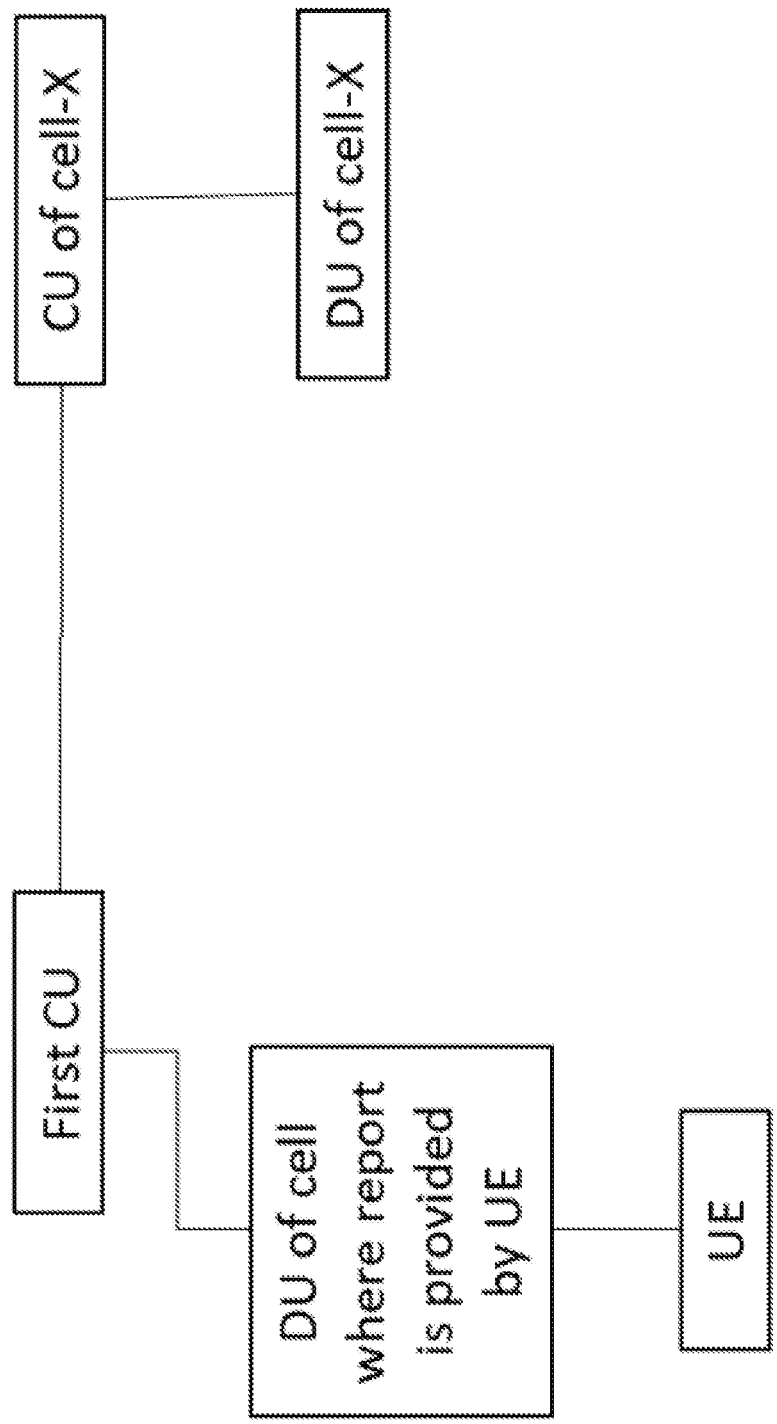
FIG. 15 illustrates an example arrangement of CUs, DUs, and UE, in accordance with certain embodiments.

In certain embodiments, the location may be a second CU (and, in that case the second CU is responsible to forward the assistance information to a second DU where the failure was originated, in case the function that led to RLF is handled by the second DU). This is shown in FIG. 14 (for the case where assistance information is provided). FIG. 15 shows an arrangement of a CUs, DUs, and a UE that may perform the steps of FIG. 14.

According to another example embodiment, a method performed by a second Centralized Unit (CU) in the network side (e.g., implemented in a node, in the cloud, etc.) for Mobility Robustness Optimization is disclosed. In certain embodiments, the method comprises:

Receiving assistance information for MRO (e.g., a RLF report) indicating that a failure may be originated in a cell of a DU associated to the second CU; and Forwarding assistance information for MRO (e.g., the RLF report) or configuration changes related to MRO to the DU where the failure may be originated upon determining a mapping between a cell identifier and the DU.

According to another example embodiment, a method performed by a Distributed Unit (DU) in the network side (e.g., implemented in a node, in the cloud, etc.) for Mobility Robustness Optimization is disclosed. In certain embodiments, the method comprises:

Receiving assistance information for MRO (e.g., a RLF report) indicating that a failure may be originated in a cell of that DU (e.g., that may be received from a CU, as described above);

Performing one or more parameter changes in at least one of the functions handled by that DU (possibly using forwarded assistance information). In certain embodiments, these functions may include one or more of Random-Access, BFD, BFR, RLM, cell quality derivation, beam management, or any other function affected by beamforming parameters handled by that DU;

Indicating to the DU any parameter changes performed in at least one of the functions handled by that DU. In certain embodiments, these functions may include one or more of Random-Access, BFD, BFR, RLM, cell quality derivation, beam management, or any other function affected by beamforming parameters handled by that DU.

Some examples of how the various embodiments described herein may be implemented are described below.

In certain embodiments, if the cell in which the UE performs re-establishment is the same as the last serving cell indicated in the assistance information (e.g., the RLF report), and if the failure cause is associated to RLF caused by procedures handled by the DU (which is the same DU since both cells are the same), such as sub optimum beam configuration for procedures like cell quality derivation, RLM parameters, contention free random-access resources, BFD, BFR, beam reporting, etc., the CU may perform one or more of the following actions:

Indicate the beam configuration related issues to DU (e.g., possibly forwarding assistance information to the DU, like the RLF report or parts of it);

Indicate one or more changes in the beam configuration related parameters for at least one of the described procedures (e.g., resources for BFR, BFD, RLM, CQD settings, activation of beam reporting, etc.); and Configure one or more beam related parameters for at least one of the described procedures (e.g., resources for BFR, BFD, RLM, CQD settings, activation of beam reporting, etc.).

In certain embodiments, if the cell in which the UE performs re-establishment is not the same as the last serving cell indicated in the assistance information (e.g., the RLF report), and if the failure cause is associated to RLF caused by procedures handled by a DU (and, the re-establishment cell is associated to the same DU as the last serving cell), such as sub optimum beam configuration for procedures like cell quality derivation, RLM parameters, contention free random-access resources, BFD, BFR, beam reporting, etc., the CU may perform one or more of the following actions:

Indicate the beam configuration related issues to DU (e.g., possibly forwarding assistance information to the DU, like the RLF report or parts of it);

Indicate one or more changes in the beam configuration related parameters for at least one of the described procedures (e.g., resources for BFR, BFD, RLM, CQD settings, activation of beam reporting, etc.); and Configure one or more beam related parameters for at least one of the described procedures (e.g., resources for BFR, BFD, RLM, CQD settings, activation of beam reporting, etc.).

In certain embodiments, if the cell in which the UE performs re-establishment is not the same as the last serving cell, and they are associated to different DUs (but under the same CU), forward the RLF report (including, for example, RLM/BFD-BFR related info) via an available interface such as the Xn interface to DU associated to the last serving cell indicated in the assistance information where RLF is declared.

In certain embodiments, the DU may either receive an indication of the issue detected by the CU (e.g., the indication may suggest that a reconfiguration of BDF and/or BFR is needed). Alternatively, in certain embodiments the CU may send to the DU the RLF and/or handover report. In certain embodiments, upon receiving (or in response to receiving) such information concerning failure cases or cases where a reconfiguration for the purpose of mobility optimization is needed, the DU may change the beamforming configuration(s) associated to BFD and/or BFR resources and beam configuration associated to cell quality derivation, RACH resource allocation and handover.

Figure 16:
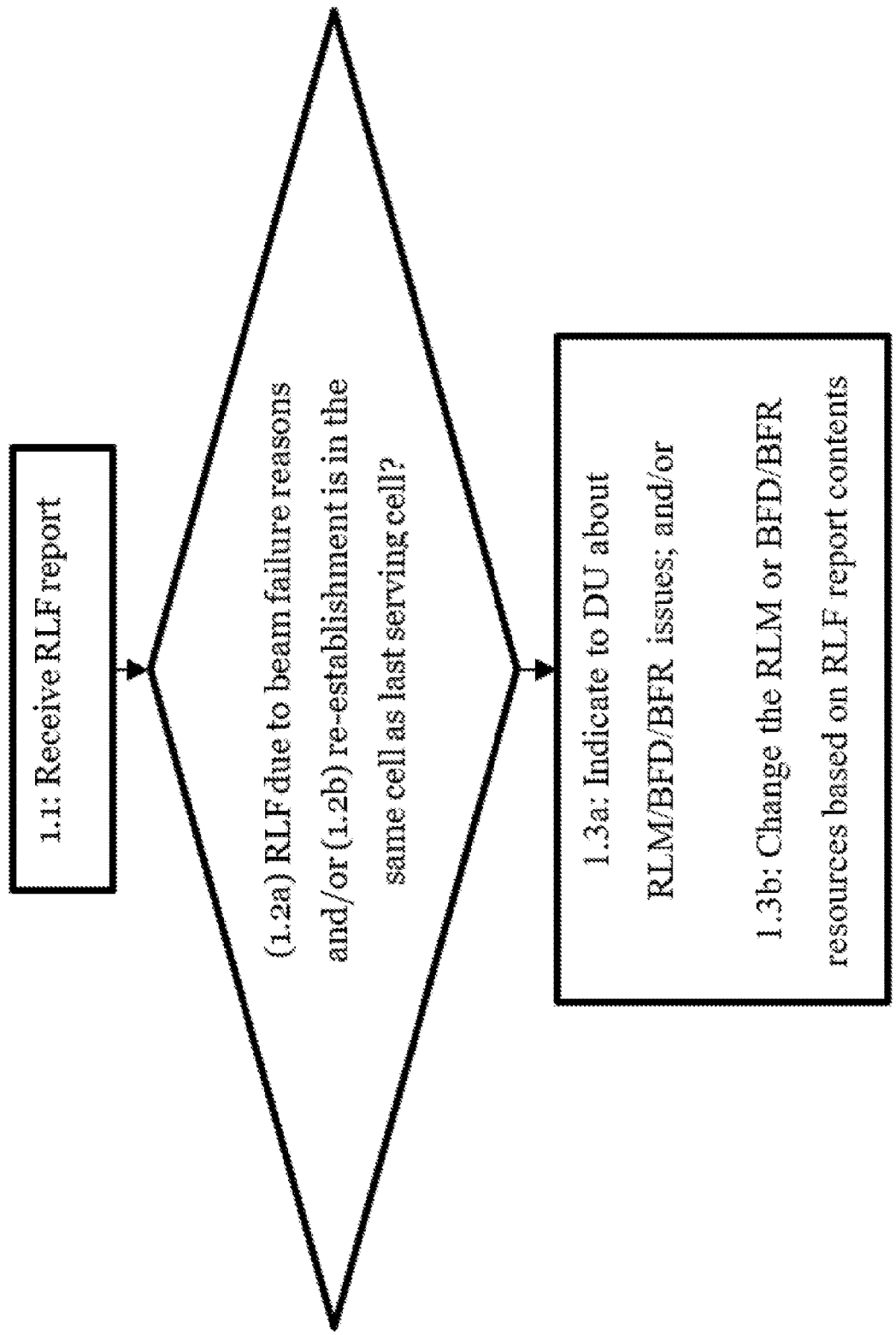
FIG. 16 illustrates an example flow chart for using an RLF report for RLM/BFD-BFR resource beamforming modifications, in accordance with certain embodiments.

FIG. 16 is a flow chart of an embodiment for CU-CP associated to using RLF report for RLM/BFD-BFR resource beamforming modifications. The method in FIG. 16 comprises receiving an RLF report (step 1.1), determining an RLF due to beam failure reasons (step 1.2a) and/or determining re-establishment is in the same cell as the last serving cell (step 1.2b), and indicating to the DU about the RM/BFD-BFR issues (step 1.3a) and/or changing the RLM or BFD-BFR resources based on the contents of the RLF report (step 1.3b).

Figure 17:
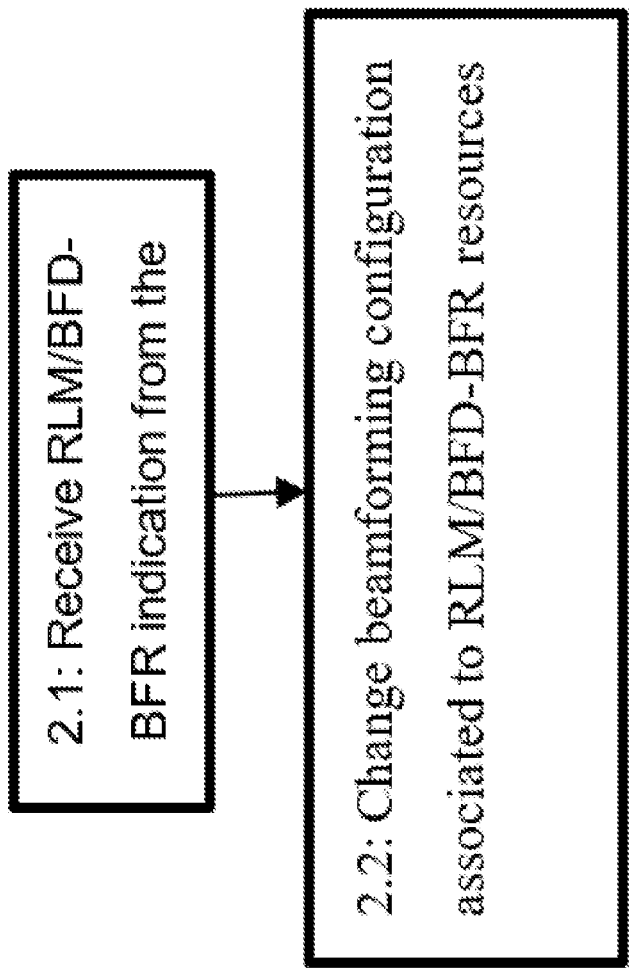
FIG. 17 illustrates an example flow chart for using an RLF report for RLM/BFD-BFR resource beamforming modifications, in accordance with certain embodiments.

FIG. 17 is a flow chart of an embodiment for DU associated to using RLF report for RLM/BFD-BFR resource beamforming modifications. The method comprises receiving an RLM/BFD-BFR indication (step 2.1) and changing a beamforming configuration associated to RLM/BFD-BFR resources (step 2.2).

In addition to the above-described communication from CU to DU, in certain embodiments there can be scenarios where DU might do the learning based on the statistics associated to successful BFR attempts and thus indicate to the CU about the optimal RLM or BFD/BFR resource configurations that shall be used for the UEs in that area in the future.

Figure 18:
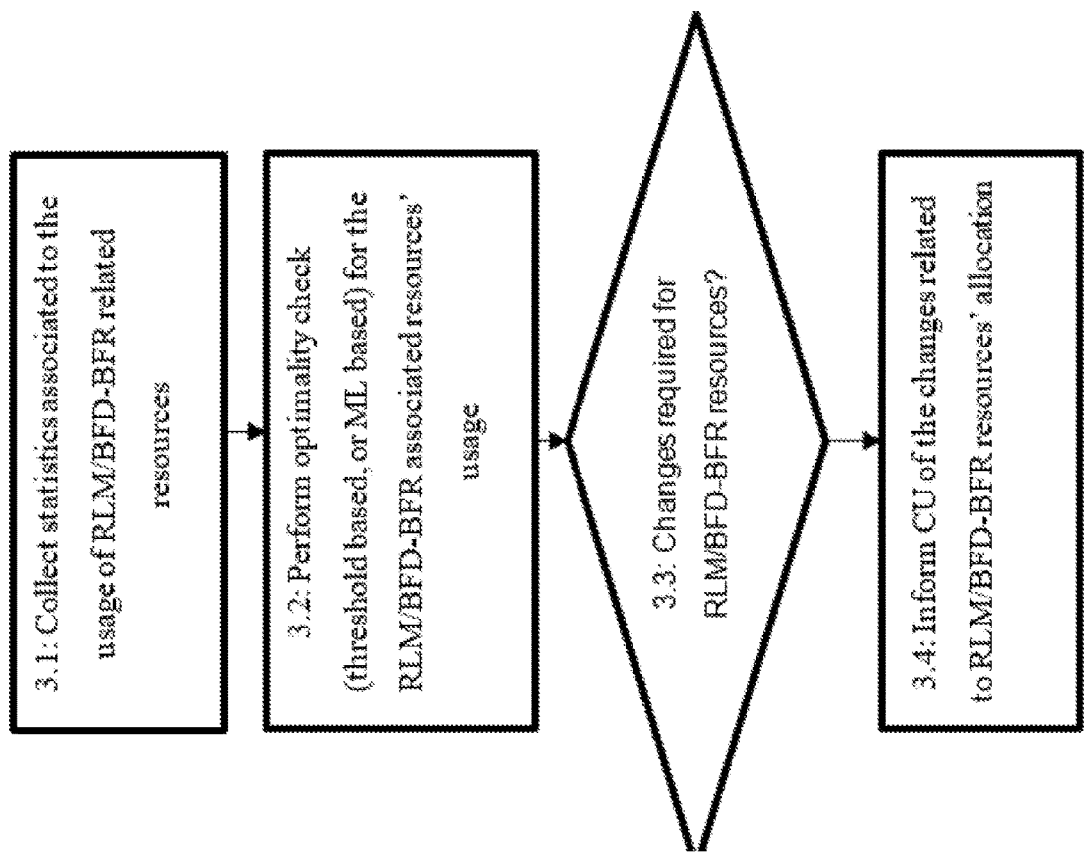
FIG. 18 illustrates an example of a flow chart for using BFR attempts-based BFD/BFR resource reconfigurations, in accordance with certain embodiments.

FIG. 18 is a flow chart of an embodiment for DU associated to using BFR attempts-based BFD/BFR resource configurations. The method comprises collecting statistics associated to the usage of RLM/BFD-BFR related resources (step 3.1) and performing an optimality check (threshold based or ML based) for the RLM/BFD-BFR associated resources' usage (step 3.2). The method further comprises determining changes required for RLM/BFD-BFR resources (step 3.3) and informing CU of the changes related to RLM/BFD-BFR resources' allocation (step 3.4).

Figure 19:
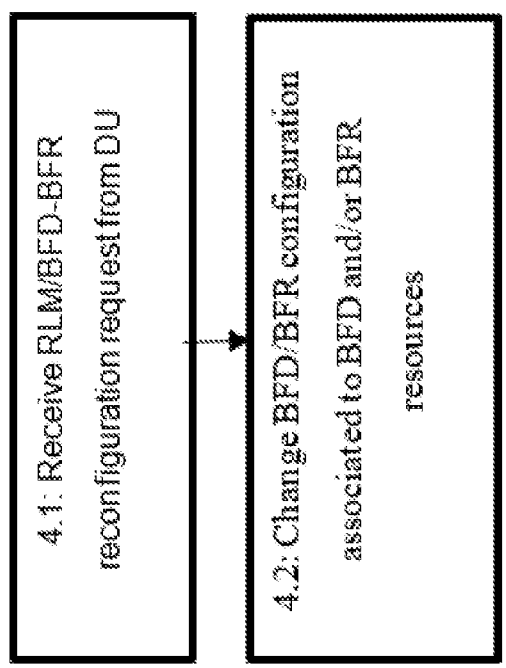
FIG. 19 illustrates an example of a flow chart for using BFR attempts-based RLM/BFD-BFR resource reconfigurations, in accordance with certain embodiments.

FIG. 19 is a flow chart of an embodiment for CU associated to using BFR attempts-based RLM/BFD-BFR resource reconfigurations. The method comprises receiving RLM/BFD-BFR reconfiguration request from DU (step 4.1) and changing BFD/BFR configuration associated to BFD and/or BFR resources (step 4.2).

In addition to the above-described communications, there can be scenarios where the CU might do the learning based on the statistics associated to successful BFR attempts as well as other beam measurement/configuration of the neighboring cells, and thus via leveraging a more thorough information (including nonboring cells information) the CU may reconfigure the DU with the optimal BFD/BFR resource configurations that shall be used for the UEs in that area in the future.

Figure 20:
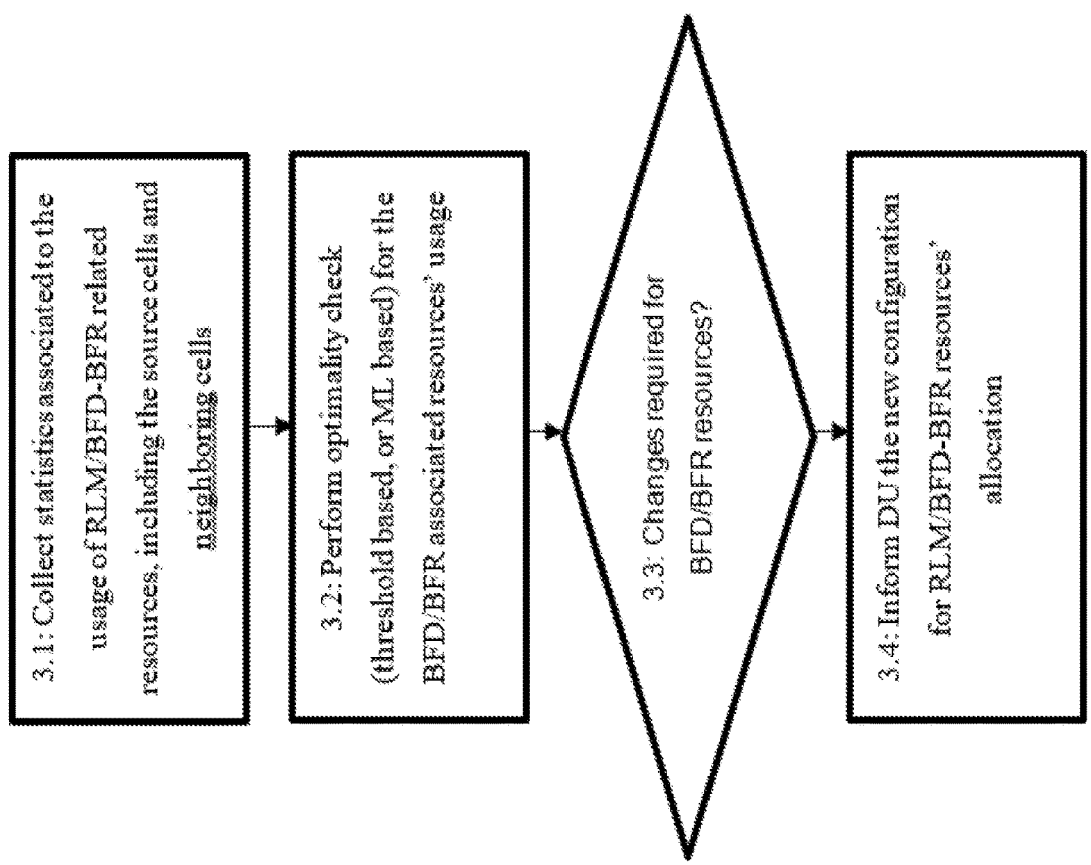
FIG. 20 illustrates an example of a flow chart for using BFR attempts-based RLM/BFD-BFR resource reconfigurations, in accordance with certain embodiments.

FIG. 20 is a flow chart of an embodiment for CU associated to using BFR attempts' based RLM/BFD-BFR resource reconfigurations. The method comprises collecting statistics associated to the usage of RLM/BFD-BFR related resources, including the source cells and the neighboring cells (step 3.1) and performing optimality check (threshold based or ML based) for BFD/BFR associated resources' usage (step 3.2). The method further comprises determining changes required for BFD/BFR resources (step 3.3) and informing DU the new configuration for RLM/BFD-BFR resources' allocation (step 3.4).

Certain embodiments may provide one or more of the following technical advantage(s). As one example, certain embodiments may enable the CU and DU to exchange the information associated to RLF, Handover reports-based learning (from CU to DU) and the successful BFR, cell quality derivation and RACH resource allocation related learning (from DU to CU). This may advantageously enable fine tuning tuning of the BFD and/or BFR resources configurations as well as the configuration of beam configuration for cell quality derivation, dedicated RACH resource allocation (CFRA) and beams configuration for handovers. This fine tuning may advantageously reduce the network overhead by using only the 'optimal' RLM/BFD-BFR resources and also reduce the RLF declaration from the UE thus reducing the UE interruption times due to RLFs along with ensuring optimum beams for cell quality derivation, dedicated RACH resource allocation and beam configuration for handovers.

Additional Explanation

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

2.1 RLF Report Related Information from CU to DU

In certain embodiments, the CU can inform the DU about the statistics derived from the intra cell RLF reports and RLF reports contained in Handover reports associated to the beam failure related aspects that led to RLF. The flow charts associated to this feature are provided in FIGS. 16-17.

2.1.1 Step 1.1 (CU Receives RLF Report)

In certain embodiments, the CU receives the RLF report associated to a UE that was served by a cell connected to this CU before declaring RLF.

2.1.2 Step 1.2 (CU Determines if the RLF Occurred Due to RLM/BFD/FR or Beam Related Configurations)

In this step, the CU identifies that the RLF was declared by the UE due to the beam failure related reasons.

In certain embodiments, the identification may be performed based on the contents of the RLF report. In some cases, the reason for RLF may be a maximum number of RACH attempts being reached.

In certain embodiments, the identification may be based on the fact that the cell in which the UE performed the re-establishment is the same cell which was the last serving cell of the UE. In certain embodiments, the identification may be further based on the beam through which the UE performs the RA as part of the reestablishment and comparing this beam with the UEs configured and lastly activated beam failure recovery resources (the active BWP of the UE). In certain embodiments, the DU may be mandated to inform the CU about the changes in the active BWP of the UE. In certain embodiments, if the CU is not aware of these activated beam failure recovery resources, then the CU may request the DU to provide the last active BWP of the UE (in such a scenario, the DU is expected to retain the UE's active BWP history for a "duration" even after the UE becomes non-reachable from the network side). In certain embodiments, the CU declares that the previously configured RLM/BFD-BFR resources are sub-optimal if the beam from which the UE re-establishes is not amongst the beams assigned to be used for the RLM/BFD-BFR purposes.

In certain embodiments, both of the above conditions may be taken into consideration to realize that the issues are related to RLM/BFDBFR resource allocations. In some cases, this could be based on statistics from a single UE's RLM/BFDBFR related RLF or based on the statistics from multiple UEs' RLM/BFD-BFR related RLF declarations.

In certain embodiments, the CU may determine that the RLF occurred since beams configured to measure the cell quality were not optimum since the UE reports alternative better beams. For example, this could happen due to two reasons:

Case 1: UE is configured to base the cell quality on specific beam which is below the required threshold for an acceptable cell but there are other strong beams available.

Case 2: UE is configured to base the cell quality based on the average of multiple configured or strongest beams, but the average of the beams is below the required threshold for an acceptable cell.

In certain embodiments, the DU uses the RLF report from the CU and performs the following actions.

Case 1: DU configured the UE with alternative strong beam reported from the UE or the UE is configured to base the cell quality on the average of multiple beams.

Case 2: DU configured the UE with specific strong beam instead of utilizing the average of multiple beams for cell quality derivation.

In certain embodiments, the CU may determine that the UE reports RLF since the beams allocated as CFRA resources were not optimum. In some cases, the RLF report could also be included inside the Handover report in case of handover failure scenarios. In such a scenario, the CU may then report its finding to the DU.

In certain embodiments, the DU may determine from the RLF report that the CFRA resources were not optimum but the UE reports alternative beams that could have been optimum. In such a scenario, the DU may then reconfigure the UE with CFRA resources based on strong beam reported by the UE.

2.1.3 Step 1.3 (Step 2.1 and 2.2 as Well) (Informing DU about the Change in the RLM/BFD-BFR, Cell Quality Beam, Beam for RACH Configurations and/or Informing DU about the Possible Need to Change Beamforming Configurations Associated to RLM/BFD-BFR RSs, Cell Quality Beam, Beams for CFRA)

In certain embodiments, the CU may decide to change the RLM/BFD-BFR resources (e.g., new beam addition, some beams removal, etc.) associated to certain BWPs and use the new configuration to the UEs that will come to connected in the cell in which the UE had declared RLF.

In certain embodiments, the CU may inform the DU about the beam through which the UE performed the reestablishment so that this information can be used by the DU to modify the beamforming configurations of the RLM/BFD-BFR related beams or cell quality beams or beams for CFRA.

2.2 BFR (and RLM) Related Information from DU to CU

When there is a successful beam failure recovery, there is no notification given to CU as to which beams are mostly used for BFR and which beams are not used at all. This is what is proposed in FIGS. 18-19 and the steps captured in these figures.

2.2.1 Step 3.1 (Collection of BFR Associated Statistics)

In certain embodiments, the DU may use the beam which was used by the UE for BFR as part of the statistics.

In certain embodiments, upon (or in response to) BFR the UE sends a measurement report associated to the successful BFR. This report can be obtained from the UE upon request from the network (e.g., something similar to UEInformationRequest and UEInformationResponse framework but from the lower layer like L1 reporting used in CSI framework). In such a report, the UE may include the RSRP measurements associated to one or more of the configured BFD and/or BFR RSs. Additionally, the UE may also include the beams that are measured to be better than the configured BFD related RSs (these additional beams might be related to BFR related RSs and/or those RSs that were blindly detected by the UE and/or those RSs that were configured for RRM measurements). Additionally, in certain embodiments the collected information may include the L1 RSRP reporting included as part of the CSI framework. Moreover, in certain embodiments the UE can include measurements of the resources associated to the RLM in parallel with the measurement associated to the resources used for BFD-BFR In certain embodiments, both of the above-described embodiments' associated information may be collected.

In certain embodiments, the above-mentioned statistics may be collected in DU. In certain embodiments, these statistics may be collected in a centralized storage (as shown in FIG. 20, this centralized storage can be CU and in that case the step 3.4 may be more of execution of the decision obtained from step 3.3 and a communication from CU to DU rather than communication from DU to CU).

2.2.2 Step 3.2 (Checking Whether the Configured BFD/BFR Resources are Optimal)

In certain embodiments, the usage of certain BFR resources can be checked based on:

How often a beam has been used for BFR?

Whether any other beam was available at the time of using a particular beam for BFR?

Based on both above statistics.

Other suitable criteria

In certain embodiments, the statistics so collected may be checked against a predefined threshold. In certain embodiments, the statistics may be compared relatively against one another to decide which beams are most beneficial for BFR purposes and which beams are least beneficial. In certain embodiments, the statistics so collected may be given to a machine learning algorithm that can output most suitable 'X' beams for BFR.

In certain embodiments, as part of the BFD related configuration enhancement, based on the UEs reported beams that were part of the measurement report sent by the UE after BFR, the need for adding new BFD resources to the existing BFD resources can be checked. For example, if an RS that is not currently included in the BFD configuration but is reported by UEs as an RS that was audible (e.g., beams above certain threshold), then it can be a candidate for addition for BFD resources in the future.

2.2.3 Step 3.3 (Check if there is a Need for Changing the BFD/BFR Resources)

In certain embodiments, based on the already available BFD/BFR resource configurations and comparing it with the optimality information obtained from step 3.2, the DU may decide if the current list of BFR resources can be updated or not.

2.2.4 Step 3.4 (Informing CU about the Changes Related to BFD/BFR Resource Allocation)

In certain embodiments, if the decision in Step 3.3 was to change the BFD/BFR resources, then this may be informed to the CU 2.3 Handover Report Related Information from CU to DU In certain embodiments, the CU may inform the DU about the statistics derived from the handover reports associated to the beam failure related aspects that led to handover failure or could potentially avoid future handover failures.

2.3.1 Step 1.1 (CU Receives Handover Report)

In certain embodiments, the CU may receive the Handover report associated to a UE that was served by a cell connected to this CU before declaring RLF or handover failure or even after successful handover.

2.3.2 Step 1.2 (CU Determines if the Handover Report Contains Possibilities for Beam Configuration Optimization)

In this step, the CU may identify that the Handover report contains RLF reports which were caused by beam-related reasons or in case of successful handover CU may notice there is a possibility for beam configuration improvement as indicated by UE.

In certain embodiments, the target DU for a handover may use the successful handover report from CU which includes UE report of alternative better beams to adjust the handover configuration including selection of target beams for UE in cell edge situations.

In certain embodiments, the CU may determine and inform the source DU that the RLF indicator in handover reports indicates that there were stronger beams available during Handover other than the ones configured for this purpose in source DU.

2.4 RLM/BFD Parameters that May be Tuned Based on Assistance Information

In certain of the example embodiments disclosed herein, it has been described that assistance information reported by the UE and forwarded to the DU where the failure has been originated may be used to optimize RLM parameters. In certain embodiments, these parameters may be one or more of the following:

RadioLinkMonitoringConfig Information Element

```
-- ASN1START
-- TAG-RADIOLINKMONITORINGCONFIG-START
RadioLinkMonitoringConfig ::=              SEQUENCE {
  failureDetectionResourcesToAddModList   SEQUENCE
(SIZE(1..maxNrofFailureDetectionResources)) OF RadioLinkMonitoringRS
OPTIONAL, -- Need N
  failureDetectionResourcesToReleaseList SEQUENCE
(SIZE(1..maxNrofFailureDetectionResources)) OF RadioLinkMonitoringRS-Id
OPTIONAL, -- Need N
    beamFailureInstanceMaxCount           ENUMERATED {n1, n2, n3, n4, n5, n6,
n8, n10}                  OPTIONAL, -- Need R
    beamFailureDetectionTimer             ENUMERATED {pbfd1, pbfd2, pbfd3,
pbfd4, pbfd5, pbfd6, pbfd8, pbfd10}
                                          OPTIONAL, -- Need R
    ...
}
RadioLinkMonitoringRS ::=               SEQUENCE {
    radioLinkMonitoringRS-Id                RadioLinkMonitoringRS-Id,
    purpose                                 ENUMERATED {beamFailure, rlf, both},
    detectionResource                       CHOICE {
      ssb-Index                               SSB-Index,
      csi-RS-Index                            NZP-CSI-RS-ResourceId
    },
    ...
}
-- TAG-RADIOLINKMONITORINGCONFIG-STOP
-- ASN1STOP
``` beamFailureDetectionTimer: This is the timer for beam failure detection as defined in TS 38.321, clause 5.17. The value is in number of "$Q_{out,LR}$ reporting periods of Beam Failure Detection" Reference Signal. Value pbfd1 corresponds to 1 $Q_{out,LR}$ reporting period of Beam Failure Detection Reference Signal, value pbfd2 corresponds to 2 $Q_{out,LR}$ reporting periods of Beam Failure Detection Reference Signal and so on.

The usage of the timer is described in the MAC specifications as follows:
The MAC entity shall:
 1> if beam failure instance indication has been received from lower layers:
  2> start or restart the beamFailureDetectionTimer;
  2> increment BFI_COUNTER by 1;
  2> if BFI_COUNTER>=beamFailureInstanceMaxCount:
   3> initiate a Random Access procedure (see subclause 5.1) on the SpCell.
 1> if the beamFailureDetectionTimer expires; or
 1> if beamFailureDetectionTimer, beamFailureInstanceMaxCount, or any of the reference signals used for beam failure detection is reconfigured by upper layers:
  2> set BFI_COUNTER to 0.
 1> if the Random Access procedure is successfully completed (see subclause 5.1):
  2> set BFI_COUNTER to 0;
  2> stop the beamFailureRecoveryTimer, if configured;
  2> consider the Beam Failure Recovery procedure successfully completed.

This is somehow equivalent to the in-sync indications in RLF handling that indicates that after the reception of an OSS event the link is getting recovered. In BFD, the absence of an OOS indication is somehow an indication that beam(s) monitored are getting better and beam recovery shall not be triggered.

If the timer is too short (e.g., a single OSS event received), the UE triggers BFR upon a single OOS event. That may possibly be due to fast fading effect and, network may not really want the UE to trigger BFR (i.e. random access) every time it happens, since that might be fixed by the network via ordinary beam management procedures. The consequence of a too short timer value is a higher than necessary number of BFR attempts, which may lead to RLF due to the maximum number of retransmissions in RACH being reached.

Else, if the timer is too long, for example BFR is only triggered when a high number of OOS events come in a quite short window, there could be a misdetection of problems if here and there the link gets recovered (and OOS events are absent just sometimes), which may possibly happen due to fast fading effect. Hence, BFR may not be triggered, even when needed, even though RLM may anyway trigger RLF, depending how the RLF parameters for the IS and OSS counter thresholds are set.

According to certain of the embodiments described herein, information regarding OSS events for BFD and RLM and beam measurements on reference signals configured for RLM may assist the network to either increase the timer value when too many BFRs are happening (e.g. based on collected statistics from one or multiple UEs). That may be known thanks to the reported assistance information (e.g., RLF report) containing information that RACH failure occurred due to BFR being triggered and reaching a maximum number of retransmissions.

beamFailureInstanceMaxCount: This field determines after how many beam failure events the UE triggers beam failure recovery (see TS 38.321, clause 5.17). Value n1 corresponds to 1 beam failure instance, n2 corresponds to 2 beam failure instances and so on. This is basically the number of OOS events within the time window that triggers BFR.

If this value is too low, there may be too many BFRs triggered due to a fast fading event and/or blocking, which will trigger the UE to perform random access and possibly lead to RLF if maximum number of attempts is reached. Notice that the risk here is to trigger BFR due to a fast fading and/or blockage effect that may likely be recovered anyway. The content of RLF report including beam measurements on BFD resources (and event measurements beyond that) may assist the network to understand that too many BFRs may be happening due to too low values for this counter.

Else, if this value is too high, UE may not trigger BFRs even though the situation is not very good.
The risk is that RLM is being performed anyway and RLF is triggered, even though there is still some good coverage in the cell that was not really detected since UE has not triggered BFR and has not had the chance to find a candidate beam (assuming a correct configuration of candidate beams). Hence, too high value may lead to too late BFR.

The reported information in the RLF report may assist the network to detect RLF due to RACH failure (maximum number of retransmissions) due to too many BFR attempts, possibly due to a too low value of the counter. Or, RLF due to expiry of timer T310 due to the fact BFR is not being triggered (or is slower than RLF) due to the fact that the counter is set too high.

failureDetectionResourcesToAddModList: This field is a list of reference signals for detecting beam failure and/or cell level radio link failure (RLF). The limits of the reference signals that the network can configure are specified in TS 38.213, in Table 5-1. The network configures at most two detectionResources per BWP for the purpose "beamFailure" or "both". If no RSs are provided for the purpose of beam failure detection, the UE performs beam monitoring based on the activated TCI-State for PDCCH as described in TS 38.213, clause 6. If no RSs are provided in this list for the purpose of RLF detection, the UE performs Cell-RLM based on the activated TCI-State of PDCCH as described in TS 38.213, clause 5. The network ensures that the UE has a suitable set of reference signals for performing cell-RLM.

Basically, this list determines the exact resources for BFD and/or RLM, but also the exact RLM/BFD method to be used (implicitly based on TCI states configurations or explicitly based on RS configurations).

If a UE is configured with sub optimum of RS resources for BFD or RLM, RLF may either be triggered too early or never be triggered. That is especially important in the case the resources monitored for RLM/BFD are not the same ones used for cell quality derivation. In that case, the network may not trigger handovers (because UE does not trigger measurements reports taken based on SSBs, which have good coverage) but triggers RLF due to the expiry of timer T310 due to misconfigured RS resources for RLM, in the sense that they may not really translate that the UE is still under cell coverage (but monitoring resources/beams that are not the best ones covering the UE). Hence, when an RLF happens due to timer T310 and UE logs BFD/RLM information, such as beam measurements of BFD/RLM resources, but possibly other beams from the serving cell (e.g. available SSB measurements, or CSI-RS measurements) the UE basically indicates to the network that the UE was under cell coverage but it was monitoring resources with not so good coverage (hence, RLF happened).

Similar issues may occur in BFR triggered by a misconfiguration of BFD resources. If the network detects RLF due to RACH failure due to too many RACH retransmissions due to too many BFR procedures, it may be a sign of too many BFD events, due to misconfigured BFD resources.

Possible network actions based on an enhanced RLF report with information regarding beam measurements on serving cell of BFD/RLM resources, and possibly including beam measurements on serving cell of other resources not configured for BFD/RLM, such as serving cell SSB measurements for RRM, may be taken. For example, the network may know that it should have configured other BFD/RLM resources/beams, and even change the method being used from the one based on TCIs to something that matches the reference signals used for cell quality derivation (e.g., use the same RS and instruct the UE to do RLM/BFD based on SSBs, as in the case of RRM measurements).

Another possible optimization is the activation of BFR itself. It might be the case the network starts its operation without BFR until it starts to detect RLFs and realize that something may be done. For example, when the UE declares RLFs and RLF report indicates that these could be avoided with BFR e.g. the RLF report shows that there were other good beams not configured for RLM that could have been configured as candidate beams for BFR. Hence, based on that information, network activates BFR and knows which beam it may configure as candidate beams.

2.5 BFR Parameters that May be Tuned Based on Assistance Information

In certain of the example embodiments disclosed herein, it has been described that assistance information reported by the UE and forwarded to the DU where the failure has been originated may be used to optimize BFR parameters. In certain embodiments, these parameters may be one or more of the following:

BeamFailureRecoveryConfig Information Element

```
-- ASN1START
-- TAG-BEAM-FAILURE-RECOVERY-CONFIG-START
BeamFailureRecoveryConfig ::=              SEQUENCE {
    rootSequenceIndex-BFR                  INTEGER (0 .137)
OPTIONAL,   -- Need M
    rach-ConfigBFR                         RACH-ConfigGeneric
OPTIONAL,   -- Need M
    rsrp-ThresholdSSB                      RSRP-Range
OPTIONAL,   -- Need M
    candidateBeamRSList                          SEQUENCE
(SIZE(1..maxNrofCandidateBeams)) OF PRACH-ResourceDedicatedBFR
OPTIONAL,   -- Need M
    ssb-perRACH-Occasion                   ENUMERATED {oneEighth, oneFourth,
oneHalf, one, two, four, eight, sixteen}  OPTIONAL,   -- Need M
```

```
    ra-ssb-OccasionMaskIndex                    INTEGER (0 .15)
OPTIONAL,    -- Need M
    recoverySearchSpaceId                       SearchSpaceId
OPTIONAL,    -- Cond CF-BFR
    ra-Prioritization                           RA-Prioritization
OPTIONAL,    -- Need R
    beamFailureRecoveryTimer                    ENUMERATED {ms10, ms20, ms40, ms60,
ms80, ms100, ms150, ms200}                          OPTIONAL,    -- Need M
    ...,
    [[
    msg1-SubcarrierSpacing-v1520                SubcarrierSpacing
OPTIONAL    -- Need M
    ]]
}
PRACH-ResourceDedicatedBFR ::=                          CHOICE {
    ssb                         BFR-SSB-Resource,
    csi-RS                      BFR-CSIRS-Resource
}
BFR-SSB-Resource ::=                    SEQUENCE {
    ssb                     SSB-Index,
    ra-PreambleIndex            INTEGER (0..63),
    ...
}
BFR-CSIRS-Resource ::=                  SEQUENCE {
    csi-RS                  NZP-CSI-RS-ResourceId,
    ra-OccasionList             SEQUENCE (SIZE(1..maxRA-OccasionsPerC SIRS))
OF INTEGER (0..maxRA-Occasions-1)   OPTIONAL,    -- Need R
    ra-PreambleIndex            INTEGER (0..63)
OPTIONAL,    -- Need R
    ...
}
-- TAG-BEAM-FAILURE-RECOVERY-CONFIG-START
-- ASN1STOP
``` beamFailureRecoveryTimer: Timer for beam failure recovery timer that starts when BFR is triggered (i.e. when random access due to BFR is started and stops if things are successful. Upon expiration of the timer the UE does not use CFRA for BFR. Value in ms. ms10 corresponds to 10 ms, ms20 to 20 ms, and so on.

Hence, upon the expiry of the timer the UE may still perform beam selection for Beam Failure Recovery (BFR) (i.e., RACH resource selection), but for contention-free random access resources. Longer this timer is, longer is the amount of time the UE is allowed to use CFRA. Hence, based on beam measurement information reported in RLF report when RLF happens (e.g., due to RACH failure (due to maximum number of attempts reached)) the network may know what beams the UE has tried to select, for example, whether these were CFRA or CBRA resources and, possibly increase the value of this timer so the UE may take more time to select a CFRA resource. Else, if failure occurs even if that time is set with a quite high value.

candidateBeamRSList: This is a list of reference signals (CSI-RS and/or SSB) identifying the candidate beams for recovery and the associated RA parameters. The network configures these reference signals to be within the linked DL BWP (i.e., within the DL BWP with the same bwp-Id) of the UL BWP in which the BeamFailureRecoveryConfig is provided.

Upon BFD, the UE needs to select one of the configured beams. If upon BFD the UE is under the coverage of beams that are not in the list of these resources, the UE is not able to perform BFR, which may lead to RLF. Hence, RLF report may include beam measurements (e.g., based on SSBs and CSI-RSs) to indicate the network that these resources are possibly misconfigured.

Hence, based on these reports, the network may add and/or replace resources in that configuration. For example, if in RLF report the UE indicates the RLF due to expiry of timer T310, even though it indicates that BFD was triggered (e.g., thanks to a flag in RLF report for BFD or other information enabling network to detect that), but no BFR was triggered because the lack of resources, and network also has beam measurements for beams that were not configured as candidate resources, network knows that these reported beams, if providing good measurements (e.g., high RSRP, RSRQ or SINR values), are good to be configured as candidates for beam recovery so that RLF may be avoided next time thanks to the fact that the UE would have an opportunity to select a beam of the cell that is providing good coverage to the UE so the UE can try to perform BFR. Notice that these beams measurements may be RRM measurements based on SSBs.

msg1-SubcarrierSpacing: Subcarrier spacing for contention free beam failure recovery. Only the values 15 or 30 kHz (<6 GHz), 60 or 120 kHz (>6 GHz) are applicable. See TS 38.211, clause 5.3.2.

rsrp-ThresholdSSB: This is a L1-RSRP threshold used for determining whether a candidate beam may be used by the UE to attempt contention free Random Access to recover from beam failure (see TS 38.213, clause 6). By receiving an RLF report including beam measurements at the moment the failure has occurred, the network knows which beams are above or below a threshold. Notice that in this sense, the UE may report beams in RLF report regardless of their quality (i.e., possibly including beams below that threshold). That would allow the network to possibly lower that threshold in case it is set too high.

ra-prioritization: These are parameters which apply for prioritized random access procedure for BFR. They comprise the following parameters:

powerRampingStepHighPrioritiy: Power ramping step applied for prioritized random access procedure; This is to be used in case prioritization is used for BFR.

scalingFactorBI: Scaling factor for the backoff indicator (BI) for the prioritized random access procedure. (see TS 38.321 [3], clause 5.1.4). Value zero corresponds to 0, value dot25 corresponds to 0.25 and so on.

Upon the reception of an RLF report including information that BFR failure has occurred (e.g., maximum number of RACH attempts) and beam measurements when the procedure occurs, the network is able to understand that prioritization of BFR could have make the procedure succeed. Then, upon receiving an RLF report with that information the network may turn on the prioritization feature (i.e., configure UEs with that configuration) and provide parameter accordingly, such as power ramping step high priority and scaling factor.

ra-ssb-OccasionMaskIndex: Explicitly signalled PRACH Mask Index for RA Resource selection in TS 38.321 [3]. The mask is valid for all SSB resources.

rach-ConfigBFR: This is the configuration of contention free random access occasions for BFR. If the network receives an RLF report including information that RLF is triggered due to RACH failure, and that this occurred due to BFR and that contention is detected, the network may configure CFRA resources.

ssb-perRACH-Occasion: This is defining the number of SSBs per RACH occasion for CF-BFR (L1 parameter 'SSB-per-rach-occasion'). If the network receives an RLF report including information that RLF is triggered due to RACH failure, and that this occurred due to BFR and that contention is detected, the network may reconfigure the distribution of SSBs per RACH occasion and/or configure more CBRA resources to avoid the RLFs.

Similar parameters may be tuned for CSI-RS related configurations.

2.6 CQD Parameters that May be Tuned Based on Assistance Information

In certain of the example embodiments disclosed herein, it has been described that assistance information reported by the UE and forwarded to the DU where the failure has been originated may be used to optimize CQD parameters. These parameters may be one or more of the following bolded ones in the measurement object:

MeasObjectNR Information Element

```
-- ASN1START
-- TAG-MEAS-OBJECT-NR-START
MeasObjectNR ::=                     SEQUENCE {
    ssbFrequency                         ARFCN-ValueNR
OPTIONAL,   -- Cond SSBorAssociatedSSB
    ssbSubcarrierSpacing                 SubcarrierSpacing
OPTIONAL,   -- Cond SSBorAssociatedSSB
    smtc1                                SSB-MTC
OPTIONAL,   -- Cond SSBorAssociatedSSB
    smtc2                                SSB-MTC2
OPTIONAL,   -- Cond IntraFreqConnected
    refFreqCSI-RS                        ARFCN-ValueNR
OPTIONAL,   -- Cond CSI-RS
    referenceSignalConfig                ReferenceSignalConfig,
    absThreshSS-BlocksConsolidation              ThresholdNR
OPTIONAL,   -- Need R
    absThreshCSI-RS-Consolidation                ThresholdNR
OPTIONAL,   -- Need R
    nrofSS-BlocksToAverage                       INTEGER (2..maxNrofSS-
BlocksToAverage)                     OPTIONAL,   -- Need R
    nrofCSI-RS-ResourcesToAverage                INTEGER(2..maxNrofCSI-RS-
ResourcesToAverage)                  OPTIONAL,   -- Need R
    quantityConfigIndex                  INTEGER (1..maxNrofQuantityConfig),
    offsetMO                             Q-OffsetRangeList,
    cellsToRemoveList                    PCI-List
OPTIONAL,   -- Need N
    cellsToAddModList                    CellsToAddModList
OPTIONAL,   -- Need N
    blackCellsToRemoveList               PCI-RangeIndexList
OPTIONAL,   -- Need N
    blackCellsToAddModList                       SEQUENCE (SIZE (1..maxNrofPCI-Ranges))
OF PCI-RangeElement                  OPTIONAL,   -- Need N
    whiteCellsToRemoveList               PCI-RangeIndexList
OPTIONAL,   -- Need N
    whiteCellsToAddModList                       SEQUENCE (SIZE (1..maxNrofPCI-Ranges))
OF PCI-RangeElement                  OPTIONAL,   -- Need N
    ... ,
    [[
    freqBandIndicatorNR-v1530            FreqBandIndicatorNR
OPTIONAL,   -- Need R
    measCycleSCell-v1530                 ENUMERATED {sf160, sf256, sf320, sf512,
sf640, sf1024, sf1280} OPTIONAL   -- Need R
    ]]
}
``` recoverySearchSpaceId: Search space to use for BFR RAR. The network configures this search space to be within the linked DL BWP (i.e., within the DL BWP with the same bwp-Id) of the UL BWP in which the BeamFailureRecoveryConfig is provided. The CORESET associated with the recovery search space cannot be associated with another search space.

absThreshCSI-RS-Consolidation: This is the absolute threshold for the consolidation of measurement results per CSI-RS resource(s) from L1 filter(s). The field is used for the derivation of cell measurement results as described in 5.5.3.3 and the reporting of beam measurement information per CSI-RS resource as described in 5.5.5.2 of TS 38.331.

absThreshSS-BlocksConsolidation: Absolute threshold for the consolidation of measurement results per SS/PBCH block(s) from L1 filter(s). The field is used for the derivation of cell measurement results as described in 5.5.3.3 and the reporting of beam measurement information per SS/PBCH block index as described in 5.5.5.2 of TS 38.331.

nrofCSInrofCSI-RS-ResourcesToAverage: Indicates the maximum number of measurement results per beam based on CSI-RS resources to be averaged. The same value applies for each detected cell associated with this MeasObjectNR.

nrofSS-BlocksToAverage: Indicates the maximum number of measurement results per beam based on SS/PBCH blocks to be averaged. The same value applies for each detected cell associated with this MeasObject.

These parameters define per RS how the UE uses beams to compute cell quality. Averaging multiple beams has the potential to reduce handover ping-pong rate but may delay the triggering of measurement reports in case the UE detects multiple beams per cell. Hence, if the network receives an RLF reporting including information that RLF has happened and additional beam measurements (with beams not necessarily used for CQD), network may figure out that RLF has occurred due to too late measurement reports due to CQD based on averages. Hence, receiving these reports may lead the network to disable averaging and/or reduce the number of averaged beams and/or raising the consolidation thresholds so that less beams are used for averaging.

2.7 Beam Reporting Parameters that May be Tuned Based on Assistance Information

RLFs may be happening (e.g., due to too early handovers) because the network hands over the UE to cells with a very good beam (e.g., CQD was very strong) but a very unstable beam, for example in cells with many narrow beams but not very stable. Hence, UE may drop right after performing the handover. That could be avoided by beam reporting for triggered cells. Hence, upon receiving an RLF report containing beam measurements, for example for the serving cell, the network may activate beam reporting, or possibly increase number of beams to be reported or lower consolidation thresholds so more beam measurements are included in measurement reports. These parameters are included in the reportConfig, as shown below:

ReportConfigNR Information Element

```
-- ASN1START
-- TAG-REPORT-CONFIG-START
ReportConfigNR ::=                    SEQUENCE {
    reportType                        CHOICE {
        periodical                        PeriodicalReportConfig,
        eventTriggered                    EventTriggerConfig,
        ...,
        reportCGI                         ReportCGI
    }
}
ReportCGI ::=                         SEQUENCE {
    cellForWhichToReportCGI               PhysCellId,
    ...
}
EventTriggerConfig::=                 SEQUENCE {
    eventId                           CHOICE {
        eventA1                           SEQUENCE {
            a1-Threshold                      MeasTriggerQuantity,
            reportOnLeave                     BOOLEAN,
            hysteresis                        Hysteresis,
            timeToTrigger                     TimeToTrigger
        },
        eventA2                           SEQUENCE {
            a2-Threshold                      MeasTriggerQuantity,
            reportOnLeave                     BOOLEAN,
            hysteresis                        Hysteresis,
            timeToTrigger                     TimeToTrigger
        },
        eventA3                           SEQUENCE {
            a3-Offset                         MeasTriggerQuantityOffset,
            reportOnLeave                     BOOLEAN,
            hysteresis                        Hysteresis,
            timeToTrigger                     TimeToTrigger,
            useWhiteCellList                  BOOLEAN
        },
        eventA4                           SEQUENCE {
            a4-Threshold                      MeasTriggerQuantity,
            reportOnLeave                     BOOLEAN,
            hysteresis                        Hysteresis,
            timeToTrigger                     TimeToTrigger,
            useWhiteCellList                  BOOLEAN
        },
        eventA5                           SEQUENCE {
            a5-Threshold1                     MeasTriggerQuantity,
            a5-Threshold2                     MeasTriggerQuantity,
            reportOnLeave                     BOOLEAN,
            hysteresis                        Hysteresis,
            timeToTrigger                     TimeToTrigger,
            useWhiteCellList                  BOOLEAN
        },
```

-continued

```
       eventA6                         SEQUENCE {
          a6-Offset                       MeasTriggerQuantityOffset,
          reportOnLeave                   BOOLEAN,
          hysteresis                      Hysteresis,
          timeToTrigger                   TimeToTrigger,
          useWhiteCellList                BOOLEAN
       },
       ...
   },
   rsType                           NR-RS-Type,
   reportInterval                   ReportInterval,
   reportAmount                         ENUMERATED {r1, r2, r4, r8, r16, r32, r64,
infinity},
   reportQuantityCell               MeasReportQuantity,
   maxReportCells                   INTEGER (1..maxCellReport),
   reportQuantityRS-Indexes                     MeasReportQuantity
OPTIONAL,   -- Need R
   maxNrofRS-IndexesToReport                        INTEGER
(1..maxNrofIndexesToReport)                           OPTIONAL,   -- Need R
   includeBeamMeasurements                       BOOLEAN,
   reportAddNeighMeas               ENUMERATED {setup}
OPTIONAL,   -- Need R
   ...
}
PeriodicalReportConfig ::=              SEQUENCE {
   rsType                           NR-RS-Type,
   reportInterval                   ReportInterval,
   reportAmount                         ENUMERATED {r1, r2, r4, r8, r16, r32, r64,
infinity},
   reportQuantityCell               MeasReportQuantity,
   maxReportCells                   INTEGER (1..maxCellReport),
   reportQuantityRS-Indexes                     MeasReportQuantity
OPTIONAL,   -- Need R
   maxNrofRS-IndexesToReport                        INTEGER
(1..maxNrofIndexesToReport)                           OPTIONAL,   -- Need R
   includeBeamMeasurements                       BOOLEAN,
   useWhiteCellList                 BOOLEAN,
   ...
}
NR-RS-Type ::=                       ENUMERATED {ssb, csi-rs}
MeasTriggerQuantity ::=                  CHOICE {
   rsrp                             RSRP-Range,
   rsrq                             RSRQ-Range,
   sinr                             SINR-Range
}
MeasTriggerQuantityOffset ::=                 CHOICE {
   rsrp                             INTEGER (-30..30),
   rsrq                             INTEGER (-30..30),
   sinr                             INTEGER (-30..30)
}
MeasReportQuantity ::=                   SEQUENCE {
   rsrp                             BOOLEAN,
   rsrq                             BOOLEAN,
   sinr                             BOOLEAN
}
-- TAG-REPORT-CONFIG-STOP
-- ASN1STOP
``` maxNrofRS-IndexesToReport: This indicates to the UE the maximum number of RS indexes to include in the measurement report for A1-A6 events. This value may be increased in case RLFs are being triggered due to the network deciding to perform handovers to cells with too few good beams (i.e., providing good cell coverage due to best beam, but not so stable).

Figure 21:
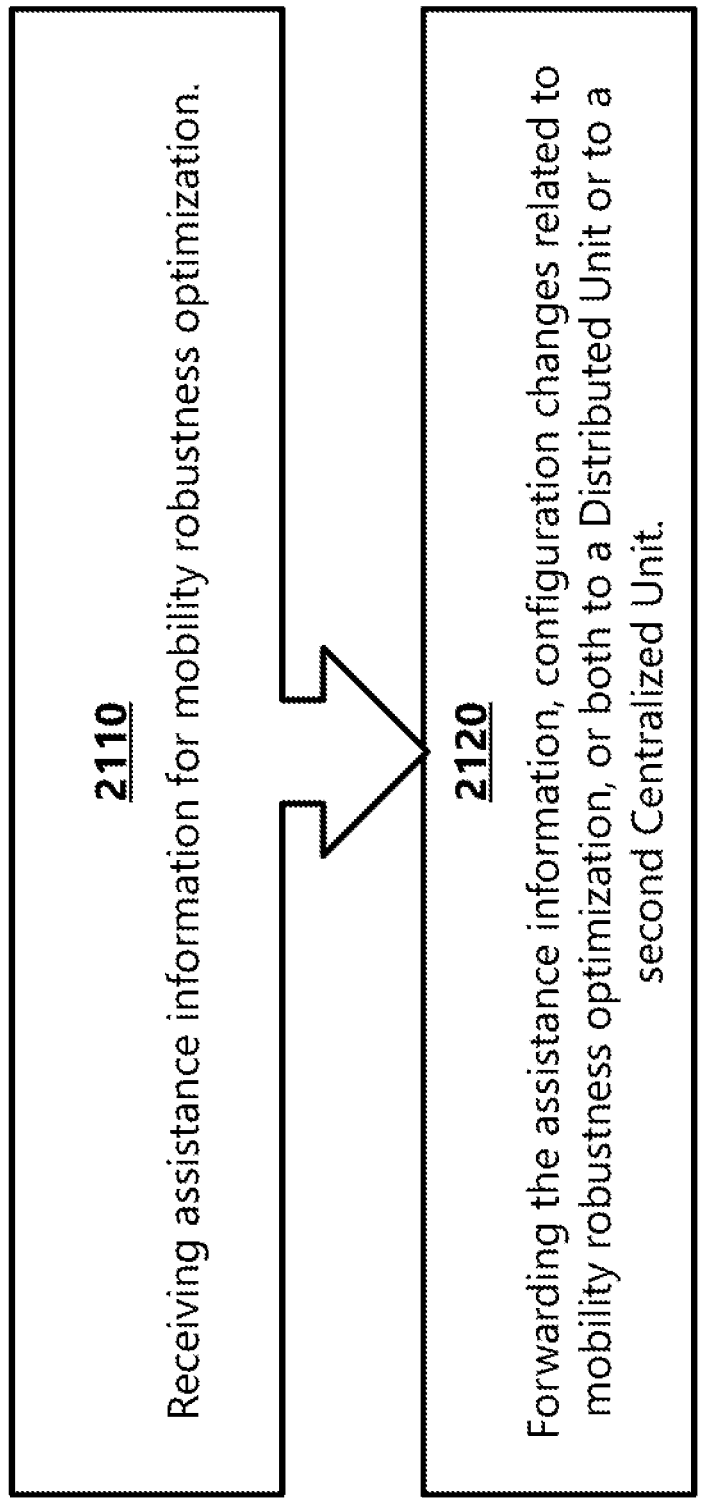
FIG. 21 illustrates an example of a method performed by a network node comprising a Centralized Unit, in accordance with certain embodiments.

FIG. 21 illustrates an example of a method performed by a network node comprising a Centralized Unit, in accordance with certain embodiments. Examples of a network node, in general, are further described below with respect to FIGS. 24-30 (see e.g., network node 160, which comprises processing circuitry 170 and power circuitry 187, in accordance with certain embodiments). As described above, a network node may be arranged in a split-architecture comprising one or more CUs and one or more DUs (see e.g., FIGS. 1, 9, and 12-15).

At step 2110, the method comprises receiving assistance information for mobility robustness optimization. Examples of assistance information may include a radio link failure report or a handover report. In certain embodiments, the assistance information is received from a wireless device, an example of which is shown in FIGS. 12-13. In certain other embodiments, the assistance information is received from another CU, an example of which is shown in FIGS. 14-15. The CUs may be part of the same network node or different network nodes, depending on the embodiment.

At step 2120, the method comprises forwarding the assistance information, configuration changes related to mobility robustness optimization, or both to a DU or to a second CU. For example, in certain embodiments, the first CU determines a location where a failure may have originated and forwards the assistance information and/or configuration changes to the location where the failure may have originated. In certain embodiments, the location where the failure may have originated may comprise a location within a network, such as a network node (e.g., gNB), a CU, a DU, and/or a cell where the failure may have originated. If the failure may have originated in a cell of a DU associated with the first CU, the first CU forwards the assistance information and/or configuration changes to the DU comprising the cell where the failure may have originated. If the failure may have originated in a cell of DU associated with the second CU, the first CU forward the assistance information and/or configuration changes to the second CU (and the second CU may then forward the assistance information to its DU comprising the cell where the failure may have originated). In certain embodiments, the first CU determines the location where the failure originated is determined based on the assistance information. For example, the first CU determines the location where the failure originated one or more of: a failure cause determined based on the received assistance information; and location information provided in the assistance information.

In certain embodiments, the first CU determines a mapping between a cell identifier the DU. As an example, in certain embodiments, the assistance information indicates a cell identifier of a cell where the failure may have originated, and the first CU determines the DU associated with that cell. The first CU may use the mapping to determine where to forward the assistance information and/or configuration changes.

The first CU may determine the assistance information and/or configuration changes to forward in step 2120 in any suitable manner. In certain embodiments, the first CU selects a portion of the assistance information received in step 2110 to forward and then forwards the selected portion to the DU or the second CU in step 2120. In certain embodiments, the first CU uses the assistance information received in step 2110 to determine the configuration changes related to mobility robustness optimization. As an example, the first CU may determine a failure cause based on the assistance information received in step 2110, and may then determine the configuration changes that may reduce the likelihood of a similar failure occurring in the future. The first CU may then forward the configuration changes in step 2120, for example, so that the configuration changes can be applied in the cell where the failure may have originated.

In the examples described above, the network node comprising the first CU may also comprise the second CU, or another network node may comprise the second CU, depending on the embodiment.

Although certain embodiments have described the location where the failure may have originated as comprising a location in a network, in other embodiments, the location where the failure may have originated may comprise a physical or geographical location where the failure may have originated. The physical or geographical location may be in addition to or as an alternative to the location in the network. In certain embodiments, a location where the failure may have originated generally refers to a location that satisfies one or more criteria indicating a likelihood that the failure originated in that location. As an example, a failure within a coverage area of a cell may indicate a likelihood that the failure originated in a DU associated with that cell, which may in turn indicate a likelihood that the failure originated in a CU associated with that DU.

Figure 22:
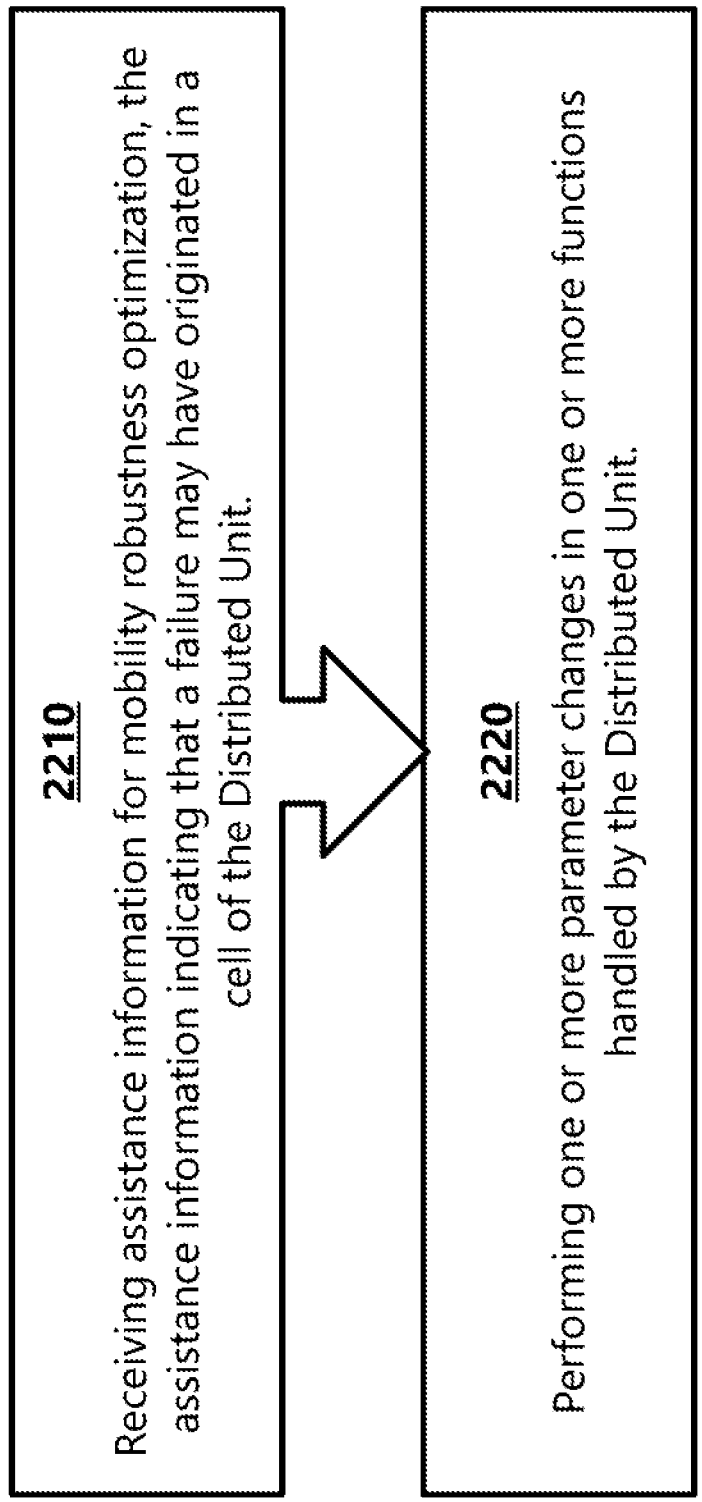
FIG. 22 illustrates an example of a method performed by a network node comprising a Distributed Unit, in accordance with certain embodiments.

FIG. 22 illustrates an example of a method performed by a network node comprising a Distributed Unit, in accordance with certain embodiments. Examples of a network node, in general, are further described below with respect to FIGS. 24-30 (see e.g., network node 160, which comprises processing circuitry 170 and power circuitry 187, in accordance with certain embodiments). As described above, a network node may be arranged in a split-architecture comprising one or more CUs and one or more DUs (see e.g., FIGS. 1, 9, and 12-15).

At step 2210, the method comprises receiving assistance information for mobility robustness optimization. The assistance information indicates that a failure may have originated in a cell of the DU. For example, in certain embodiments, the assistance information comprises a radio link failure report. In certain embodiments, the DU receives the assistance information from a CU. FIGS. 12-13 illustrate an example where the DU receives the assistance information from a first CU (a CU that receives the assistance information from a wireless device). FIGS. 14-15 illustrate an example where the DU receives the assistance information from a second CU (a CU that receives the assistance information from another CU).

At step 2220, the method comprises performing one or more parameter changes in one or more functions handled by the DU. Examples of functions handled by the DU include one or more of: random access; beam failure detection; beam failure recovery; radio link monitoring; cell quality derivation; beam management; and one or more other functions affected by beamforming parameters.

In certain embodiments, the DU may determine the one or more parameter changes to perform based at least in part on the assistance information. As an example, the DU may determine a failure cause based on the received assistance information. In certain embodiments, the DU may determine the one or more parameter changes to perform based at least in part on the determined failure cause (e.g., changing one or more parameters that are determined based on the failure cause may reduce the likelihood of a similar failure happening in the future). As another example, in certain embodiments, the DU may determine a location where a failure originated based on the received assistance information. In certain embodiments, the location where the failure may have originated may comprise a location within a network, such as a network node (e.g., gNB), a CU, a DU, and/or a cell where the failure may have originated. In certain embodiments, the location where the failure originated is determined based on one or more of the failure cause determined based on the received assistance information and location information provided in the assistance information. The DU may then determine a location (e.g., a cell) where to perform the parameter change based on the location where the failure originated.

In certain embodiments, the DU may determine a mapping between a cell identifier and the Distributed Unit. The DU may use the mapping when determining the location of the failure. As an example, the DU may receive assistance information indicating a cell identifier of a cell where a failure occurred, map the cell identifier to a cell associated with the DU, and perform a parameter change in the cell.

In certain embodiments, the method further comprises indicating to a CU any parameter changes performed in the one or more functions handled by the DU. In this manner, the CU may be kept informed of parameter changes in the network.

Although certain embodiments have described the location where the failure may have originated as comprising a location in a network, in other embodiments, the location where the failure may have originated may comprise a physical or geographical location where the failure may have originated. The physical or geographical location may be in addition to or as an alternative to the location in the network. In certain embodiments, a location where the failure may have originated generally refers to a location that satisfies one or more criteria indicating a likelihood that the failure originated in that location. As an example, a failure within a coverage area of a cell may indicate a likelihood that the failure originated in a DU associated with that cell, which may in turn indicate a likelihood that the failure originated in a CU associated with that DU.

Figure 23:
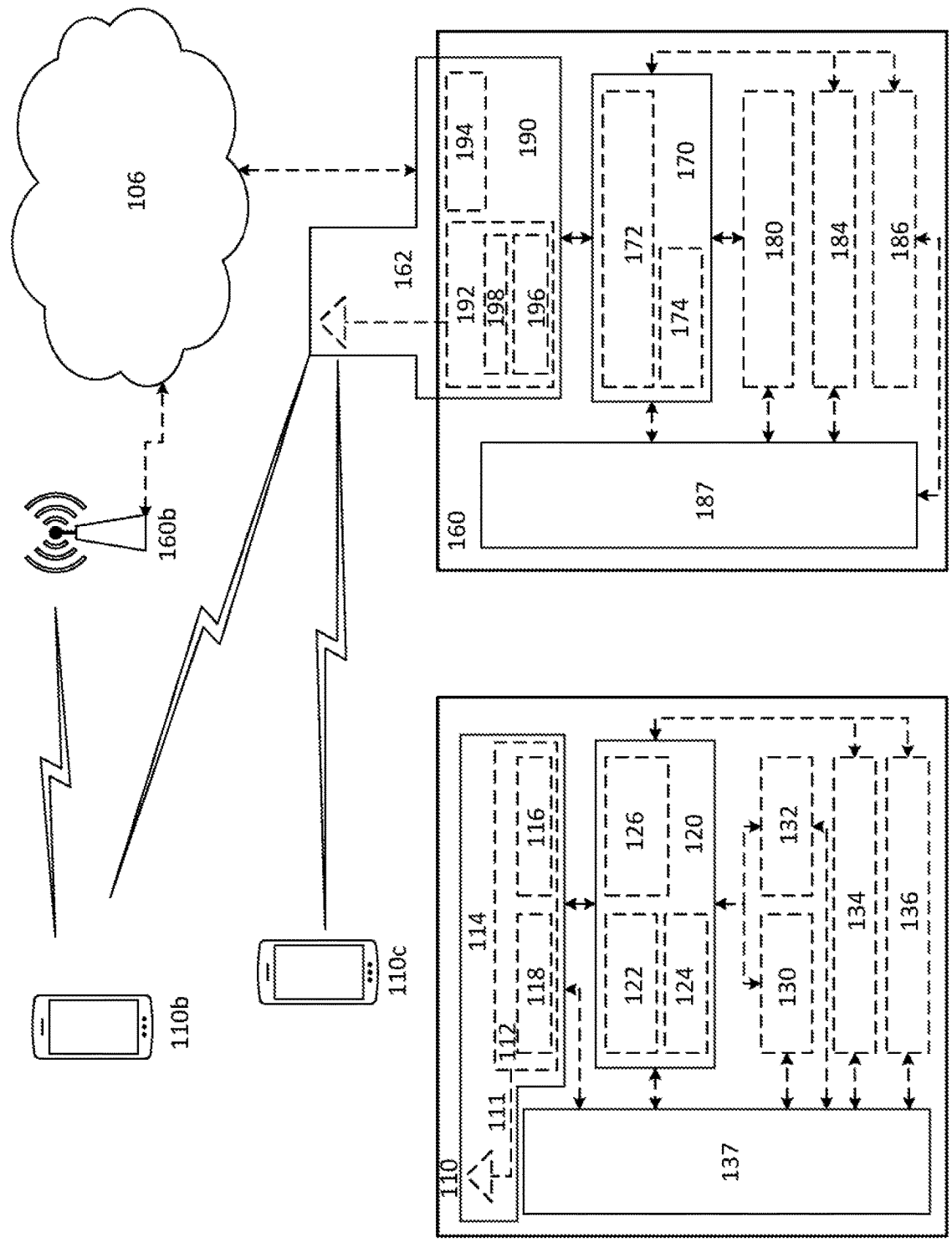
FIG. 23 illustrates an example wireless network, in accordance with certain embodiments.

Although the subject matter described herein may be implemented in any appropriate type of system using any suitable components, the embodiments disclosed herein are described in relation to a wireless network, such as the example wireless network illustrated in FIG. 23. For simplicity, the wireless network of FIG. 23 only depicts network 106, network nodes 160 and 160b, and WDs 110, 110b, and 110c. In practice, a wireless network may further include any additional elements suitable to support communication between wireless devices or between a wireless device and another communication device, such as a landline telephone, a service provider, or any other network node or end device. Of the illustrated components, network node 160 and wireless device (WD) 110 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 160 and WD 110 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NRNodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multi-cast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 23, network node 160 includes processing circuitry 170, device readable medium 180, interface 190, auxiliary equipment 184, power source 186, power circuitry 187, and antenna 162. Although network node 160 illustrated in the example wireless network of FIG. 23 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 160 are depicted as single boxes located within a larger box, or nested within multiple boxes, in practice, a network node may comprise multiple different physical components that make up a single illustrated component (e.g., device readable medium 180 may comprise multiple separate hard drives as well as multiple RAM modules).

Similarly, network node 160 may be composed of multiple physically separate components (e.g., a NodeB component and a RNC component, or a BTS component and a BSC component, etc.), which may each have their own respective components. In certain scenarios in which network node 160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 160 may be configured to support multiple radio access technologies (RATs). In such embodiments, some components may be duplicated (e.g., separate device readable medium 180 for the different RATs) and some components may be reused (e.g., the same antenna 162 may be shared by the RATs). Network node 160 may also include multiple sets of the various illustrated components for different wireless technologies integrated into network node 160, such as, for example, GSM, WCDMA, LTE, NR, WiFi, or Bluetooth wireless technologies. These wireless technologies may be integrated into the same or different chip or set of chips and other components within network node 160.

Processing circuitry 170 is configured to perform any determining, calculating, or similar operations (e.g., certain obtaining operations) described herein as being provided by a network node. These operations performed by processing circuitry 170 may include processing information obtained by processing circuitry 170 by, for example, converting the obtained information into other information, comparing the obtained information or converted information to information stored in the network node, and/or performing one or more operations based on the obtained information or converted information, and as a result of said processing making a determination.

Processing circuitry 170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 160 components, such as device readable medium 180, network node 160 functionality. For example, processing circuitry 170 may execute instructions stored in device readable medium 180 or in memory within processing circuitry 170. Such functionality may include providing any of the various wireless features, functions, or benefits discussed herein. In some embodiments, processing circuitry 170 may include a system on a chip (SOC).

In some embodiments, processing circuitry 170 may include one or more of radio frequency (RF) transceiver circuitry 172 and baseband processing circuitry 174. In some embodiments, radio frequency (RF) transceiver circuitry 172 and baseband processing circuitry 174 may be on separate chips (or sets of chips), boards, or units, such as radio units and digital units. In alternative embodiments, part or all of RF transceiver circuitry 172 and baseband processing circuitry 174 may be on the same chip or set of chips, boards, or units In certain embodiments, some or all of the functionality described herein as being provided by a network node, base station, eNB or other such network device may be performed by processing circuitry 170 executing instructions stored on device readable medium 180 or memory within processing circuitry 170. In alternative embodiments, some or all of the functionality may be provided by processing circuitry 170 without executing instructions stored on a separate or discrete device readable medium, such as in a hard-wired manner. In any of those embodiments, whether executing instructions stored on a device readable storage medium or not, processing circuitry 170 can be configured to perform the described functionality. The benefits provided by such functionality are not limited to processing circuitry 170 alone or to other components of network node 160, but are enjoyed by network node 160 as a whole, and/or by end users and the wireless network generally.

Device readable medium 180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 170. Device readable medium 180 may store any suitable instructions, data or information, including a computer program, software, an application including one or more of logic, rules, code, tables, etc. and/or other instructions capable of being executed by processing circuitry 170 and, utilized by network node 160. Device readable medium 180 may be used to store any calculations made by processing circuitry 170 and/or any data received via interface 190. In some embodiments, processing circuitry 170 and device readable medium 180 may be considered to be integrated.

Interface 190 is used in the wired or wireless communication of signalling and/or data between network node 160, network 106, and/or WDs 110. As illustrated, interface 190 comprises port(s)/terminal(s) 194 to send and receive data, for example to and from network 106 over a wired connection. Interface 190 also includes radio front end circuitry 192 that may be coupled to, or in certain embodiments a part of, antenna 162. Radio front end circuitry 192 comprises filters 198 and amplifiers 196. Radio front end circuitry 192 may be connected to antenna 162 and processing circuitry 170. Radio front end circuitry may be configured to condition signals communicated between antenna 162 and processing circuitry 170. Radio front end circuitry 192 may receive digital data that is to be sent out to other network nodes or WDs via a wireless connection. Radio front end circuitry 192 may convert the digital data into a radio signal having the appropriate channel and bandwidth parameters using a combination of filters 198 and/or amplifiers 196. The radio signal may then be transmitted via antenna 162. Similarly, when receiving data, antenna 162 may collect radio signals which are then converted into digital data by radio front end circuitry 192. The digital data may be passed to processing circuitry 170. In other embodiments, the interface may comprise different components and/or different combinations of components.

In certain alternative embodiments, network node 160 may not include separate radio front end circuitry 192, instead, processing circuitry 170 may comprise radio front end circuitry and may be connected to antenna 162 without separate radio front end circuitry 192. Similarly, in some embodiments, all or some of RF transceiver circuitry 172 may be considered a part of interface 190. In still other embodiments, interface 190 may include one or more ports or terminals 194, radio front end circuitry 192, and RF transceiver circuitry 172, as part of a radio unit (not shown), and interface 190 may communicate with baseband processing circuitry 174, which is part of a digital unit (not shown).

Antenna 162 may include one or more antennas, or antenna arrays, configured to send and/or receive wireless signals. Antenna 162 may be coupled to radio front end circuitry 190 and may be any type of antenna capable of transmitting and receiving data and/or signals wirelessly. In some embodiments, antenna 162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 162 may be separate from network node 160 and may be connectable to network node 160 through an interface or port.

Antenna 162, interface 190, and/or processing circuitry 170 may be configured to perform any receiving operations and/or certain obtaining operations described herein as being performed by a network node. Any information, data and/or signals may be received from a wireless device, another network node and/or any other network equipment. Similarly, antenna 162, interface 190, and/or processing circuitry 170 may be configured to perform any transmitting operations described herein as being performed by a network node. Any information, data and/or signals may be transmitted to a wireless device, another network node and/or any other network equipment.

Power circuitry 187 may comprise, or be coupled to, power management circuitry and is configured to supply the components of network node 160 with power for performing the functionality described herein. Power circuitry 187 may receive power from power source 186. Power source 186 and/or power circuitry 187 may be configured to provide power to the various components of network node 160 in a form suitable for the respective components (e.g., at a voltage and current level needed for each respective component). Power source 186 may either be included in, or external to, power circuitry 187 and/or network node 160. For example, network node 160 may be connectable to an external power source (e.g., an electricity outlet) via an input circuitry or interface such as an electrical cable, whereby the external power source supplies power to power circuitry 187. As a further example, power source 186 may comprise a source of power in the form of a battery or battery pack which is connected to, or integrated in, power circuitry 187. The battery may provide backup power should the external power source fail. Other types of power sources, such as photovoltaic devices, may also be used.

Alternative embodiments of network node 160 may include additional components beyond those shown in FIG. 23 that may be responsible for providing certain aspects of the network node's functionality, including any of the functionality described herein and/or any functionality necessary to support the subject matter described herein. For example, network node 160 may include user interface equipment to allow input of information into network node 160 and to allow output of information from network node 160. This may allow a user to perform diagnostic, maintenance, repair, and other administrative functions for network node 160.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 110 includes antenna 111, interface 114, processing circuitry 120, device readable medium 130, user interface equipment 132, auxiliary equipment 134, power source 136 and power circuitry 137. WD 110 may include multiple sets of one or more of the illustrated components for different wireless technologies supported by WD 110, such as, for example, GSM, WCDMA, LTE, NR, WiFi, WiMAX, or Bluetooth wireless technologies, just to mention a few. These wireless technologies may be integrated into the same or different chips or set of chips as other components within WD 110.

Antenna 111 may include one or more antennas or antenna arrays, configured to send and/or receive wireless signals, and is connected to interface 114. In certain alternative embodiments, antenna 111 may be separate from WD 110 and be connectable to WD 110 through an interface or port. Antenna 111, interface 114, and/or processing circuitry 120 may be configured to perform any receiving or transmitting operations described herein as being performed by a WD. Any information, data and/or signals may be received from a network node and/or another WD. In some embodiments, radio front end circuitry and/or antenna 111 may be considered an interface.

As illustrated, interface 114 comprises radio front end circuitry 112 and antenna 111. Radio front end circuitry 112 comprise one or more filters 118 and amplifiers 116. Radio front end circuitry 114 is connected to antenna 111 and processing circuitry 120, and is configured to condition signals communicated between antenna 111 and processing circuitry 120. Radio front end circuitry 112 may be coupled to or a part of antenna 111. In some embodiments, WD 110 may not include separate radio front end circuitry 112; rather, processing circuitry 120 may comprise radio front end circuitry and may be connected to antenna 111. Similarly, in some embodiments, some or all of RF transceiver circuitry 122 may be considered a part of interface 114. Radio front end circuitry 112 may receive digital data that is to be sent out to other network nodes or WDs via a wireless connection. Radio front end circuitry 112 may convert the digital data into a radio signal having the appropriate channel and bandwidth parameters using a combination of filters 118 and/or amplifiers 116. The radio signal may then be transmitted via antenna 111. Similarly, when receiving data, antenna 111 may collect radio signals which are then converted into digital data by radio front end circuitry 112. The digital data may be passed to processing circuitry 120. In other embodiments, the interface may comprise different components and/or different combinations of components.

Processing circuitry 120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 110 components, such as device readable medium 130, WD 110 functionality. Such functionality may include providing any of the various wireless features or benefits discussed herein. For example, processing circuitry 120 may execute instructions stored in device readable medium 130 or in memory within processing circuitry 120 to provide the functionality disclosed herein.

As illustrated, processing circuitry 120 includes one or more of RF transceiver circuitry 122, baseband processing circuitry 124, and application processing circuitry 126. In other embodiments, the processing circuitry may comprise different components and/or different combinations of components. In certain embodiments processing circuitry 120 of WD 110 may comprise a SOC. In some embodiments, RF transceiver circuitry 122, baseband processing circuitry 124, and application processing circuitry 126 may be on separate chips or sets of chips. In alternative embodiments, part or all of baseband processing circuitry 124 and application processing circuitry 126 may be combined into one chip or set of chips, and RF transceiver circuitry 122 may be on a separate chip or set of chips. In still alternative embodiments, part or all of RF transceiver circuitry 122 and baseband processing circuitry 124 may be on the same chip or set of chips, and application processing circuitry 126 may be on a separate chip or set of chips. In yet other alternative embodiments, part or all of RF transceiver circuitry 122, baseband processing circuitry 124, and application processing circuitry 126 may be combined in the same chip or set of chips. In some embodiments, RF transceiver circuitry 122 may be a part of interface 114. RF transceiver circuitry 122 may condition RF signals for processing circuitry 120.

In certain embodiments, some or all of the functionality described herein as being performed by a WD may be provided by processing circuitry 120 executing instructions stored on device readable medium 130, which in certain embodiments may be a computer-readable storage medium. In alternative embodiments, some or all of the functionality may be provided by processing circuitry 120 without executing instructions stored on a separate or discrete device readable storage medium, such as in a hard-wired manner. In any of those particular embodiments, whether executing instructions stored on a device readable storage medium or not, processing circuitry 120 can be configured to perform the described functionality. The benefits provided by such functionality are not limited to processing circuitry 120 alone or to other components of WD 110, but are enjoyed by WD 110 as a whole, and/or by end users and the wireless network generally.

Processing circuitry 120 may be configured to perform any determining, calculating, or similar operations (e.g., certain obtaining operations) described herein as being performed by a WD. These operations, as performed by processing circuitry 120, may include processing information obtained by processing circuitry 120 by, for example, converting the obtained information into other information, comparing the obtained information or converted information to information stored by WD 110, and/or performing one or more operations based on the obtained information or converted information, and as a result of said processing making a determination.

Device readable medium 130 may be operable to store a computer program, software, an application including one or more of logic, rules, code, tables, etc. and/or other instructions capable of being executed by processing circuitry 120. Device readable medium 130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 120. In some embodiments, processing circuitry 120 and device readable medium 130 may be considered to be integrated.

User interface equipment 132 may provide components that allow for a human user to interact with WD 110. Such interaction may be of many forms, such as visual, audial, tactile, etc. User interface equipment 132 may be operable to produce output to the user and to allow the user to provide input to WD 110. The type of interaction may vary depending on the type of user interface equipment 132 installed in WD 110. For example, if WD 110 is a smart phone, the interaction may be via a touch screen; if WD 110 is a smart meter, the interaction may be through a screen that provides usage (e.g., the number of gallons used) or a speaker that provides an audible alert (e.g., if smoke is detected). User interface equipment 132 may include input interfaces, devices and circuits, and output interfaces, devices and circuits. User interface equipment 132 is configured to allow input of information into WD 110, and is connected to processing circuitry 120 to allow processing circuitry 120 to process the input information. User interface equipment 132 may include, for example, a microphone, a proximity or other sensor, keys/buttons, a touch display, one or more cameras, a USB port, or other input circuitry. User interface equipment 132 is also configured to allow output of information from WD 110, and to allow processing circuitry 120 to output information from WD 110. User interface equipment 132 may include, for example, a speaker, a display, vibrating circuitry, a USB port, a headphone interface, or other output circuitry. Using one or more input and output interfaces, devices, and circuits, of user interface equipment 132, WD 110 may communicate with end users and/or the wireless network, and allow them to benefit from the functionality described herein.

Auxiliary equipment 134 is operable to provide more specific functionality which may not be generally performed by WDs. This may comprise specialized sensors for doing measurements for various purposes, interfaces for additional types of communication such as wired communications etc.

The inclusion and type of components of auxiliary equipment 134 may vary depending on the embodiment and/or scenario.

Power source 136 may, in some embodiments, be in the form of a battery or battery pack. Other types of power sources, such as an external power source (e.g., an electricity outlet), photovoltaic devices or power cells, may also be used. WD 110 may further comprise power circuitry 137 for delivering power from power source 136 to the various parts of WD 110 which need power from power source 136 to carry out any functionality described or indicated herein. Power circuitry 137 may in certain embodiments comprise power management circuitry. Power circuitry 137 may additionally or alternatively be operable to receive power from an external power source; in which case WD 110 may be connectable to the external power source (such as an electricity outlet) via input circuitry or an interface such as an electrical power cable. Power circuitry 137 may also in certain embodiments be operable to deliver power from an external power source to power source 136. This may be, for example, for the charging of power source 136. Power circuitry 137 may perform any formatting, converting, or other modification to the power from power source 136 to make the power suitable for the respective components of WD 110 to which power is supplied.

Figure 24:
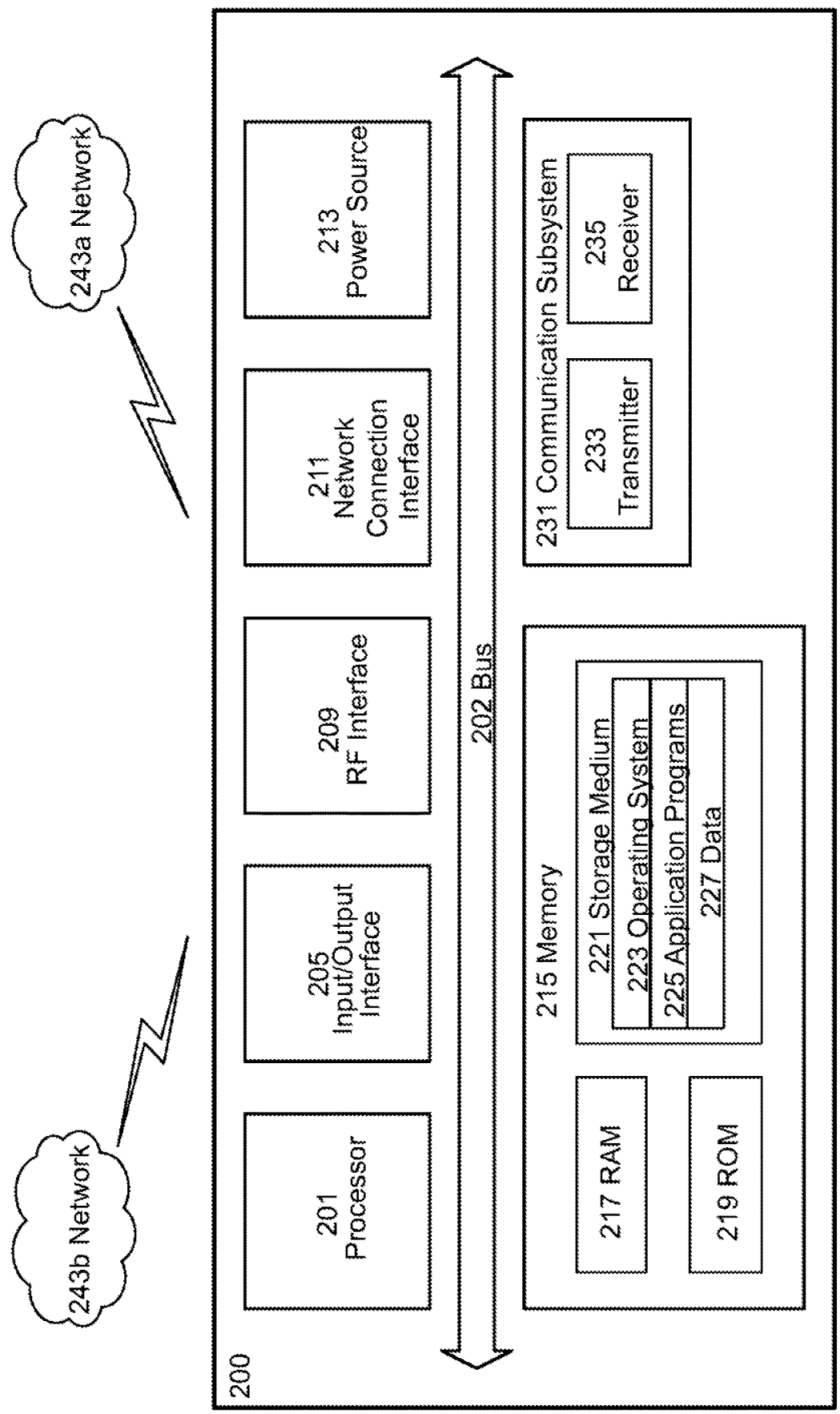
FIG. 24 illustrates an example user equipment, in accordance with certain embodiments.

FIG. 24 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 2200 may be any UE identified by the $3^{rd}$ Generation Partnership Project (3GPP), including a NB-IoT UE, a machine type communication (MTC) UE, and/or an enhanced MTC (eMTC) UE. UE 200, as illustrated in FIG. 24, is one example of a WD configured for communication in accordance with one or more communication standards promulgated by the $3^{rd}$ Generation Partnership Project (3GPP), such as 3GPP's GSM, UMTS, LTE, and/or 5G standards. As mentioned previously, the term WD and UE may be used interchangeable. Accordingly, although FIG. 24 is a UE, the components discussed herein are equally applicable to a WD, and vice-versa.

In FIG. 24, UE 200 includes processing circuitry 201 that is operatively coupled to input/output interface 205, radio frequency (RF) interface 209, network connection interface 211, memory 215 including random access memory (RAM) 217, read-only memory (ROM) 219, and storage medium 221 or the like, communication subsystem 231, power source 233, and/or any other component, or any combination thereof. Storage medium 221 includes operating system 223, application program 225, and data 227. In other embodiments, storage medium 221 may include other similar types of information. Certain UEs may utilize all of the components shown in FIG. 24, or only a subset of the components. The level of integration between the components may vary from one UE to another UE. Further, certain UEs may contain multiple instances of a component, such as multiple processors, memories, transceivers, transmitters, receivers, etc.

In FIG. 24, processing circuitry 201 may be configured to process computer instructions and data. Processing circuitry 201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 201 may include two central processing units (CPUs). Data may be information in a form suitable for use by a computer.

In the depicted embodiment, input/output interface 205 may be configured to provide a communication interface to an input device, output device, or input and output device. UE 200 may be configured to use an output device via input/output interface 205. An output device may use the same type of interface port as an input device. For example, a USB port may be used to provide input to and output from UE 200. The output device may be a speaker, a sound card, a video card, a display, a monitor, a printer, an actuator, an emitter, a smartcard, another output device, or any combination thereof. UE 200 may be configured to use an input device via input/output interface 205 to allow a user to capture information into UE 200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 24, RF interface 209 may be configured to provide a communication interface to RF components such as a transmitter, a receiver, and an antenna. Network connection interface 211 may be configured to provide a communication interface to network 243*a*. Network 243*a* may encompass wired and/or wireless networks such as a local-area network (LAN), a wide-area network (WAN), a computer network, a wireless network, a telecommunications network, another like network or any combination thereof. For example, network 243*a* may comprise a Wi-Fi network. Network connection interface 211 may be configured to include a receiver and a transmitter interface used to communicate with one or more other devices over a communication network according to one or more communication protocols, such as Ethernet, TCP/IP, SONET, ATM, or the like. Network connection interface 211 may implement receiver and transmitter functionality appropriate to the communication network links (e.g., optical, electrical, and the like). The transmitter and receiver functions may share circuit components, software or firmware, or alternatively may be implemented separately.

RAM 217 may be configured to interface via bus 202 to processing circuitry 201 to provide storage or caching of data or computer instructions during the execution of software programs such as the operating system, application programs, and device drivers. ROM 219 may be configured to provide computer instructions or data to processing circuitry 201. For example, ROM 219 may be configured to store invariant low-level system code or data for basic system functions such as basic input and output (I/O), startup, or reception of keystrokes from a keyboard that are stored in a non-volatile memory. Storage medium 221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 221 may be configured to include operating system 223, application program 225 such as a web browser application, a widget or gadget engine or another application, and data file 227. Storage medium 221 may store, for use by UE 200, any of a variety of various operating systems or combinations of operating systems.

Storage medium 221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 221 may allow UE 200 to access computer-executable instructions, application programs or the like, stored on transitory or non-transitory memory media, to off-load data, or to upload data. An article of manufacture, such as one utilizing a communication system may be tangibly embodied in storage medium 221, which may comprise a device readable medium.

In FIG. 24, processing circuitry 201 may be configured to communicate with network 243b using communication subsystem 231. Network 243a and network 243b may be the same network or networks or different network or networks. Communication subsystem 231 may be configured to include one or more transceivers used to communicate with network 243b. For example, communication subsystem 231 may be configured to include one or more transceivers used to communicate with one or more remote transceivers of another device capable of wireless communication such as another WD, UE, or base station of a radio access network (RAN) according to one or more communication protocols, such as IEEE 802.2, CDMA, WCDMA, GSM, LTE, UTRAN, WiMax, or the like. Each transceiver may include transmitter 233 and/or receiver 235 to implement transmitter or receiver functionality, respectively, appropriate to the RAN links (e.g., frequency allocations and the like). Further, transmitter 233 and receiver 235 of each transceiver may share circuit components, software or firmware, or alternatively may be implemented separately.

In the illustrated embodiment, the communication functions of communication subsystem 231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 231 may include cellular communication, Wi-Fi communication, Bluetooth communication, and GPS communication. Network 243b may encompass wired and/or wireless networks such as a local-area network (LAN), a wide-area network (WAN), a computer network, a wireless network, a telecommunications network, another like network or any combination thereof. For example, network 243b may be a cellular network, a Wi-Fi network, and/or a near-field network. Power source 213 may be configured to provide alternating current (AC) or direct current (DC) power to components of UE 200.

The features, benefits and/or functions described herein may be implemented in one of the components of UE 200 or partitioned across multiple components of UE 200. Further, the features, benefits, and/or functions described herein may be implemented in any combination of hardware, software or firmware. In one example, communication subsystem 231 may be configured to include any of the components described herein. Further, processing circuitry 201 may be configured to communicate with any of such components over bus 202. In another example, any of such components may be represented by program instructions stored in memory that when executed by processing circuitry 201 perform the corresponding functions described herein. In another example, the functionality of any of such components may be partitioned between processing circuitry 201 and communication subsystem 231. In another example, the non-computationally intensive functions of any of such components may be implemented in software or firmware and the computationally intensive functions may be implemented in hardware.

Figure 25:
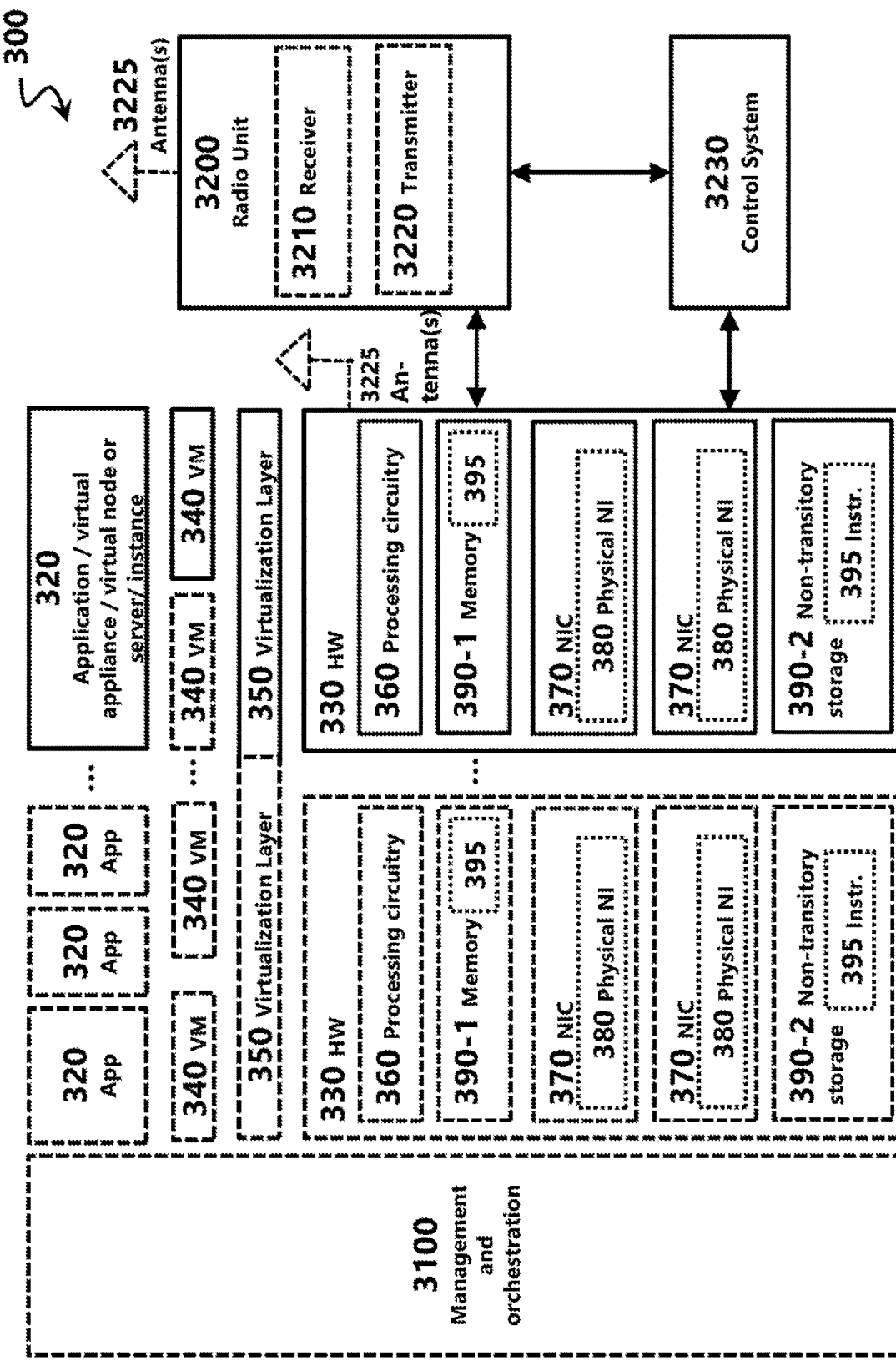
FIG. 25 illustrates an example virtualization environment, in accordance with certain embodiments.

FIG. 25 is a schematic block diagram illustrating a virtualization environment 300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 300 hosted by one or more of hardware nodes 330. Further, in embodiments in which the virtual node is not a radio access node or does not require radio connectivity (e.g., a core network node), then the network node may be entirely virtualized.

The functions may be implemented by one or more applications 320 (which may alternatively be called software instances, virtual appliances, network functions, virtual nodes, virtual network functions, etc.) operative to implement some of the features, functions, and/or benefits of some of the embodiments disclosed herein. Applications 320 are run in virtualization environment 300 which provides hardware 330 comprising processing circuitry 360 and memory 390. Memory 390 contains instructions 395 executable by processing circuitry 360 whereby application 320 is operative to provide one or more of the features, benefits, and/or functions disclosed herein.

Virtualization environment 300, comprises general-purpose or special-purpose network hardware devices 330 comprising a set of one or more processors or processing circuitry 360, which may be commercial off-the-shelf (COTS) processors, dedicated Application Specific Integrated Circuits (ASICs), or any other type of processing circuitry including digital or analog hardware components or special purpose processors. Each hardware device may comprise memory 390-1 which may be non-persistent memory for temporarily storing instructions 395 or software executed by processing circuitry 360. Each hardware device may comprise one or more network interface controllers (NICs) 370, also known as network interface cards, which include physical network interface 380. Each hardware device may also include non-transitory, persistent, machine-readable storage media 390-2 having stored therein software 395 and/or instructions executable by processing circuitry 360. Software 395 may include any type of software including software for instantiating one or more virtualization layers 350 (also referred to as hypervisors), software to execute virtual machines 340 as well as software allowing it to execute functions, features and/or benefits described in relation with some embodiments described herein.

Virtual machines 340, comprise virtual processing, virtual memory, virtual networking or interface and virtual storage, and may be run by a corresponding virtualization layer 350 or hypervisor. Different embodiments of the instance of virtual appliance 320 may be implemented on one or more of virtual machines 340, and the implementations may be made in different ways.

During operation, processing circuitry 360 executes software 395 to instantiate the hypervisor or virtualization layer 350, which may sometimes be referred to as a virtual machine monitor (VMM). Virtualization layer 350 may present a virtual operating platform that appears like networking hardware to virtual machine 340.

As shown in FIG. 25, hardware 330 may be a standalone network node with generic or specific components. Hardware 330 may comprise antenna 3225 and may implement some functions via virtualization. Alternatively, hardware 330 may be part of a larger cluster of hardware (e.g. such as in a data center or customer premise equipment (CPE)) where many hardware nodes work together and are managed via management and orchestration (MANO) 3100, which, among others, oversees lifecycle management of applications 320.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 340 may be a software implementation of a physical machine that runs programs as if they were executing on a physical, non-virtualized machine. Each of virtual machines 340, and that part of hardware 330 that executes that virtual machine, be it hardware dedicated to that virtual machine and/or hardware shared by that virtual machine with others of the virtual machines 340, forms a separate virtual network elements (VNE).

Still in the context of NFV, Virtual Network Function (VNF) is responsible for handling specific network functions that run in one or more virtual machines 340 on top of hardware networking infrastructure 330 and corresponds to application 320 in FIG. 25.

In some embodiments, one or more radio units 3200 that each include one or more transmitters 3220 and one or more receivers 3210 may be coupled to one or more antennas 3225. Radio units 3200 may communicate directly with hardware nodes 330 via one or more appropriate network interfaces and may be used in combination with the virtual components to provide a virtual node with radio capabilities, such as a radio access node or a base station.

In some embodiments, some signalling can be effected with the use of control system 3230 which may alternatively be used for communication between the hardware nodes 330 and radio units 3200.

Figure 26:
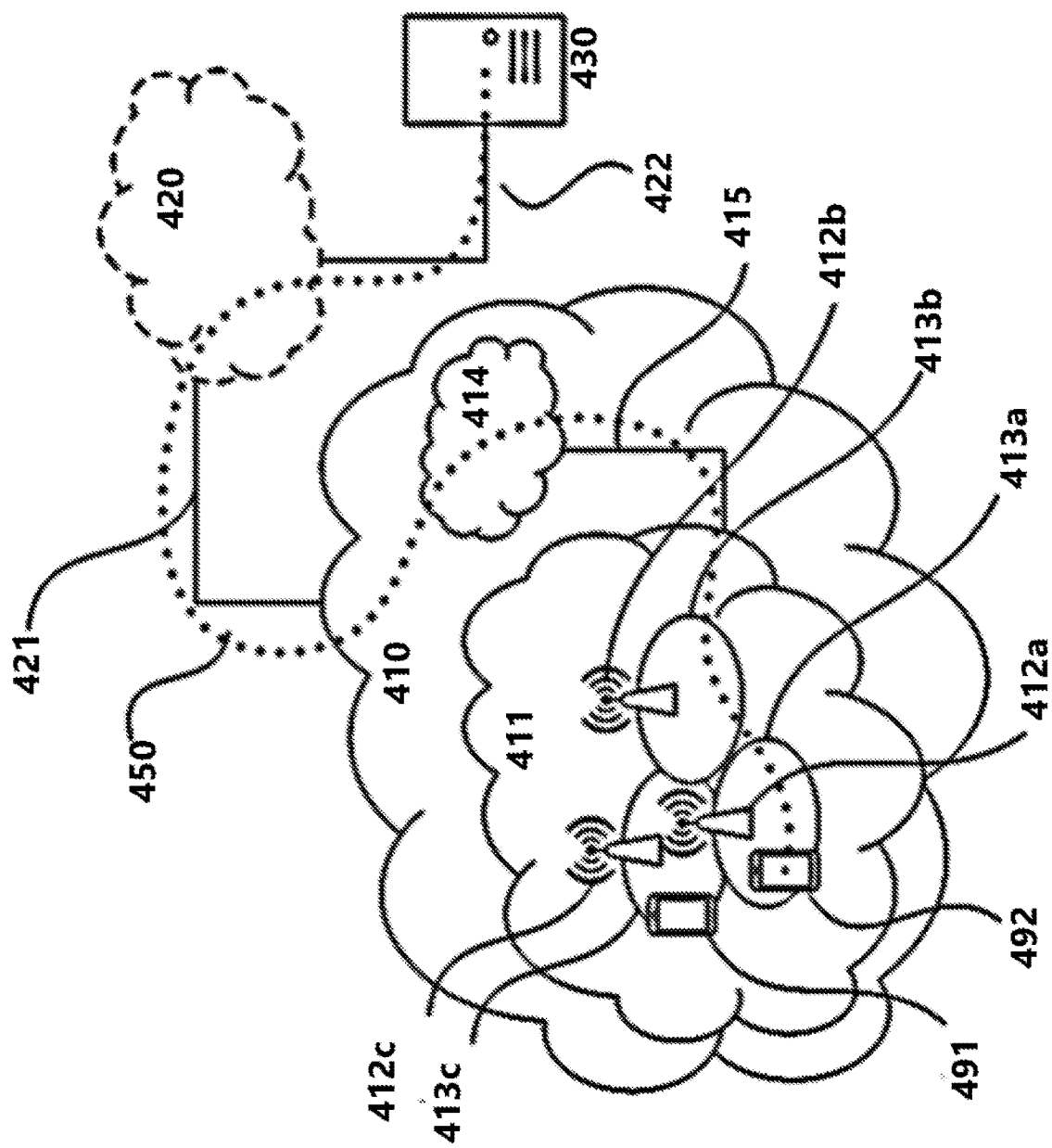
FIG. 26 illustrates an example telecommunication network connected via an intermediate network to a host computer, in accordance with certain embodiments.

With reference to FIG. 26, in accordance with an embodiment, a communication system includes telecommunication network 410, such as a 3GPP-type cellular network, which comprises access network 411, such as a radio access network, and core network 414. Access network 411 comprises a plurality of base stations 412a, 412b, 412c, such as NBs, eNBs, gNBs or other types of wireless access points, each defining a corresponding coverage area 413a, 413b, 413c. Each base station 412a, 412b, 412c is connectable to core network 414 over a wired or wireless connection 415. A first UE 491 located in coverage area 413c is configured to wirelessly connect to, or be paged by, the corresponding base station 412c. A second UE 492 in coverage area 413a is wirelessly connectable to the corresponding base station 412a. While a plurality of UEs 491, 492 are illustrated in this example, the disclosed embodiments are equally applicable to a situation where a sole UE is in the coverage area or where a sole UE is connecting to the corresponding base station 412.

Telecommunication network 410 is itself connected to host computer 430, which may be embodied in the hardware and/or software of a standalone server, a cloud-implemented server, a distributed server or as processing resources in a server farm. Host computer 430 may be under the ownership or control of a service provider, or may be operated by the service provider or on behalf of the service provider. Connections 421 and 422 between telecommunication network 410 and host computer 430 may extend directly from core network 414 to host computer 430 or may go via an optional intermediate network 420. Intermediate network 420 may be one of, or a combination of more than one of, a public, private or hosted network; intermediate network 420, if any, may be a backbone network or the Internet; in particular, intermediate network 420 may comprise two or more sub-networks (not shown).

The communication system of FIG. 26 as a whole enables connectivity between the connected UEs 491, 492 and host computer 430. The connectivity may be described as an over-the-top (OTT) connection 450. Host computer 430 and the connected UEs 491, 492 are configured to communicate data and/or signaling via OTT connection 450, using access network 411, core network 414, any intermediate network 420 and possible further infrastructure (not shown) as intermediaries. OTT connection 450 may be transparent in the sense that the participating communication devices through which OTT connection 450 passes are unaware of routing of uplink and downlink communications. For example, base station 412 may not or need not be informed about the past routing of an incoming downlink communication with data originating from host computer 430 to be forwarded (e.g., handed over) to a connected UE 491. Similarly, base station 412 need not be aware of the future routing of an outgoing uplink communication originating from the UE 491 towards the host computer 430.

Example implementations, in accordance with an embodiment, of the UE, base station and host computer discussed in the preceding paragraphs will now be described with reference to FIG. 27. In communication system 500, host computer 510 comprises hardware 515 including communication interface 516 configured to set up and maintain a wired or wireless connection with an interface of a different communication device of communication system 500. Host computer 510 further comprises processing circuitry 518, which may have storage and/or processing capabilities. In particular, processing circuitry 518 may comprise one or more programmable processors, application-specific integrated circuits, field programmable gate arrays or combinations of these (not shown) adapted to execute instructions. Host computer 510 further comprises software 511, which is stored in or accessible by host computer 510 and executable by processing circuitry 518. Software 511 includes host application 512. Host application 512 may be operable to provide a service to a remote user, such as UE 530 connecting via OTT connection 550 terminating at UE 530 and host computer 510. In providing the service to the remote user, host application 512 may provide user data which is transmitted using OTT connection 550.

Communication system 500 further includes base station 520 provided in a telecommunication system and comprising hardware 525 enabling it to communicate with host computer 510 and with UE 530. Hardware 525 may include communication interface 526 for setting up and maintaining a wired or wireless connection with an interface of a different communication device of communication system 500, as well as radio interface 527 for setting up and maintaining at least wireless connection 570 with UE 530 located in a coverage area (not shown in FIG. 27) served by base station 520. Communication interface 526 may be configured to facilitate connection 560 to host computer 510. Connection 560 may be direct or it may pass through a core network (not shown in FIG. 27) of the telecommunication system and/or through one or more intermediate networks outside the telecommunication system. In the embodiment shown, hardware 525 of base station 520 further includes processing circuitry 528, which may comprise one or more programmable processors, application-specific integrated circuits, field programmable gate arrays or combinations of these (not shown) adapted to execute instructions. Base station 520 further has software 521 stored internally or accessible via an external connection.

Communication system 500 further includes UE 530 already referred to. Its hardware 535 may include radio interface 537 configured to set up and maintain wireless connection 570 with a base station serving a coverage area in which UE 530 is currently located. Hardware 535 of UE 530 further includes processing circuitry 538, which may comprise one or more programmable processors, application-specific integrated circuits, field programmable gate arrays or combinations of these (not shown) adapted to execute instructions. UE 530 further comprises software 531, which is stored in or accessible by UE 530 and executable by processing circuitry 538. Software 531 includes client application 532. Client application 532 may be operable to provide a service to a human or non-human user via UE 530, with the support of host computer 510. In host computer 510, an executing host application 512 may communicate with the executing client application 532 via OTT connection 550 terminating at UE 530 and host computer 510. In providing the service to the user, client application 532 may receive request data from host application 512 and provide user data in response to the request data. OTT connection 550 may transfer both the request data and the user data. Client application 532 may interact with the user to generate the user data that it provides.

Figure 27:
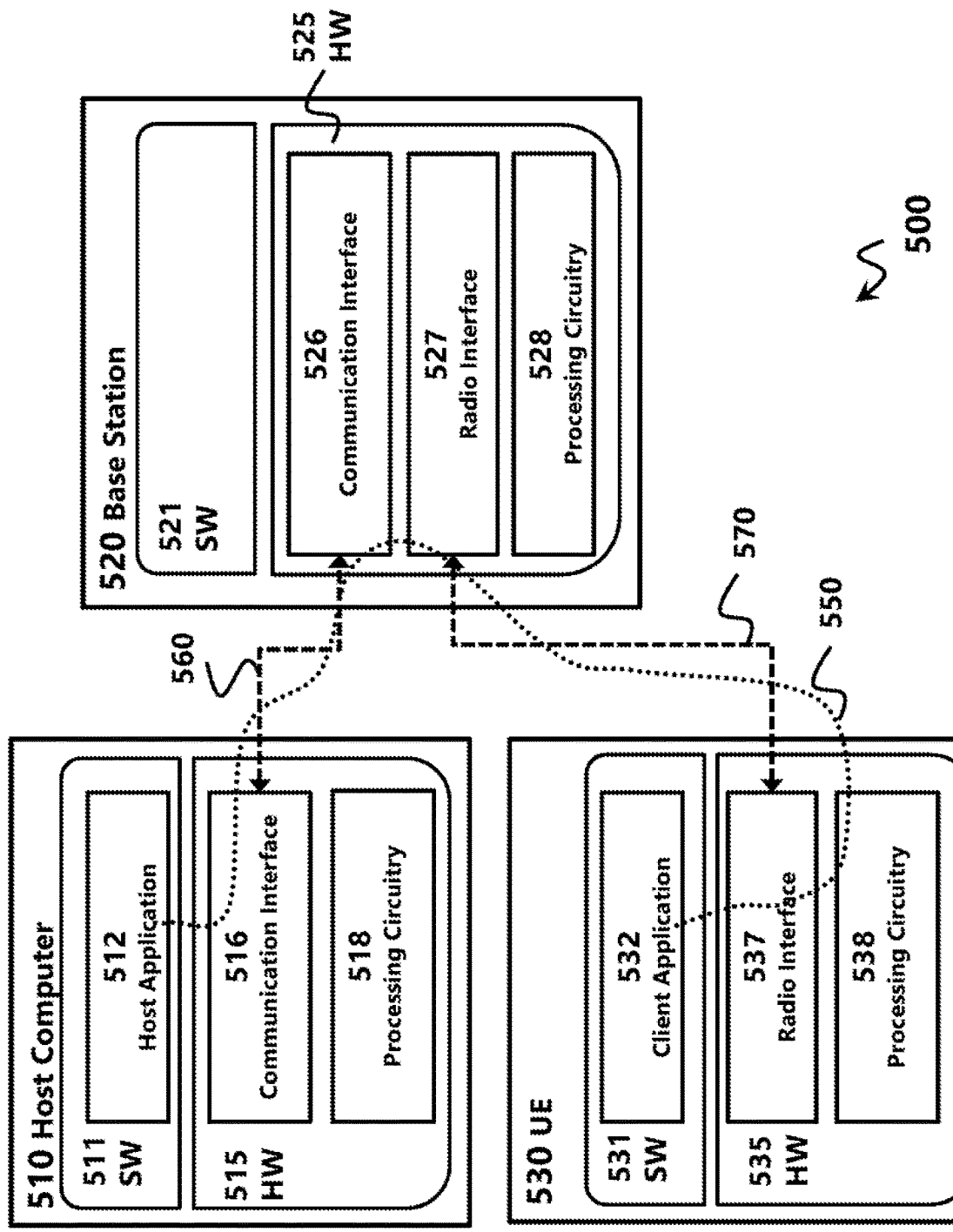
FIG. 27 illustrates an example host computer communicating via a base station with a user equipment over a partially wireless connection, in accordance with certain embodiments.

It is noted that host computer 510, base station 520 and UE 530 illustrated in FIG. 27 may be similar or identical to host computer 430, one of base stations 412*a*, 412*b*, 412*c* and one of UEs 491, 492 of FIG. 26, respectively. This is to say, the inner workings of these entities may be as shown in FIG. 27 and independently, the surrounding network topology may be that of FIG. 26.

In FIG. 27, OTT connection 550 has been drawn abstractly to illustrate the communication between host computer 510 and UE 530 via base station 520, without explicit reference to any intermediary devices and the precise routing of messages via these devices. Network infrastructure may determine the routing, which it may be configured to hide from UE 530 or from the service provider operating host computer 510, or both. While OTT connection 550 is active, the network infrastructure may further take decisions by which it dynamically changes the routing (e.g., on the basis of load balancing consideration or reconfiguration of the network).

Wireless connection 570 between UE 530 and base station 520 is in accordance with the teachings of the embodiments described throughout this disclosure. One or more of the various embodiments improve the performance of OTT services provided to UE 530 using OTT connection 550, in which wireless connection 570 forms the last segment.

A measurement procedure may be provided for the purpose of monitoring data rate, latency and other factors on which the one or more embodiments improve. There may further be an optional network functionality for reconfiguring OTT connection 550 between host computer 510 and UE 530, in response to variations in the measurement results. The measurement procedure and/or the network functionality for reconfiguring OTT connection 550 may be implemented in software 511 and hardware 515 of host computer 510 or in software 531 and hardware 535 of UE 530, or both. In embodiments, sensors (not shown) may be deployed in or in association with communication devices through which OTT connection 550 passes; the sensors may participate in the measurement procedure by supplying values of the monitored quantities exemplified above, or supplying values of other physical quantities from which software 511, 531 may compute or estimate the monitored quantities. The reconfiguring of OTT connection 550 may include message format, retransmission settings, preferred routing etc.; the reconfiguring need not affect base station 520, and it may be unknown or imperceptible to base station 520. Such procedures and functionalities may be known and practiced in the art. In certain embodiments, measurements may involve proprietary UE signaling facilitating host computer 510's measurements of throughput, propagation times, latency and the like. The measurements may be implemented in that software 511 and 531 causes messages to be transmitted, in particular empty or 'dummy' messages, using OTT connection 550 while it monitors propagation times, errors etc.

Figure 28:
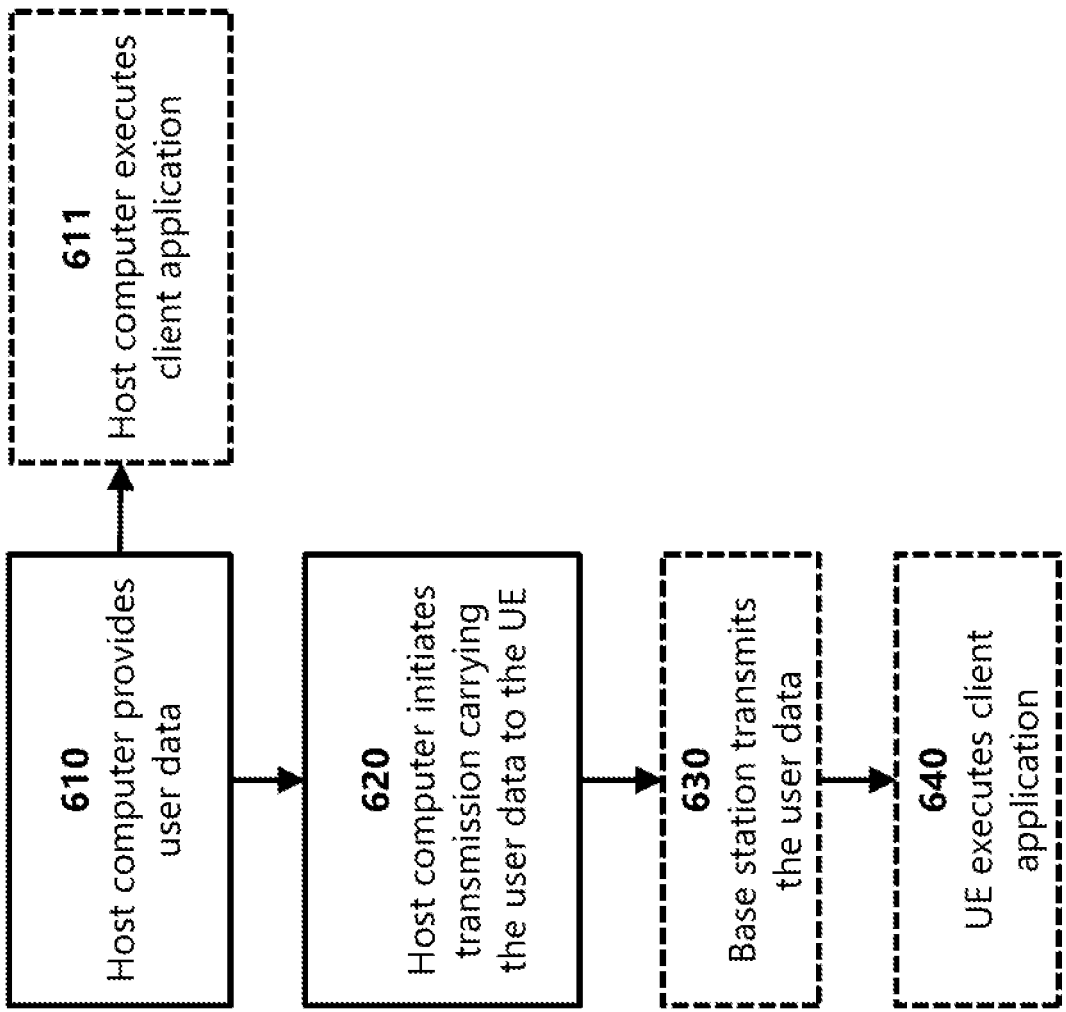
FIG. 28 is a flowchart illustrating an example method implemented in a communication system, in accordance certain embodiments.

FIG. 28 is a flowchart illustrating a method implemented in a communication system, in accordance with one embodiment. The communication system includes a host computer, a base station and a UE which may be those described with reference to FIGS. 26 and 27. For simplicity of the present disclosure, only drawing references to FIG. 28 will be included in this section. In step 610, the host computer provides user data. In substep 611 (which may be optional) of step 610, the host computer provides the user data by executing a host application. In step 620, the host computer initiates a transmission carrying the user data to the UE. In step 630 (which may be optional), the base station transmits to the UE the user data which was carried in the transmission that the host computer initiated, in accordance with the teachings of the embodiments described throughout this disclosure. In step 640 (which may also be optional), the UE executes a client application associated with the host application executed by the host computer.

Figure 29:
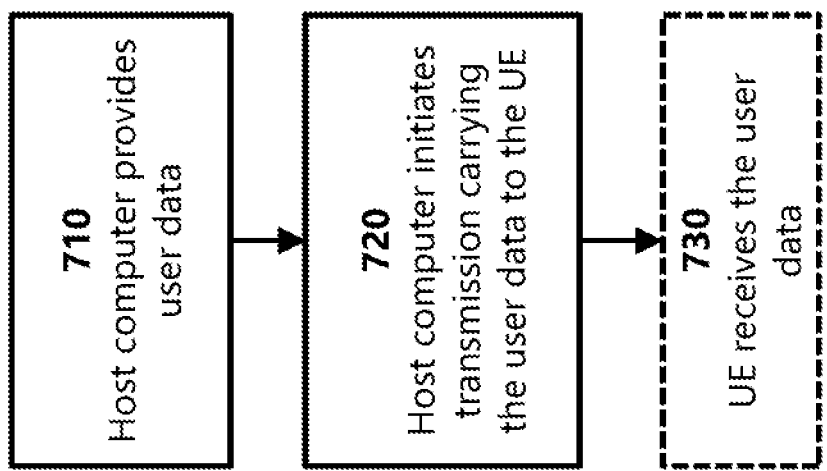
FIG. 29 is a flowchart illustrating a second example method implemented in a communication system, in accordance with certain embodiments.

FIG. 29 is a flowchart illustrating a method implemented in a communication system, in accordance with one embodiment. The communication system includes a host computer, a base station and a UE which may be those described with reference to FIGS. 26 and 27. For simplicity of the present disclosure, only drawing references to FIG. 29 will be included in this section. In step 710 of the method, the host computer provides user data. In an optional substep (not shown) the host computer provides the user data by executing a host application. In step 720, the host computer initiates a transmission carrying the user data to the UE. The transmission may pass via the base station, in accordance with the teachings of the embodiments described throughout this disclosure. In step 730 (which may be optional), the UE receives the user data carried in the transmission.

Figure 30:
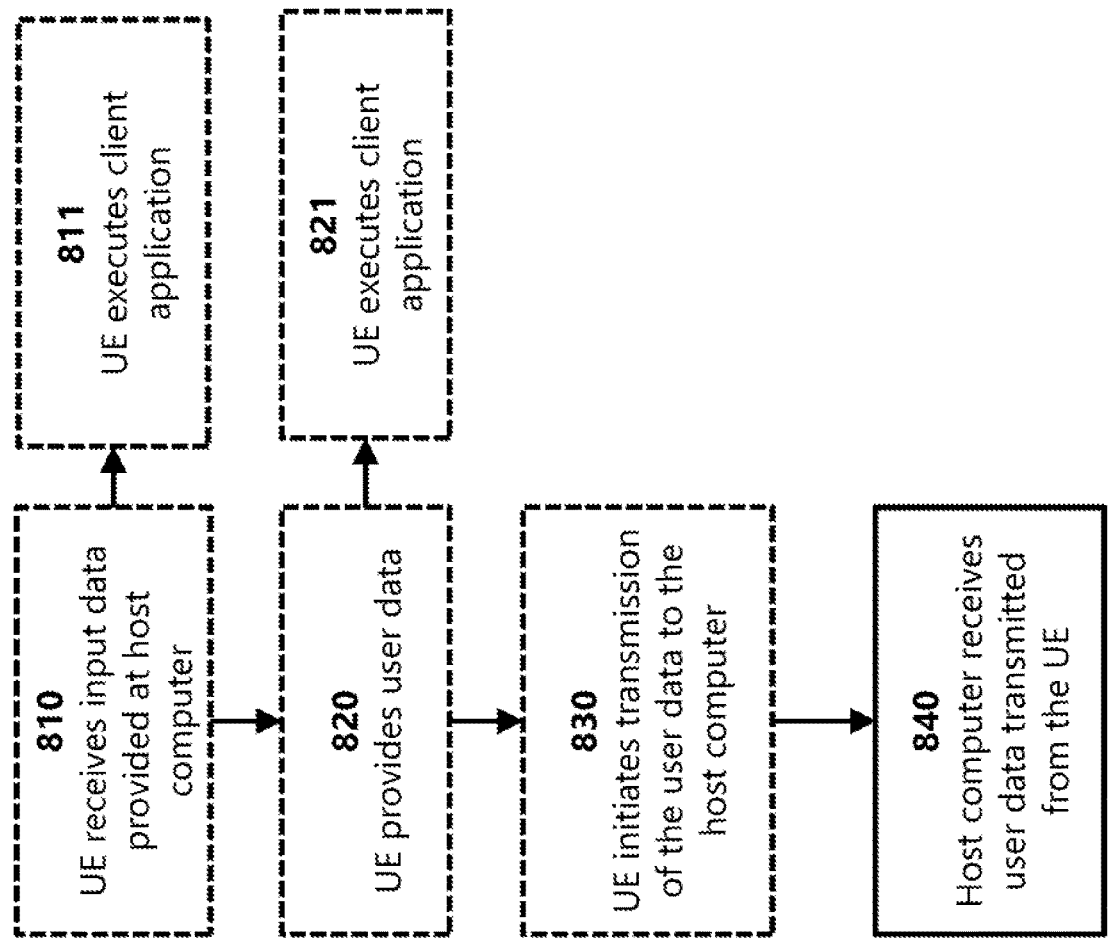
FIG. 30 is a flowchart illustrating a third method implemented in a communication system, in accordance with certain embodiments.

FIG. 30 is a flowchart illustrating a method implemented in a communication system, in accordance with one embodiment. The communication system includes a host computer, a base station and a UE which may be those described with reference to FIGS. 26 and 27. For simplicity of the present disclosure, only drawing references to FIG. 30 will be included in this section. In step 810 (which may be optional), the UE receives input data provided by the host computer. Additionally or alternatively, in step 820, the UE provides user data. In substep 821 (which may be optional) of step 820, the UE provides the user data by executing a client application. In substep 811 (which may be optional) of step 810, the UE executes a client application which provides the user data in reaction to the received input data provided by the host computer. In providing the user data, the executed client application may further consider user input received from the user. Regardless of the specific manner in which the user data was provided, the UE initiates, in substep 830 (which may be optional), transmission of the user data to the host computer. In step 840 of the method, the host computer receives the user data transmitted from the UE, in accordance with the teachings of the embodiments described throughout this disclosure.

Figure 31:
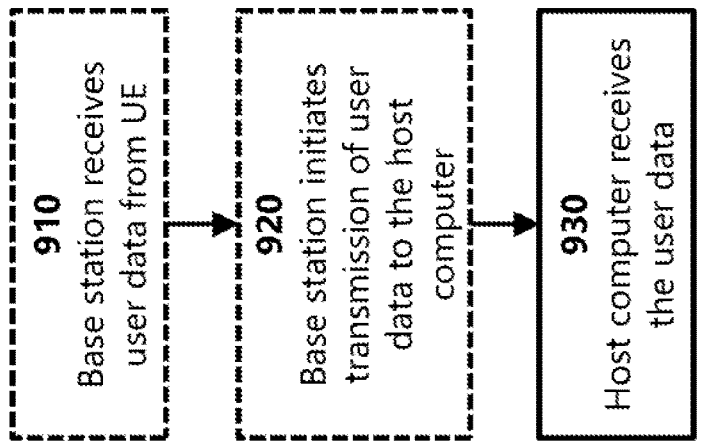
FIG. 31 is a flowchart illustrating a fourth method implemented in a communication system, in accordance with certain embodiments.

FIG. 31 is a flowchart illustrating a method implemented in a communication system, in accordance with one embodiment. The communication system includes a host computer, a base station and a UE which may be those described with reference to FIGS. 26 and 27. For simplicity of the present disclosure, only drawing references to FIG. 31 will be included in this section. In step 910 (which may be optional), in accordance with the teachings of the embodiments described throughout this disclosure, the base station receives user data from the UE. In step 920 (which may be optional), the base station initiates transmission of the received user data to the host computer. In step 930 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

In some embodiments a computer program, computer program product or computer readable storage medium comprises instructions which when executed on a computer perform any of the embodiments disclosed herein. In further examples the instructions are carried on a signal or carrier and which are executable on a computer wherein when executed perform any of the embodiments disclosed herein.

EMBODIMENTS

Group A Embodiments

1. A method performed by a wireless device, the method comprising:
   generating assistance information for mobility robustness operation;
   sending, to a network node, the generated assistance information for mobility robustness operation.
2. The method of embodiment 1, wherein the assistance information comprises a radio link failure report.
3. The method of embodiment 1, wherein the assistance information comprises a handover report.
4. The method of any of embodiments 1-3, wherein the network node is a Centralized Unit.
5. The method of any of embodiments 1-3, wherein the network node is a Distributed Unit.
6. The method of any of the previous embodiments, further comprising:
   providing user data; and
   forwarding the user data to a host computer via the transmission to the base station.

Group B Embodiments

7. A method performed by a network node for mobility robustness optimization, the network node comprising a first Centralized Unit, the method comprising:
   receiving, from a wireless device, assistance information for mobility robustness optimization;
   determining a failure cause based on the received assistance information;
   determining a location where the failure originated;
   forwarding one or more of the assistance information and configuration changes related to mobility robustness optimization to one or more of:
   i. a Centralized Unit of the network node;
   ii. an associated Distributed Unit;
   iii. another Centralized Unit;
   iv. a Distributed Unit associated with another Centralized Unit.

8. The method of embodiment 7, wherein the assistance information comprises a radio link failure report.
9. The method of embodiment 7, wherein the assistance information comprises a handover report.
10. The method of any of embodiments 7-9, wherein the location of the failure is determined based on one or more of:
   the failure cause; and
   location information provided in the assistance information.
11. The method of any of embodiments 7-10, wherein the one or more of the assistance information and the configuration changes are forwarded to the location where the failure originated.
12. A method performed by a network node for mobility robustness optimization, the network node comprising a second Centralized Unit, the method comprising:
   receiving assistance information for mobility robustness optimization, the assistance information indicating that a failure may have originated in a cell of a Distributed Unit associated with the second Centralized Unit; and
   forwarding one or more of the received assistance information and configuration changes related to mobility robustness optimization to the Distributed Unit where the failure may have originated.
13. The method of embodiment 12, wherein the assistance information comprises a radio link failure report.
14. The method of any of embodiments 12-13, further comprising determining a mapping between a cell identifier and the Distributed Unit.
15. A method performed by a network node for mobility robustness optimization, the network node comprising a Distributed Unit, the method comprising:
   receiving assistance information for mobility robustness optimization, the assistance information indicating that a failure may have originated in a cell of the Distributed Unit;
   performing one or more parameter changes in one or more functions handled by the Distributed Unit; and
   indicating to the Distributed Unit any parameter changes performed in the one or more functions handled by the Distributed Unit.
16. The method of embodiment 15, wherein the assistance information is received from a Centralized Unit.
17. The method of any of embodiments 15-16, wherein the assistance information comprises a radio link failure report.
18. The method of any of embodiments 15-17, wherein the one or more functions may comprise one or more of:
   random access;
   beam failure detection;
   beam failure recovery;
   radio link monitoring;
   cell quality derivation;
   beam management; and
   one or more other functions affected by beamforming parameters.
19. The method of any of the previous embodiments, further comprising:
   obtaining user data; and
   forwarding the user data to a host computer or a wireless device.

Group C Embodiments

20. A wireless device, the wireless device comprising:
   processing circuitry configured to perform any of the steps of any of the Group A embodiments; and
   power supply circuitry configured to supply power to the wireless device.
21. A network node, the network node comprising:
   processing circuitry configured to perform any of the steps of any of the Group B embodiments;
   power supply circuitry configured to supply power to the network node.
22. A user equipment (UE), the UE comprising:
   an antenna configured to send and receive wireless signals;
   radio front-end circuitry connected to the antenna and to processing circuitry, and configured to condition signals communicated between the antenna and the processing circuitry;
   the processing circuitry being configured to perform any of the steps of any of the Group A embodiments;
   an input interface connected to the processing circuitry and configured to allow input of information into the UE to be processed by the processing circuitry;
   an output interface connected to the processing circuitry and configured to output information from the UE that has been processed by the processing circuitry; and
   a battery connected to the processing circuitry and configured to supply power to the UE.
23. A computer program, the computer program comprising instructions which when executed on a computer perform any of the steps of any of the Group A embodiments.
24. A computer program product comprising a computer program, the computer program comprising instructions which when executed on a computer perform any of the steps of any of the Group A embodiments.
25. A non-transitory computer-readable storage medium or carrier comprising a computer program, the computer program comprising instructions which when executed on a computer perform any of the steps of any of the Group A embodiments.
26. A computer program, the computer program comprising instructions which when executed on a computer perform any of the steps of any of the Group B embodiments.
27. A computer program product comprising a computer program, the computer program comprising instructions which when executed on a computer perform any of the steps of any of the Group B embodiments.
28. A non-transitory computer-readable storage medium or carrier comprising a computer program, the computer program comprising instructions which when executed on a computer perform any of the steps of any of the Group B embodiments.
29. A communication system including a host computer comprising:
   processing circuitry configured to provide user data; and
   a communication interface configured to forward the user data to a cellular network for transmission to a user equipment (UE),
   wherein the cellular network comprises a network node having a radio interface and processing circuitry, the network node's processing circuitry configured to perform any of the steps of any of the Group B embodiments.

30. The communication system of the pervious embodiment further including the network node.

31. The communication system of the previous 2 embodiments, further including the UE, wherein the UE is configured to communicate with the network node.

32. The communication system of the previous 3 embodiments, wherein:
the processing circuitry of the host computer is configured to execute a host application, thereby providing the user data; and
the UE comprises processing circuitry configured to execute a client application associated with the host application.

33. A method implemented in a communication system including a host computer, a network node and a user equipment (UE), the method comprising:
at the host computer, providing user data; and
at the host computer, initiating a transmission carrying the user data to the UE via a cellular network comprising the network node, wherein the network node performs any of the steps of any of the Group B embodiments.

34. The method of the previous embodiment, further comprising, at the network node, transmitting the user data.

35. The method of the previous 2 embodiments, wherein the user data is provided at the host computer by executing a host application, the method further comprising, at the UE, executing a client application associated with the host application.

36. A user equipment (UE) configured to communicate with a network node, the UE comprising a radio interface and processing circuitry configured to performs the of the previous 3 embodiments.

37. A communication system including a host computer comprising:
processing circuitry configured to provide user data; and
a communication interface configured to forward user data to a cellular network for transmission to a user equipment (UE),
wherein the UE comprises a radio interface and processing circuitry, the UE's components configured to perform any of the steps of any of the Group A embodiments.

38. The communication system of the previous embodiment, wherein the cellular network further includes a network node configured to communicate with the UE.

39. The communication system of the previous 2 embodiments, wherein:
the processing circuitry of the host computer is configured to execute a host application, thereby providing the user data; and
the UE's processing circuitry is configured to execute a client application associated with the host application.

40. A method implemented in a communication system including a host computer, a network node and a user equipment (UE), the method comprising:
at the host computer, providing user data; and
at the host computer, initiating a transmission carrying the user data to the UE via a cellular network comprising the network node, wherein the UE performs any of the steps of any of the Group A embodiments.

41. The method of the previous embodiment, further comprising at the UE, receiving the user data from the network node.

42. A communication system including a host computer comprising:
communication interface configured to receive user data originating from a transmission from a user equipment (UE) to a network node,
wherein the UE comprises a radio interface and processing circuitry, the UE's processing circuitry configured to perform any of the steps of any of the Group A embodiments.

43. The communication system of the previous embodiment, further including the UE.

44. The communication system of the previous 2 embodiments, further including the network node, wherein the network node comprises a radio interface configured to communicate with the UE and a communication interface configured to forward to the host computer the user data carried by a transmission from the UE to the network node.

45. The communication system of the previous 3 embodiments, wherein:
the processing circuitry of the host computer is configured to execute a host application; and
the UE's processing circuitry is configured to execute a client application associated with the host application, thereby providing the user data.

46. The communication system of the previous 4 embodiments, wherein:
the processing circuitry of the host computer is configured to execute a host application, thereby providing request data; and
the UE's processing circuitry is configured to execute a client application associated with the host application, thereby providing the user data in response to the request data.

47. A method implemented in a communication system including a host computer, a network node and a user equipment (UE), the method comprising:
at the host computer, receiving user data transmitted to the network node from the UE, wherein the UE performs any of the steps of any of the Group A embodiments.

48. The method of the previous embodiment, further comprising, at the UE, providing the user data to the network node.

49. The method of the previous 2 embodiments, further comprising:
at the UE, executing a client application, thereby providing the user data to be transmitted; and
at the host computer, executing a host application associated with the client application.

50. The method of the previous 3 embodiments, further comprising:
at the UE, executing a client application; and
at the UE, receiving input data to the client application, the input data being provided at the host computer by executing a host application associated with the client application,
wherein the user data to be transmitted is provided by the client application in response to the input data.

51. A communication system including a host computer comprising a communication interface configured to receive user data originating from a transmission from a user equipment (UE) to a network node, wherein the network node comprises a radio interface and processing circuitry, the network node's processing circuitry configured to perform any of the steps of any of the Group B embodiments.
52. The communication system of the previous embodiment further including the network node.
53. The communication system of the previous 2 embodiments, further including the UE, wherein the UE is configured to communicate with the network node.
54. The communication system of the previous 3 embodiments, wherein:
the processing circuitry of the host computer is configured to execute a host application;
the UE is configured to execute a client application associated with the host application, thereby providing the user data to be received by the host computer.
55. A method implemented in a communication system including a host computer, a network node and a user equipment (UE), the method comprising:
at the host computer, receiving, from the network node, user data originating from a transmission which the network node has received from the UE, wherein the UE performs any of the steps of any of the Group A embodiments.
56. The method of the previous embodiment, further comprising at the network node, receiving the user data from the UE.
57. The method of the previous 2 embodiments, further comprising at the network node, initiating a transmission of the received user data to the host computer.

Modifications, additions, or omissions may be made to the systems and apparatuses described herein without departing from the scope of the disclosure. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods described herein without departing from the scope of the disclosure. The methods may include more, fewer, or other steps. Additionally, steps may be performed in any suitable order.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the scope of this disclosure, as defined by the following claims.

The invention claimed is:

1. A method performed by a network node comprising a Centralized unit, the method comprising:
receiving assistance information for mobility robustness optimization;
determining, based on the received assistance information, configuration changes related to mobility robustness optimization;
determining a failure cause based on the received assistance information;
determining a geographic location where a failure originated based on the received assistance information, the geographic location where the failure originated is determined based on the determined failure cause, and mapping the geographic location to a cell associated to a Distributed Unit associated to a second Centralized Unit;
determining a mapping between a cell identifier and the second Centralized Unit; and
forwarding the assistance information and the configuration changes related to mobility robustness optimization to the second Centralized Unit.

2. A method performed by a network node comprising a Distributed Unit, the method comprising:
receiving assistance information for mobility robustness optimization, the assistance information indicating that a failure has originated in a cell of the Distributed Unit, the assistance information originating from a network node comprising a Centralized Unit and received from a network node comprising a second Centralized Unit that is different from the network node comprising the Centralized Unit;
determining a failure cause based on the received assistance information;
determining a geographic location where a failure originated based on the received assistance information, the geographic location where the failure originated is determined based on the determined failure cause, and mapping the geographic location to a cell associated to the Distributed Unit; and
performing one or more parameter changes in one or more functions handled by the Distributed Unit, the one or more parameter changes being performed based on configuration changes related to mobility robustness optimization determined by the Centralized Unit and received with the assistance information.

3. A network node comprising a Centralized Unit, the network node comprising:
power supply circuitry configured to supply power to the network node; and
processing circuitry configured to:
receive assistance information for mobility robustness optimization;
determine, based on the received assistance information, configuration changes related to mobility robustness optimization;
determine a failure cause based on the received assistance information;
determine a geographic location where a failure originated based on the received assistance information, the geographic location where the failure originated is determined based on the determined failure cause, and mapping the geographic location to a cell associated to a Distributed Unit associated to a second Centralized Unit;
determine a mapping between a cell identifier and the second Centralized Unit; and
forward the assistance information and the configuration changes related to mobility robustness optimization to the second Centralized Unit.

4. The network node of claim 3, wherein the assistance information comprises a radio link failure report.

5. The network node of claim 3, wherein the assistance information comprises a handover report.

6. The network node of claim 3, wherein the assistance information, the configuration changes related to mobility robustness optimization, or both are forwarded to the geographic location where the failure originated.

7. The network node of claim 3, wherein;
the assistance information indicates that a failure may have originated in a cell of a Distributed Unit associated with the Centralized Unit; and
the forwarding comprises forwarding the assistance information, the configuration changes related to mobility robustness optimization, or both to the Distributed Unit comprising the cell where the failure may have originated.

8. The network node of claim 3, further comprising:
determining a mapping between a cell identifier and the Distributed Unit.

9. The network node of claim 3, further comprising:
determining the configuration changes related to mobility robustness optimization based on the received assistance information.

10. The network node of claim 3, further comprising:
selecting a portion of the assistance information for forward;
wherein the forwarding comprises forwarding the selected portion of the assistance information to the Distributed Unit or to the second Centralized Unit.

11. A network node comprising a Distributed Unit, the network node comprising:
power supply circuitry configured to supply power to the network node; and
processing circuitry configured to:
receive assistance information for mobility robustness optimization, the assistance information indicating that a failure originated in a cell of the Distributed Unit, the assistance information originating from a network node comprising a Centralized Unit and received from a network node comprising a second Centralized Unit that is different from the network node comprising the Centralized Unit;
determining a failure cause based on the received assistance information;
determining a geographic location where a failure originated based on the received assistance information, the location where the failure originated is determined based on the determined failure cause, and mapping the geographic location to a cell associated to the Distributed Unit; and
performing one or more parameter changes in one or more functions handled by the Distributed Unit, the one or more parameter changes being performed based on configuration changes related to mobility robustness optimization determined by the Centralized Unit and received with the assistance information.

12. The network node of claim 11, wherein the assistance information is received from a Centralized Unit.

13. The network node of claim 11, wherein the assistance information comprises a radio link failure report.

14. The network node of claim 11, wherein the one or more functions may comprise one or more of:
random access;
beam failure detection;
beam failure recovery;
radio link monitoring;
cell quality derivation;
beam management; and
one or more other functions affected by beamforming parameters.

* * * * *